United States Patent [19]

Petit et al.

[11] 3,903,402

[45] Sept. 2, 1975

[54] DIGITAL COMPUTER PROGRAM SYSTEM EMPLOYED IN A HYBRID LOADFLOW COMPUTER ARRANGEMENT FOR MONITORING THE SECURITY OF AN ELECTRIC POWER SYSTEM

[75] Inventors: Jorge E. Petit, Bethel Park; David Egelston, Pittsburgh, both of Pa.; Jerry C. Russell, Minneapolis, Minn.

[73] Assignee: Westinghouse Electric Corporation, Pittsburgh, Pa.

[22] Filed: Aug. 26, 1971

[21] Appl. No.: 175,288

[52] U.S. Cl................................. 235/151.21; 444/1

[51] Int. Cl.[2]. G06F 15/06; G06F 15/56; G06J 1/00

[58] Field of Search........... 235/151.21, 150.5, 184, 235/185; 444/1; 307/43, 52, 57; 290/4

[56] References Cited

OTHER PUBLICATIONS

"Computer Control of Electrical Distribution,"Control, Nov. 1964, pp. 589–591.

"Computer Control of Power Systems,"The Engineer, Oct. 2, 1964.

"Considerations in the Regulation of Interconnected Areas,"IEEE, Transactions on Power Apparatus and Systems, Dec. 1967, pp. 1527–1539.

*Primary Examiner*—Edward J. Wise
*Attorney, Agent, or Firm*—E. F. Possessky

[57] ABSTRACT

A hybrid loadflow computer arrangement includes an analog network simulator and a digital computer which acquires and processes on-line data and operator data related to the power system for which a loadflow problem is being solved. The analog simulator includes modular circuits representative of power system busses and lines and the interface between the digital computer and the analog network simulator is provided by analog-to-digital and digital-to-analog converters and by line outage contact closure outputs. The hybrid arrangement operates iteratively, with the analog network simulator providing a bus voltage solution for a set of network simultaneous equations and the digital computer providing bus load and generation injection current calculations and convergence steering control. A program system employed in the digital computer preprocesses input data, determines automatic and operator contingency cases and provides contingency modified preprocessed data, generates basecase and contingency case steady state loadflow solutions for the preprocessed data, and monitors solution results.

23 Claims, 42 Drawing Figures

307

DIGITAL COMPUTER PROGRAM SYSTEM EMPLOYED IN A HYBRID LOADFLOW COMPUTER ARRANGEMENT FOR MONITORING THE SECURITY OF AN ELECTRIC POWER SYSTEM

CROSS-REFERENCE TO RELATED APPLICATIONS

Reference is made to the following concurrently filed and related patent applications which are assigned to the present assignee:

1. Ser. No. 175,287 entitled "Hybrid Computer System and Method for Rapidly Generating Electric Power System Loadflow Solutions", filed by D. M. Egelston, M K. Enns and J. C. Russell and now abandoned.

2. Ser No. 175,286 entitled "Hybrid Computer System and Method for Rapidly Generating Electric Power System Loadflow Solutions" and filed by D. M. Egelston, M. K. Enns and J. C. Russell.

3. Ser. No. 175,292 entitled "Security Monitoring System and Method for an Electric Power System Employing A Fast On-Line Loadflow Computer Arrangement" and filed by D. M. Egelston and J. C. Russell.

4. Ser. No. 175,293, now U. S. Pat. No. 3,808,409, issued Apr. 30, 1974, entitled "Loadflow Computer and DC Circuit Modules Employed Therein for Simulating AC Electric Power Networks" and filed by M. K. Enns and P. H. Haley.

5. Ser. No. 175,289 entitled "System and Method for Converging Iterations in a Hybrid Loadflow Computer Arrangement" and filed by M. K. Enns, J. E. Petit and J. C. Russell.

6. Ser. No. 175,290 entitled "Hybrid Interfacing of Computational Functions in a Hybrid Loadflow Computer Arrangement for Electric Power Systems" and filed by J. C. Russell.

7. Ser. No. 175,291 entitled "Application of Basecase Results to Initiate Iterations and Test for Convergence in a Hybrid Computer Arrangement Used to Generate Rapid Electric Power System Loadflow Solutions" and filed by N. R. Carlson, M. K. Enns and J. E. Petit.

BACKGROUND OF THE INVENTION

The present invention relates to electric power systems and more particularly to hybrid loadflow computer systems and security monitoring systems associated therewith. In the applications WE 41,236I and WE 41,237 referenced above, there is described and claimed a hybrid computer system and method for rapidly generating electric power system loadflow solutions and a security monitoring system and method for an electric power system employing a fast on-line loadflow computer arrangement. In those same applications, there is provided a general description of the pertaining background art.

One of the requirements faced in implementing a hybrid loadflow computer and a security monitoring system employing such a computer is that of providing an efficient and functionally appropriate program system for the digital computer element of the hybrid computer. The present patent application is directed to this subject matter area.

SUMMARY OF THE INVENTION

Rapid power system loadflow solutions are provided iteratively on the basis of on-line and/or off-line system data by a hybrid computer arrangement comprising a digital computer and a modularly structured analog network simulator. The hybrid computer is included with a data acquisition system in a secutiry monitoring system for the power system. The digital computer is operated by a program system which preprocesses on-line and other data for basecase loadflow solutions. The program system further generates contingency cases for loadflow solutions and provides monitoring of solution results.

DESCRIPTION OF THE PREFERRED EMBODIMENT

Power System

Figure 1A:
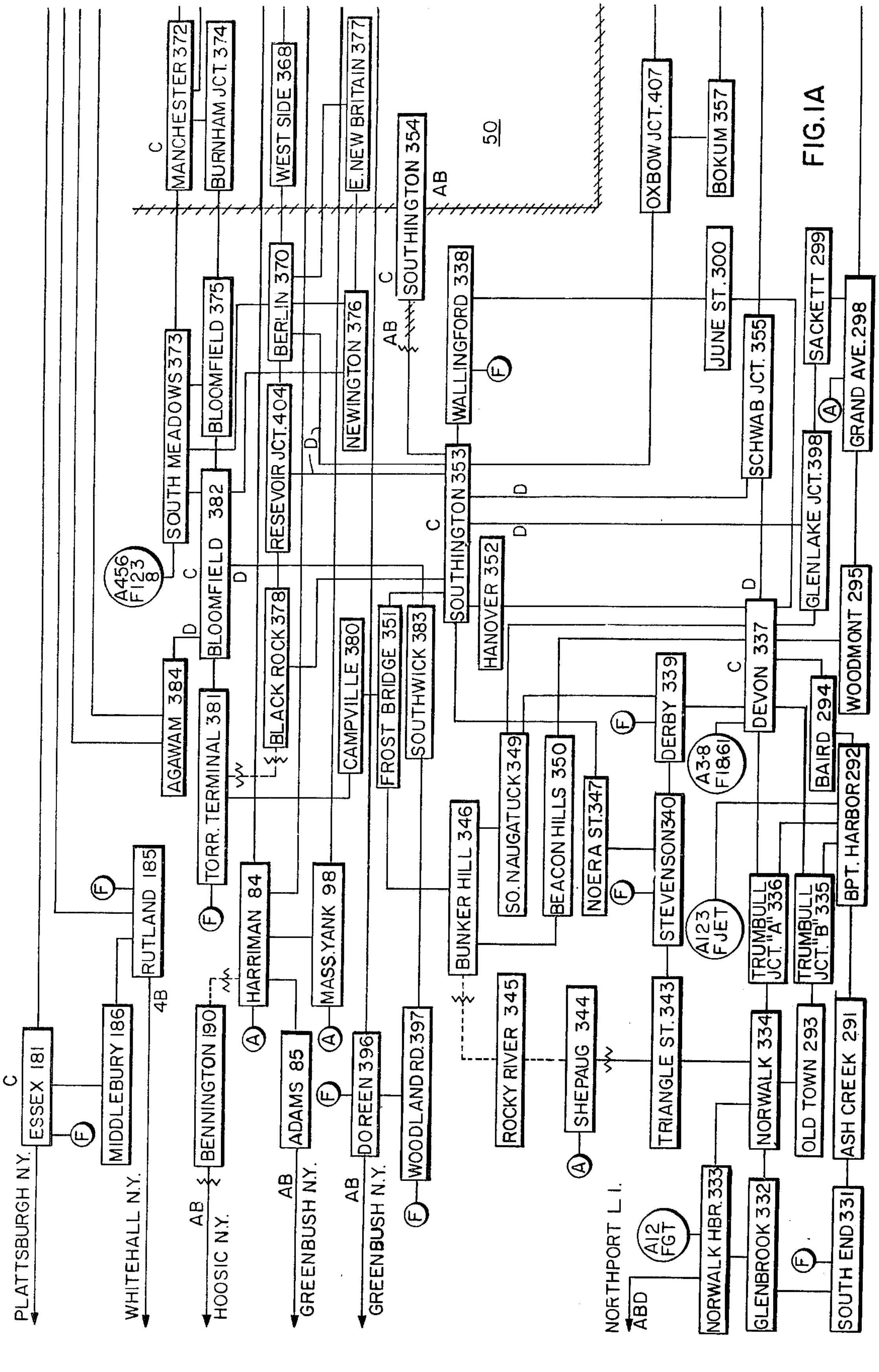
FIGS. 1A-1E show a schematic diagram of a regional power system for which security monitoring loadflow solutions are to be provided.

In FIGS. 1A–1D there is shown a power network 50 which schematically represents a power system employed to provide over 10,000 MW of electric power for a large part of the New England Region of the United States. The regional power system is formed by all of the generation, transmission and distribution apparatus owned and operated by a large number of separate companies. The company systems are interrelated in four separate company groups for intragroup power exchange, economic dispatch and other intragroup purposes. In turn, the groups function as satellites under central pool or regional control within the New England power system for power exchange with other regions or systems, regional economic dispatch, regional security monitoring and other regional purposes.

The network 50 represents the power sources and the transmission and distribution configuration of the actual New England power system by means of generation and/or load busses and bus interconnection lines. Actual busses are nodal points in the power system where connections are made. Some nodal points in the actual system are sufficiently close from an electrical standpoint that they can be modeled as a single nodal point without materially affecting the simulative capability of the model. Thus, the actual system in this instance comprises a total of approxiamtely 400 busses and that total has been compressed to 181 busses in the representative network 50. Similarly, an actual total of over 500 generation units is represented in the network 50 by about 40 busses with 237 generation units.

To obtain a total view of the network 50, the FIGS. 1A–1D are placed end-to-end in letter order. Busses are represented by rectangular blocks and they are identified by numbers as well as names which typically are geographical. Reference is made to Appendix I for a complete list of the busses and the line interconnections and certain associated data. Appendix I also provides a list of the line impedance values used in loadflow calculations considered more fully subsequently. The line impedance reflects distributed series resistance and inductance and distributed line-to-ground capacitance. Generally, tielines are shown unconnected at the point where interfacing occurs between the regional power system represented by the network 50 and external power systems. For example, at the left side of FIG. 1A, the lines labeled Plattsburg, N. Y., Whitehall, N. Y. etc. are tielines.

Figure 1B:
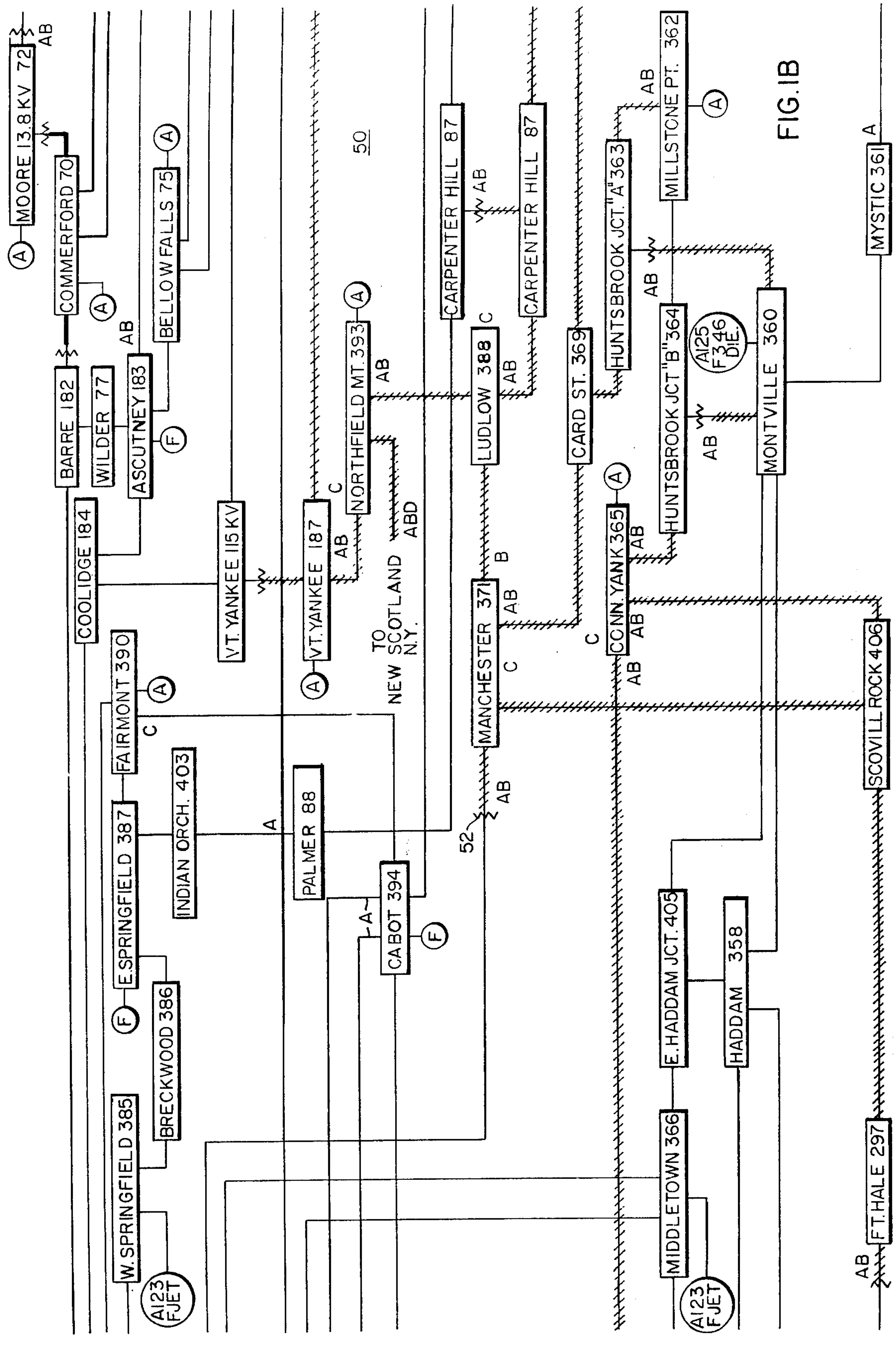
Figure 1C:
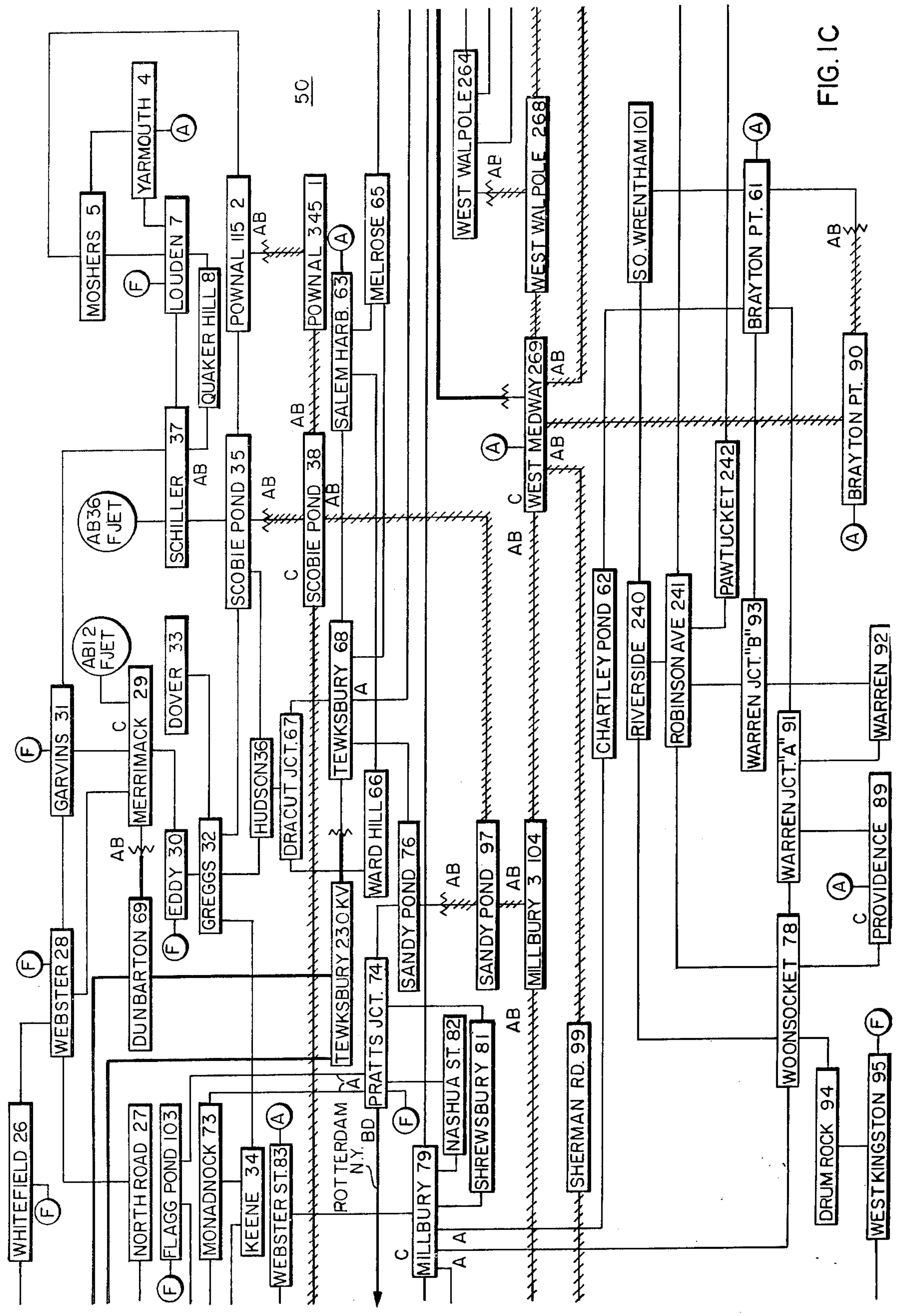
Figures 1D, 1E:
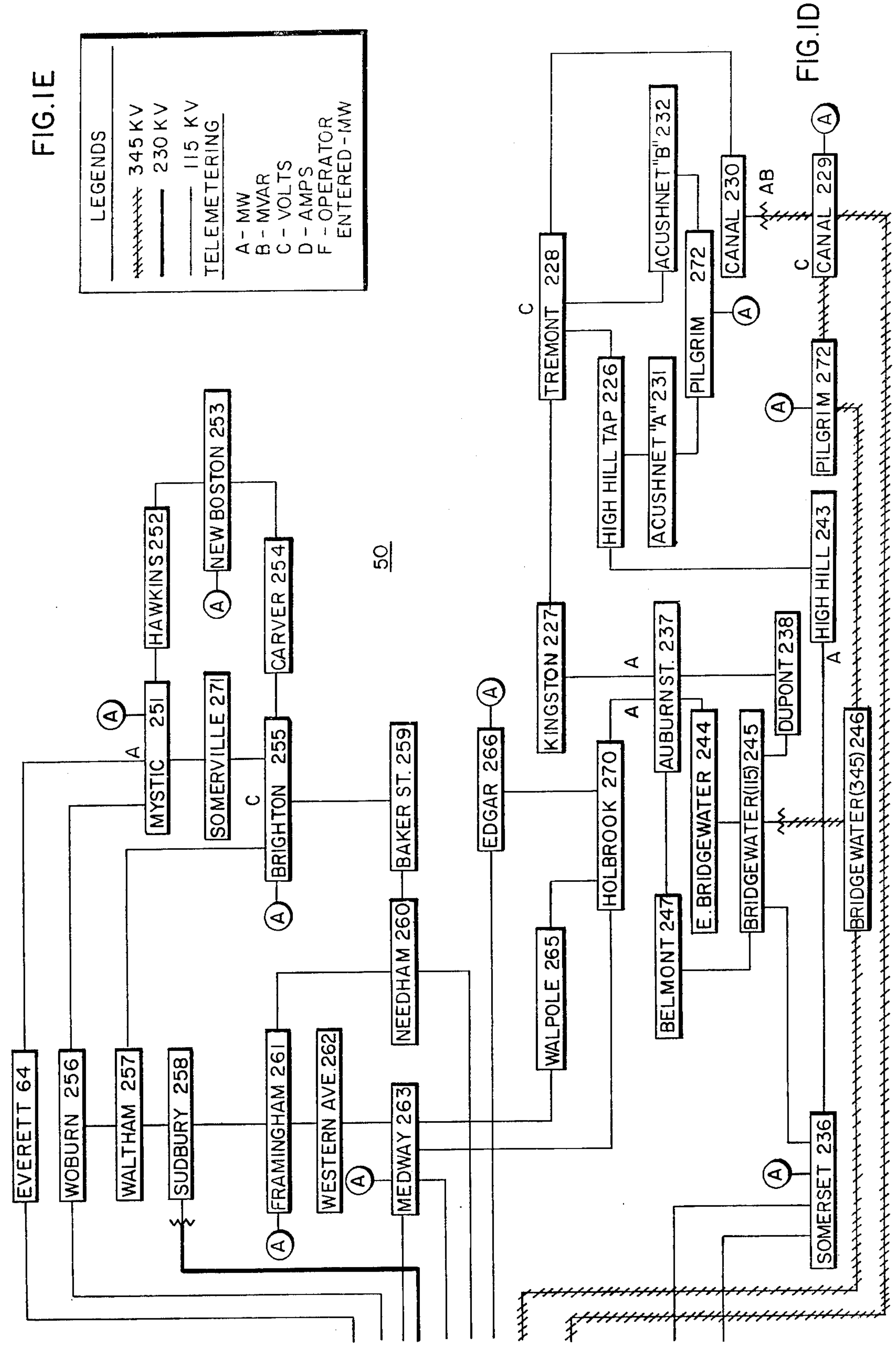

The nature of any particular line or bus can be inferred to a degree by use of the legend shown in FIG. 1E. Thus, the code AB on the Greenbush N. Y. tieline at the left of FIG. 1A suggests that it could be a tieline since megawatts and megavars are both telemetered for that line. However, in FIG. 1B, the line interconnecting the Connecticut Yankee bus and the Scovill Rock bus is a 345 KV intraregional line and it also is coded as AB. In the line connecting the Manchester 371 bus in FIG. 1B to the Manchester 372 bus in FIG. 1A, a transformer is symbolized as indicated by the reference character 52 and it couples a 345 KV line to a 115 KV line. Busses may be presumed to be generation busses if the code letter A and/or the code letter C or F is associated with it. Otherwise a bus may be a load bus or a junction bus as considered more fully subsequently.

Generally, one or more slack busses may be specified in the network 50 to provide the model with the energy balance needed for convergence of network loadflow solutions. In this instance, a single bus, i.e., the Millstone Point bus at the bottom right of FIG. 1B, is designated as a slack bus for the loadflow calculations since it is a bus which is expected to be retained in continuous service and since it is near the electrical center of the regional power system.

MONITORING AND CONTROL SYSTEM FOR THE REGIONAL POWER SYSTEM

I. General Configuration

Figure 2:
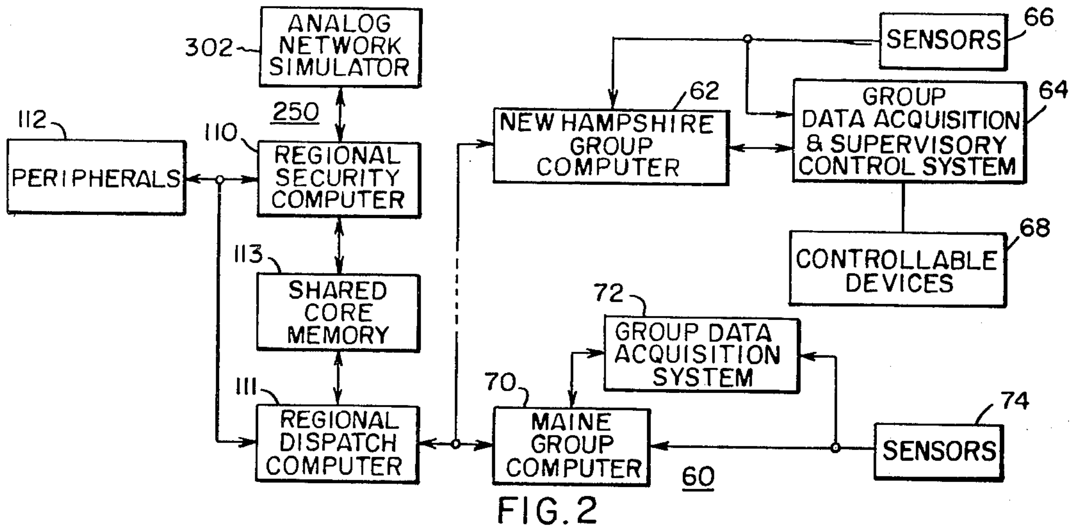
FIG. 2 shows a schematic diagram of a system of digital computers and related apparatus which acquire system data and monitor power system security and provide other functions for the power system illustrated in FIG. 1.

As shown in FIG. 2, a digital computer monitoring and control system 60 is provided for the regional power system represented by the network 50. The system 60 is shown and described herein to the extent needed to show an implementation of the invention and generally to aid the reader in reaching an understanding of the invention. Some additional information related to it is set forth in a paper entitled "Inter-Computer Data Exchange For New England Area Dispatching" presented by F. C. Hart, R. S. Johnson, D. W. Magee, E. K. Nielson and H. M. Ray at the 1971 PICA Conference on May 23, 1971.

A satellite digital computer 62 provides various functions for a New Hampshire group of electric power companies. Thus, a group data acquisition and supervisory control system 64 provides a data telemetering link to the computer 62 from various sensors 66. Direct telemetered data is also provided to the computer 62 from the sensors 66. The supervisory control provided in the block 64 implements various kinds of control actions for the local power system through controllable devices 68. A suitable data acquisition and supervisory control system for the block 64 is a solid state system sold by Westinghouse Electric Corporation, known as the REDAC V supervisory system and described generally in a Westinghouse Descriptive Bulletin 40–550. In the embodiment described herein, the REDAC V system is employed for the block 64 without any local supervisory capability integrated into the group computer 62.

The New Hampshire group computer 62 further provides economic dispatch for the local system on the basis of supervisory directions from a digital regional dispatch computer 111 and on the basis of locally derived economic dispatch determinations. Local area frequency regulation is performed by the computer 62 with a similar integration of group and regional determinations. Data acquisition system functions are also performed by the group computer 62 to support operator interface, monitor, alarm and logging functions at the regional computer location. Other functions provided by the group computer 62 include local data alarming, local data logging and local operator interface through CRT and other peripheral apparatus. Display information includes local system data as well as some regional data including major regional power generation and New England area pool control error.

Another satellite digital computer 70 provides various functions for a Maine group of electric power companies. It operates similarly to the group computer 62 but no supervisory control capability is included for the Maine group. Thus, a group data acquisition system 72 transmits data collected from sensors 74 to the group computer 70. Direct telemetered data is also made available to the group computer 70 from the sensors 74. Other relatively minor differences also exist such as the fact that no CRT is provided with the group computer 70.

Group digital computers for the other two electric power company groups previously noted are not represented in FIG. 2. Those computers are associated with a Connecticut Valley group of electric power companies referred to as CONVEX and a Rhode Island, Eastern Massachusetts, and Vermont group of electric power companies referred to as REMVEC. Generally, the CONVEX and REMVEC computers function in a manner much like that described for the Maine group computer 70.

All of the group computers are data linked to the regional dispatch computer 111 which perform various regional monitoring and control functions. For control purposes, the regional dispatch computer 111 performs both regional economic dispatch and regional system power regulation including frequency regulation and interchange scheduling. As a data acquisition function, the regional dispatch computer 111 operates the data links with the four group computers and in addition it accepts as inputs direct telemetered data from various sensors throughout the regional power system.

Monitoring and alarm is provided by the regional dispatch computer 111 for various acquired on-line data items such as transformer MVA, tieline MW, bus voltages and line amperes. As considered more fully subsequently, a digital regional security computer 110 monitors some of the same data items as the regional dispatch computer 111, but the security computer 110 monitors additional parameters as well.

Periodic logging of acquired data such as MWHR is also performed by the dispatch computer 111. The dispatch computer 111 provides an operator interface function for both the security computer 110 and the dispatch computer 111 through the operation of various kinds of operator interface apparatus.

The security computer 110 is included at the regional level as part of a regional security monitoring system. The security and dispatch computers 110 and 111 are linked to each other through a shared core memory 113 so that on-line power system data telemetered to the dispatch computer 111 can be transmitted to the security computer 110. Various peripheral devices 112 considered more fully subsequently are provided for both computers 110 and 111. The functions of the security computer 110 including the manner in which it interacts with an analog network simulator 302 are considered more fully subsequently.

II. On-Line Data Acquisition System

Figure 3A:
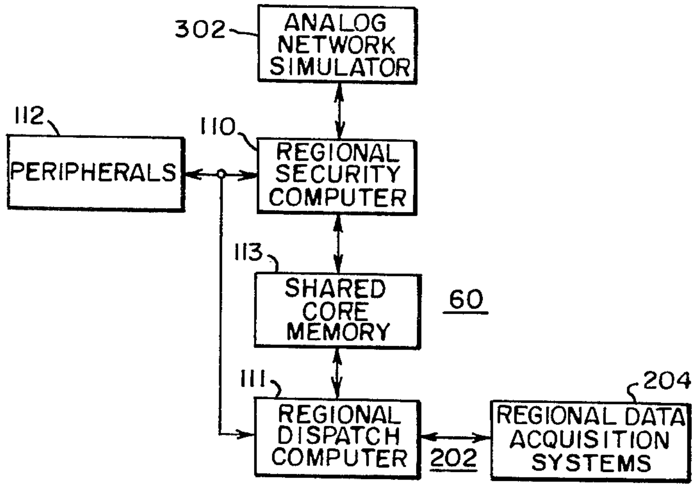
FIG. 3A illustrates the computer system shown in FIG. 2 with emphasis on its data acquisition characteristics.

In FIG. 3A, there is illustrated a schematic diagram of the regional monitoring and control system 60 in a form which emphasizes the data acquisition function within the system 60. Thus, a regional data acquisition system 202 includes the regional dispatch computer 111 and regional data acquisition subsystems 204 which are formed by the previously described group computers and associated apparatus.

Figure 3B:
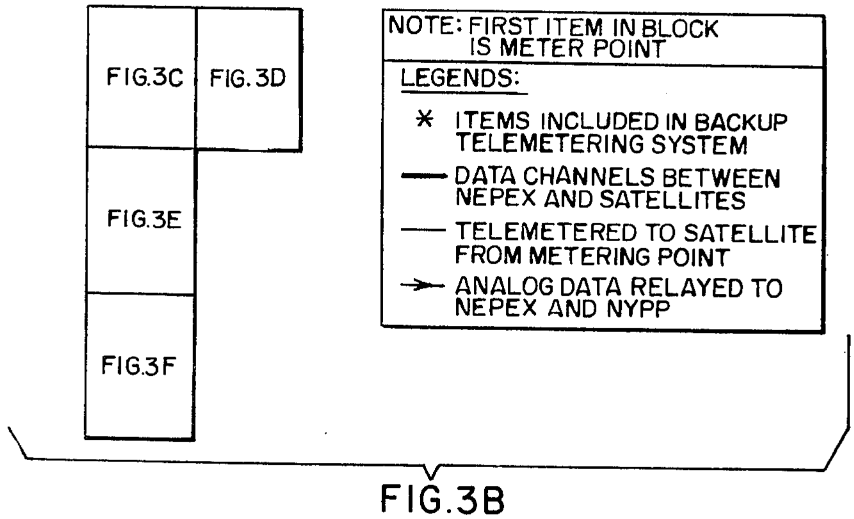
FIG. 3B provides a layout and legends for FIGS. 3C-3E.

FIGS. 3C–3F show the telemetering portion of the data acquisition subsystems 204 in greater detail. FIG. 3B illustrates the manner in which FIGS. 3C–3F are assembled to provide a schematic diagram of the regional data acquisition system 202. A legend applicable to FIGS. 3C–3F is also included in FIG. 3B. The schematic of FIGS. 3C–3F is representative of the actual power system telemetering as of a particular date and it is not updated to embrace power system telemetry changes implemented since that date.

Generally, the schematic diagram of FIGS. 3C–3F illustrate the measured data items and the telemetry data links for those data items in the regional power system. The data source for each telemetry link is indicated by a data box which generally has a correspondence to one or more busses shown in the network 50. However, individual data items may or may not relate to the security monitoring system since total telemetered data includes data used in the security monitoring system as well as data put to on-line control and other uses.

Figure 3C:
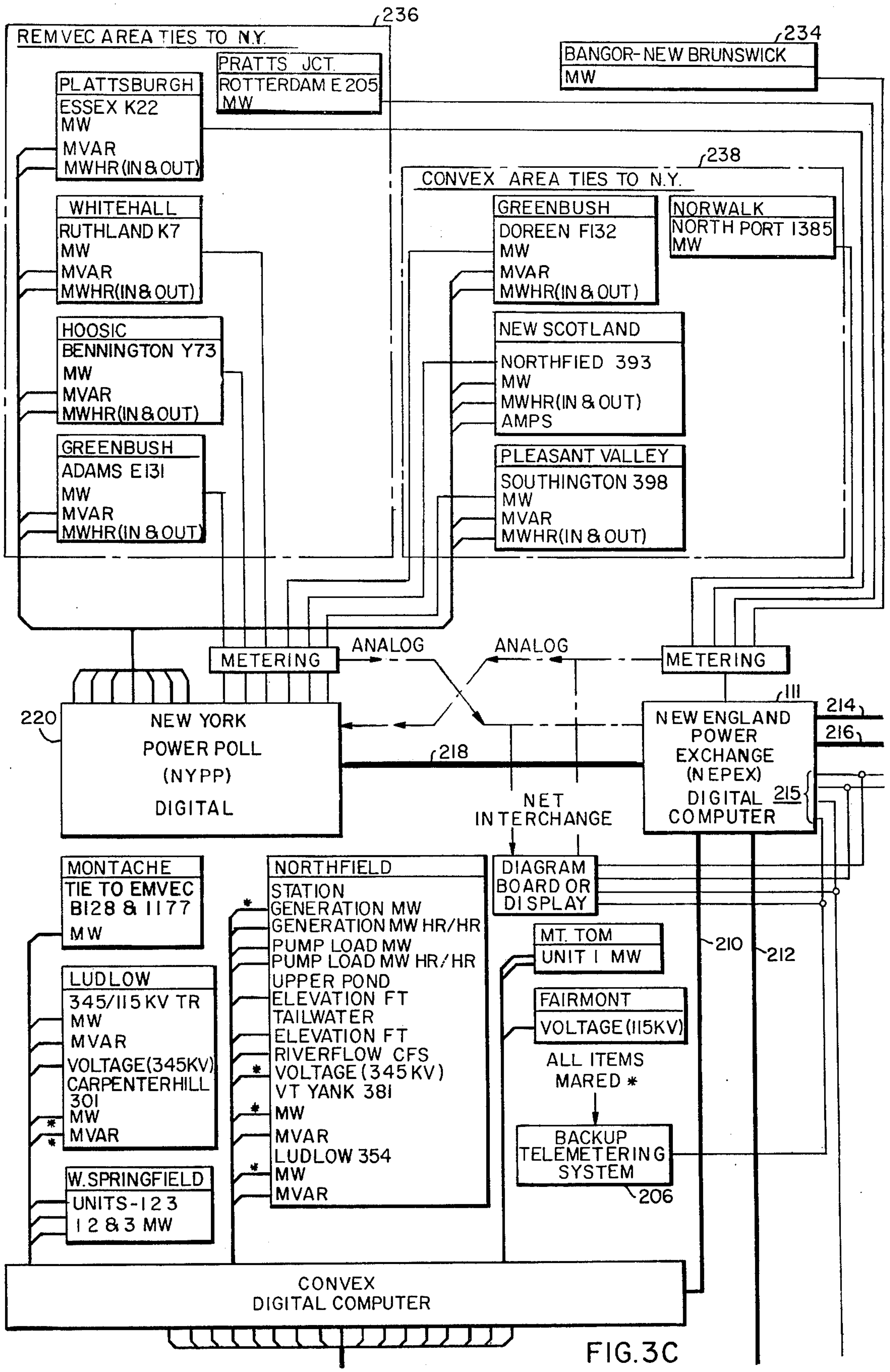
FIGS. 3C-3F show a detailed schematic diagram of the data acquisition system employed in the regional monitoring and control computer system shown in FIG. 2.
Figure 3D:
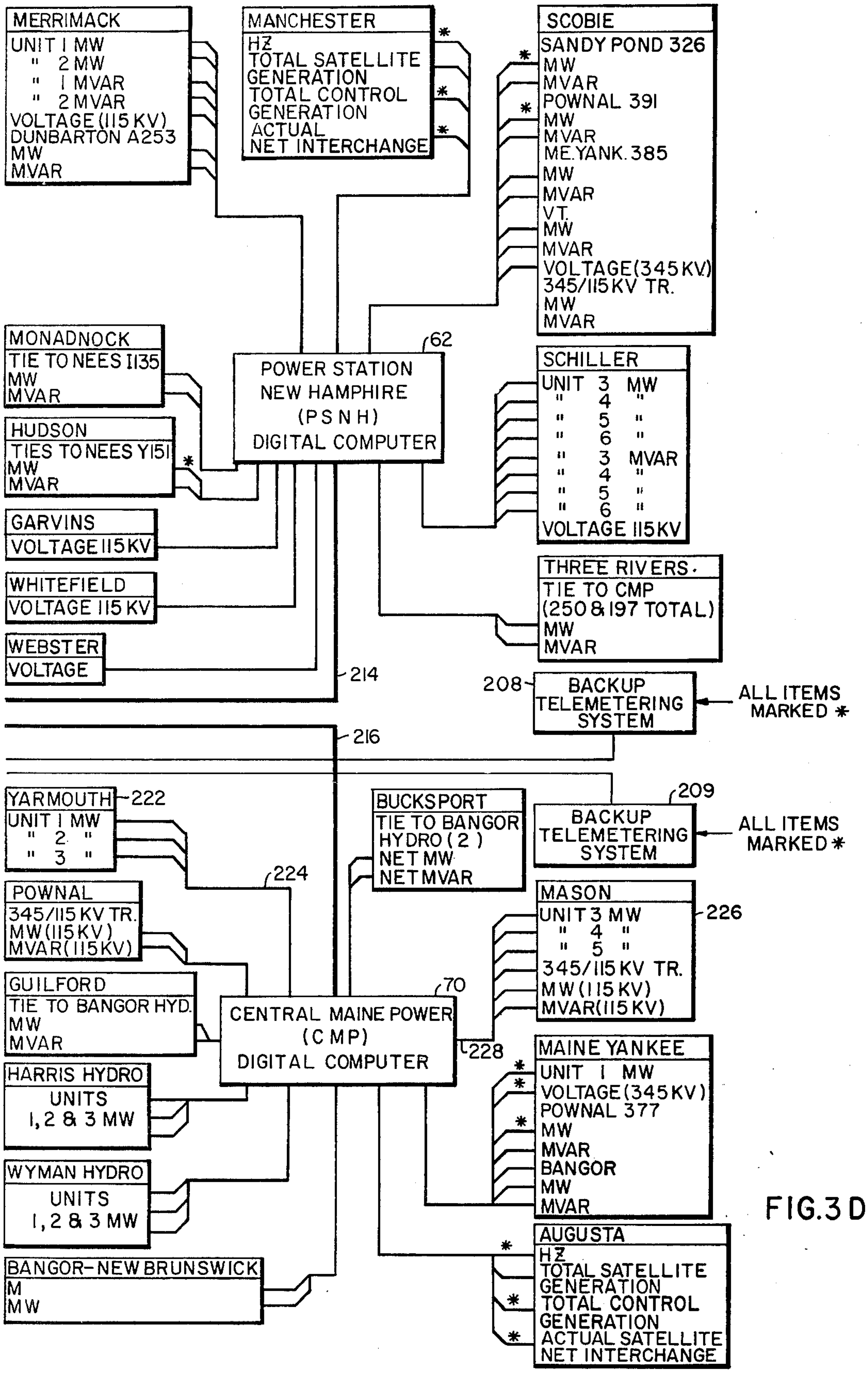
Figure 3E:
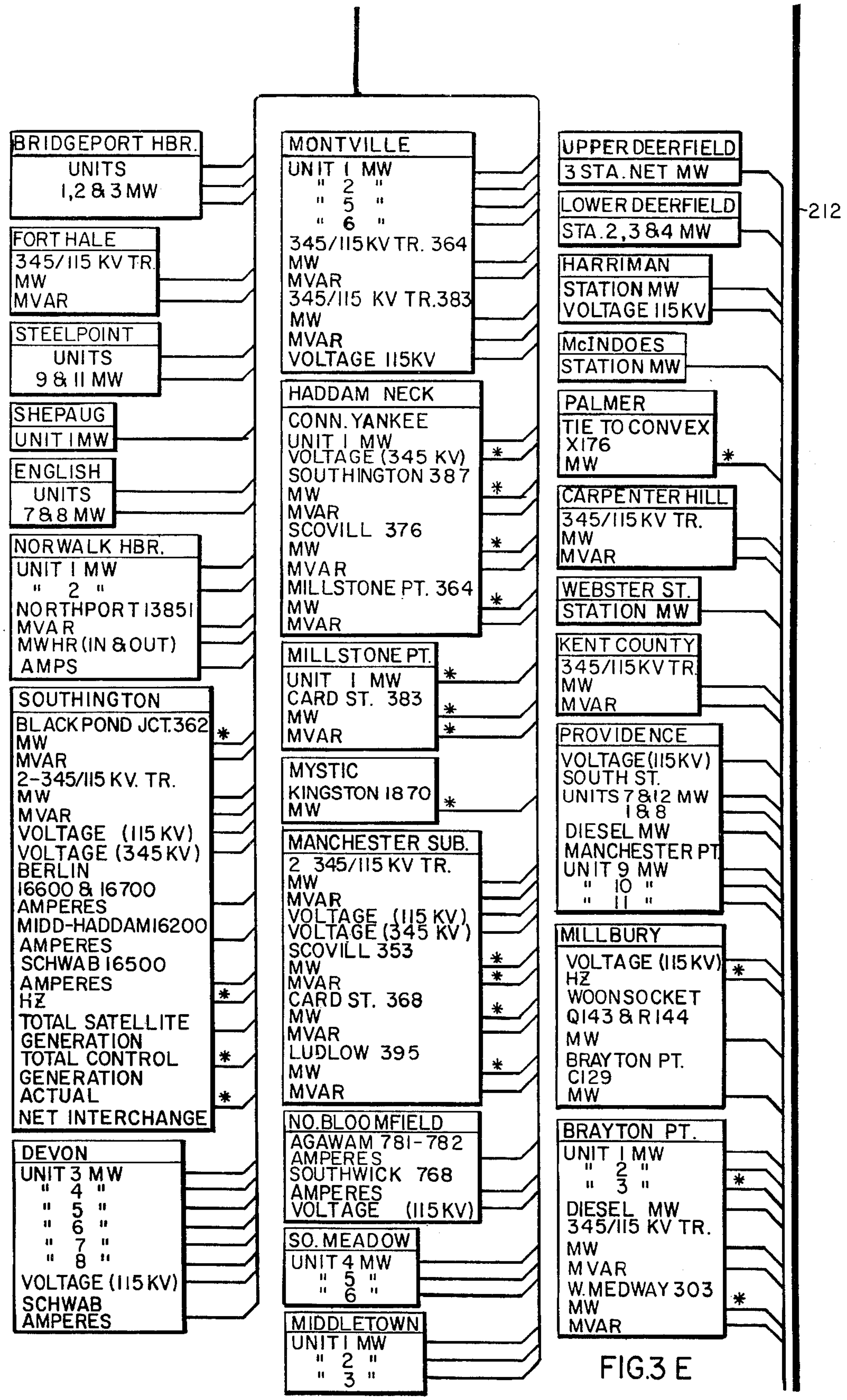
Figure 3F:
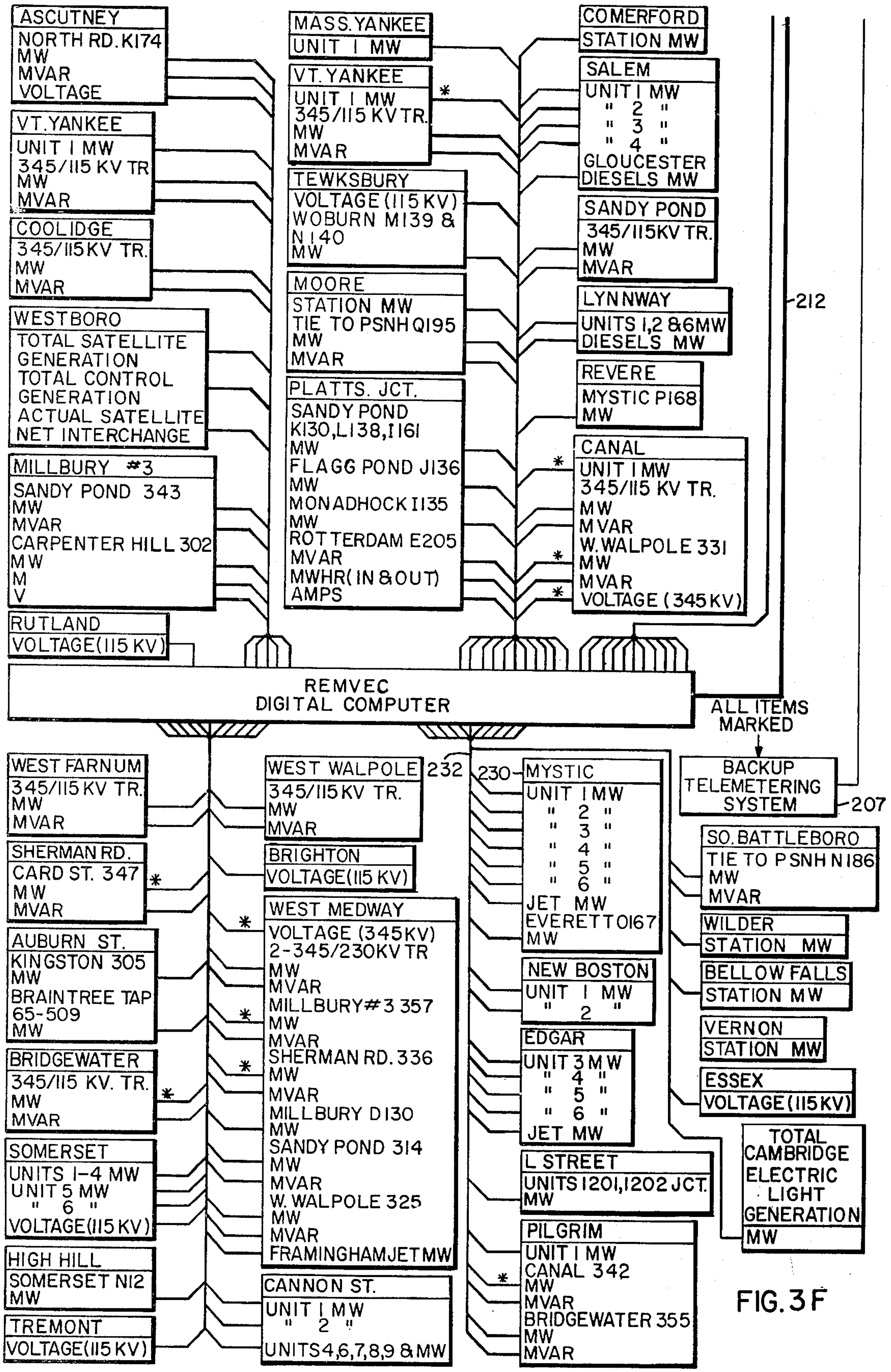

Within each data box, there is denoted a name or names which are bus names where bus correspondence exists. Immediately under the names in the data boxes, there are listed the data items which are measured and telemetered to the associated group computer. An asterisk indicates parallel direct telemetry to the regional dispatch computer 111 through boxes 206, 207 (FIGS. 3C, 3DD) and 208, 209 (FIG. 3D). Regional intercomputer data link channels are indicated by lines 210, 212, 214 and 216. A line 218 provides an inter-regional data channel between the regional dispatch computer 111 and a New York power pool digital computer 220.

Reference is made to data box 222 in FIG. 3D to provide a first illustration of the information content of the data acquisition schematic diagram. Thus, the box 222 corresponds to the Maine group generation bus called YARMOUTH and at that bus MW values are telemetered for generation units 1, 2 and transmitted over a data link 224 to the Maine group computer 70. Another box 226 pertains to a regional system generation bus compressed into another bus in the network 50, i.e., the Louden bus. The data box 226 is called MASON and MW values for generation units 3, 4 and 5, volt-amperes for a 345 KV/115 KV transformer associated with the MASON bus and MW and MVAR values for the 115 KV line are telemetered to the Maine computer 70 over a data channel 228.

In data box 230 (FIG. 3F), the name MYSTIC indicates correspondence to the bus MYSTIC near the top left of FIG. 1D and the name EVERETT indicates correspondence to the bus EVERETT near the top left of FIG. 1D. MW values for generation units 1 through 6 and a jet generation plant are telemetered for the MYSTIC bus to the REMVEC computer over a data link 232. A single MW value is telemetered over the link 232 for the EVERETT bus.

Various tieline data boxes including box 234 and the data boxes within dashed lines 236 and 238 are linked to the New York power pool computer 220 and/or the regional dispatch computer 111 for purposes connected with power interchange. Block 215 in FIG. 3C provides telemetered inputs to the computer 111 from various data boxes for total control generation and actual satellite net interchange.

III. Hybrid Loadflow Computer Arrangement

The digital security computer 110 and the analog network simulator 302 are included in a hybrid loadflow computer arrangement 250 (FIG. 2) which operates with the regional dispatch computer 111 and the data acquisition subsystems 204 to provide security monitoring functions in the regional security and monitoring control system. As subsequently more fully considered herein, security monitoring is provided by network loadflow solutions for on-line data, optimum daily forecast data and hypothetical case data.

A. Analog Network Simulator

The DC analog network simulator 302 is essentially an analog computer which operates as an economically produced and flexibly usable model of the AC power system network 50 through a unique combination of modules representative of elements of the network 50. Generally, the model is modularly organized to provide for high speed AC loadflow solutions through computational interaction with the digital security computer 110 in a hybrid loadflow computer arrangement.

Figure 5A:
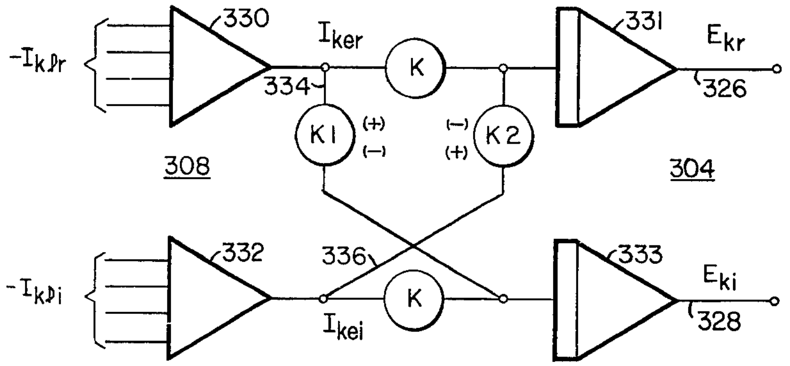
FIG. 5A shows a schematic diagram of a bus module usable in an analog network simulator portion of the hybrid loadflow computer arrangement.
Figure 5B:
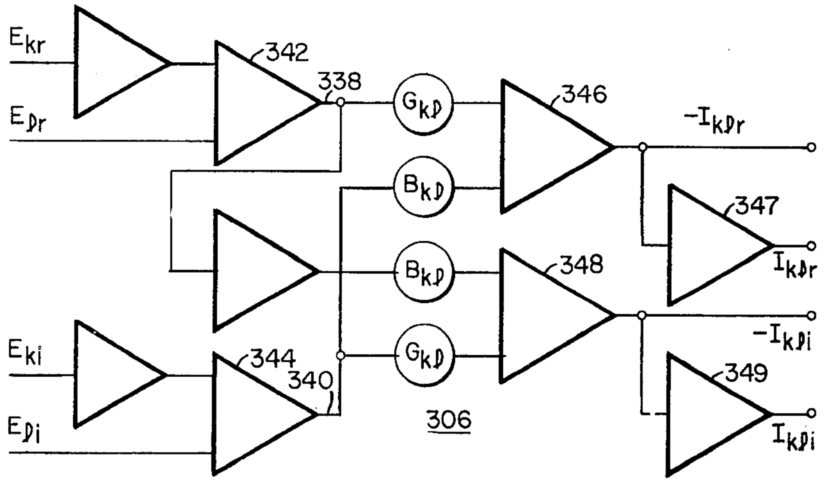
FIG. 5B shows a schematic diagram of a line module usable in the analog simulator.

Each internal system line in the network 50 is represented by a line module and each predetermined nodal point or bus is represented by a bus module. Tielines are reflected as real and reactive generation or load power flow in the software portion of the hybrid loadflow computations. In FIGS. 5A and 5B, there are shown schematic diagrams of bus and line modules 304 and 306 usable in the analog network simulator 302. Actual modular circuitry employed in the simulator 302 is described in connection with FIGS. 6A, B and 7A, B.

Figure 5C:
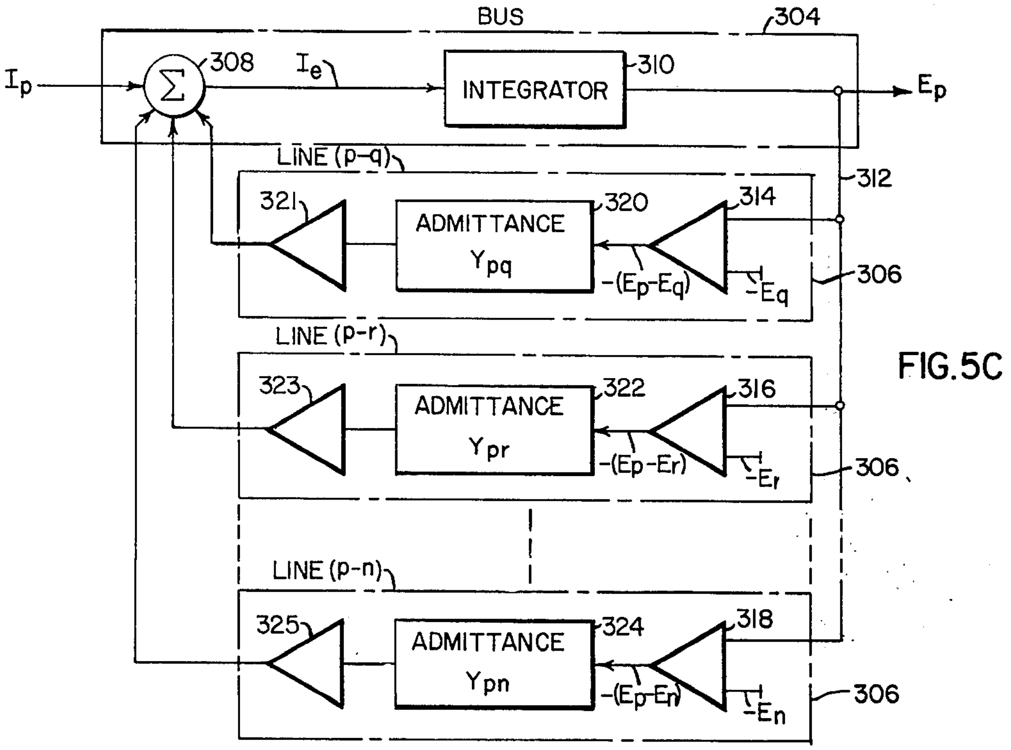
FIG. 5C shows a schematic diagram of interconnected line and bus modules.

In FIG. 5C, there is shown a schematic diagram of the manner in which a bus module p and line modules q-n are interconnected to provide an analog voltage solution for that bus with the application of an externally determined bus injection current. The current $I_p$ is a bus injection current representative of net current flow into or out of the network through the bus p as determined externally by the digital security computer 110 for input to the bus module p. The voltage $E_p$ is the bus p phasor voltage for which a solution is to be reached by error current integration, and the voltage quantities $E_q$, $E_r$ and $E_n$ are bus phasor voltages obtained from bus modules q, r and n through the respectively indicated line modules (p-q), (p-r) and (p-n) in correspondence to the configuration of the simulated power network.

Generally, a bus is a node that connects one or more transmission lines and usually has attached to it one or more generation units or loads or both. If no generation and no load are directly applied to a bus, it is designated as a junction bus. In operation, the bus and line module circuits in FIG. 5C interact to force Kirchhoff's current law to be observed for the bus p. As a result of summing the bus injection and line currents entering or leaving the bus p, an error current $I_e$ is generated by a summer 308 and applied to an integrator 310.

The voltage output $E_p$ from the integrator 310 is applied through a connector 312 to the inputs of comparator amplifiers 314, 316 and 318 in the line modules. The respective voltage differences between the bus voltage $E_p$ and the bus voltages $E_q$, $E_r$ and $E_n$ are applied to Pi section series branch admittance equivalents 320, 322 and 324. Output currents from line module output amplifiers 321, 323 and 325 represent line currents which flow into or out of the bus p and accordingly are summed and the sum is differenced with the injection current $I_p$ at the summer 308. Integration continues until the output voltage $E_p$ reaches a value at which no error current is generated by the summer 308.

As shown in greater schematic detail in FIG. 5A, the bus module 304 includes separate circuit channels 326 and 328 for processing real (X) and imaginary (Y) components of the bus currents and voltages. By processing phasor quantities in Cartesian coordinates, analog computation of sines and cosines in polar coordinates is avoided. Further, direct voltages are employed to signify phasor values by voltage level without need for an AC frequency simulation parameter and associated hard-wired capacitor and inductor simulation elements otherwise required in the direct but costly and relatively inflexible simulation techniques of conventional AC network models.

The summer 308 considered in FIG. 5C includes a real error current amplifier 330 and an imaginary error current amplifier 332 and the integrator 310 includes real and imaginary integrators 331 and 333 which generate the phasor solution voltage components. all of the input currents flowing into or out of the bus 304 in FIG. 5A are designated by the quantities $-I_{klr}$ and $-I_{kli}$. A gain element K (resistor) is employed for the phasor error current in each circuit channel 326 or 328. Cross-coupling error signal paths 334 and 336 with respective gain elements (resistors) K1 and K2 are employed between the real and imaginary channels 326 and 328 for stabilization of the circuit operation. Crossover stabilization is needed primarily because of high differential gain otherwise produced in non-crossed channels as a result of the fact that line susceptance B typically has a much higher value than line conductance G for any particular transmission line. Further, bus circuit stabilization is achieved by a conjugated feedback control loop, i.e., one in which the real component of directed line current(s) is applied to the corresponding bus module without polarity inversion whereas the imaginary component of directed line current(s) is applied to the corresponding bus module with polarity inversion.

As in the case of the bus modules 304, the transmission line modules 306 are provided with separate circuit channels 338 and 340 for the real and imaginary components of line current. Real bus voltages $E_{kr}$ and $E_{lr}$ are applied to a comparator amplifier 342 in the real signal channel 338 and the imaginary components of the bus voltages $E_{ki}$ and $E_{li}$ are applied to a comparator amplifier 344 in the imaginary signal channel 340. Output real and imaginary line currents $-I_{klr}$ and $-I_{kli}$ and their complements are generated in correspondence to the phasor bus voltage differences by amplifiers 346, 347, 348 and 349 for application to bus modules. The quantities $G_{kl}$ and $B_{kl}$ represent gain elements (resistors) which are dependent on real and reactive components of the simulated line series branch admittance. The amplifiers 342, 344 and the amplifiers 346, 347, 348, 349 in FIG. 5B correspond respectively to the schematically represented amplifiers 314, 316, 318 and 321, 323, 325 in FIG. 5C. In both FIGS. 5A and 5B, *k* and *l* designate general busses k and l which can in particular be bus p, bus q, etc. in FIG. 5C.

In the present embodiment of the invention, bus and line modules are provided by electronic circuits arranged on printed circuit boards. Economically attractive integrated circuit operational amplifiers and other circuit components including fixed and variable resistors and amplifier feedback capacitors are employed in providing modular circuit embodiments similar to the circuit modules 304 and 306 of FIGS. 5A and 5B. A plurality of modules are included on each printed circuit card and the cards are assembled in a plurality of panels for interconnection and formation of the analog model of the network 50.

Figure 6A:
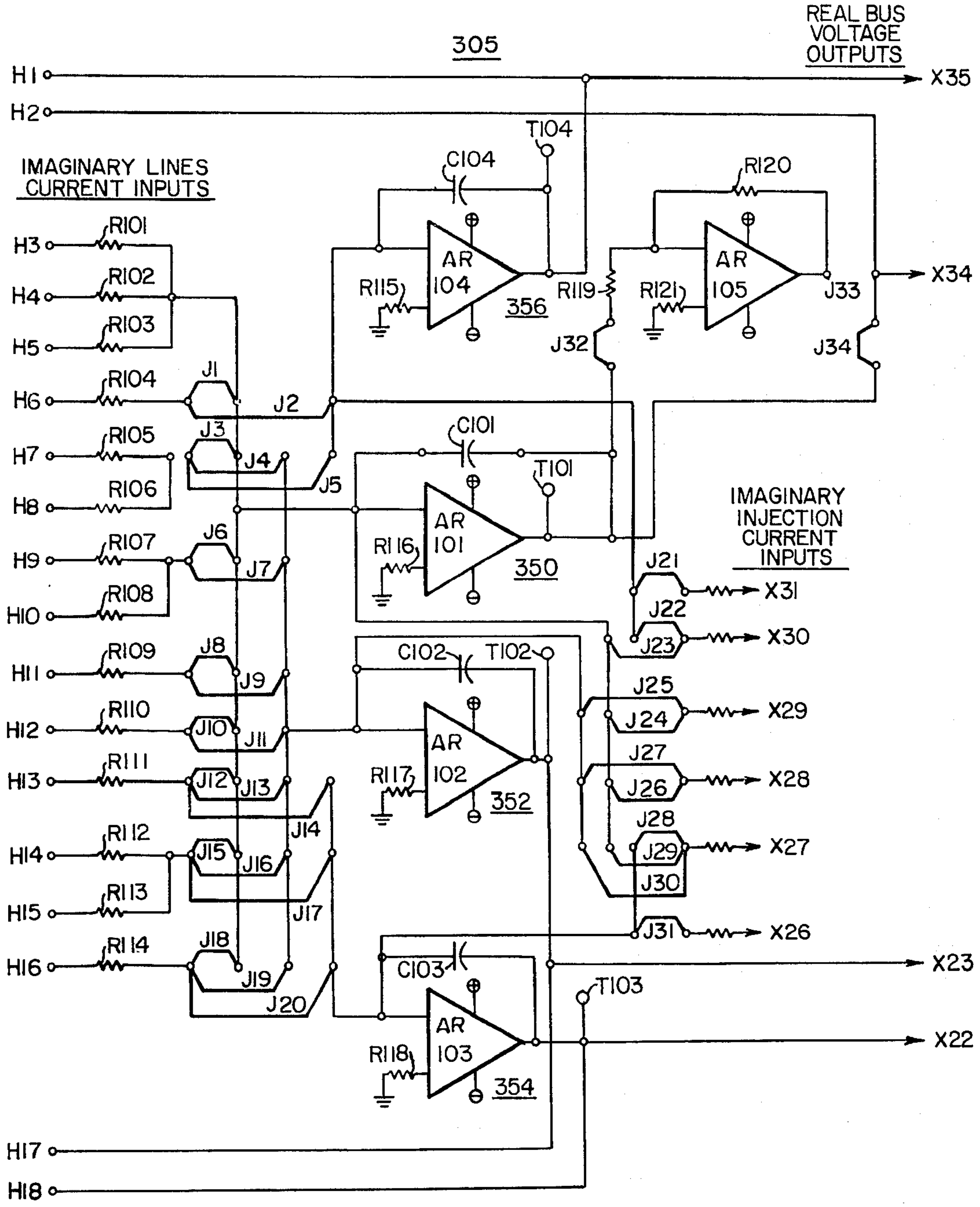
FIGS. 6A and 6B schematically show a printed circuit bus module card employed in the analog simulator.
Figure 6B:
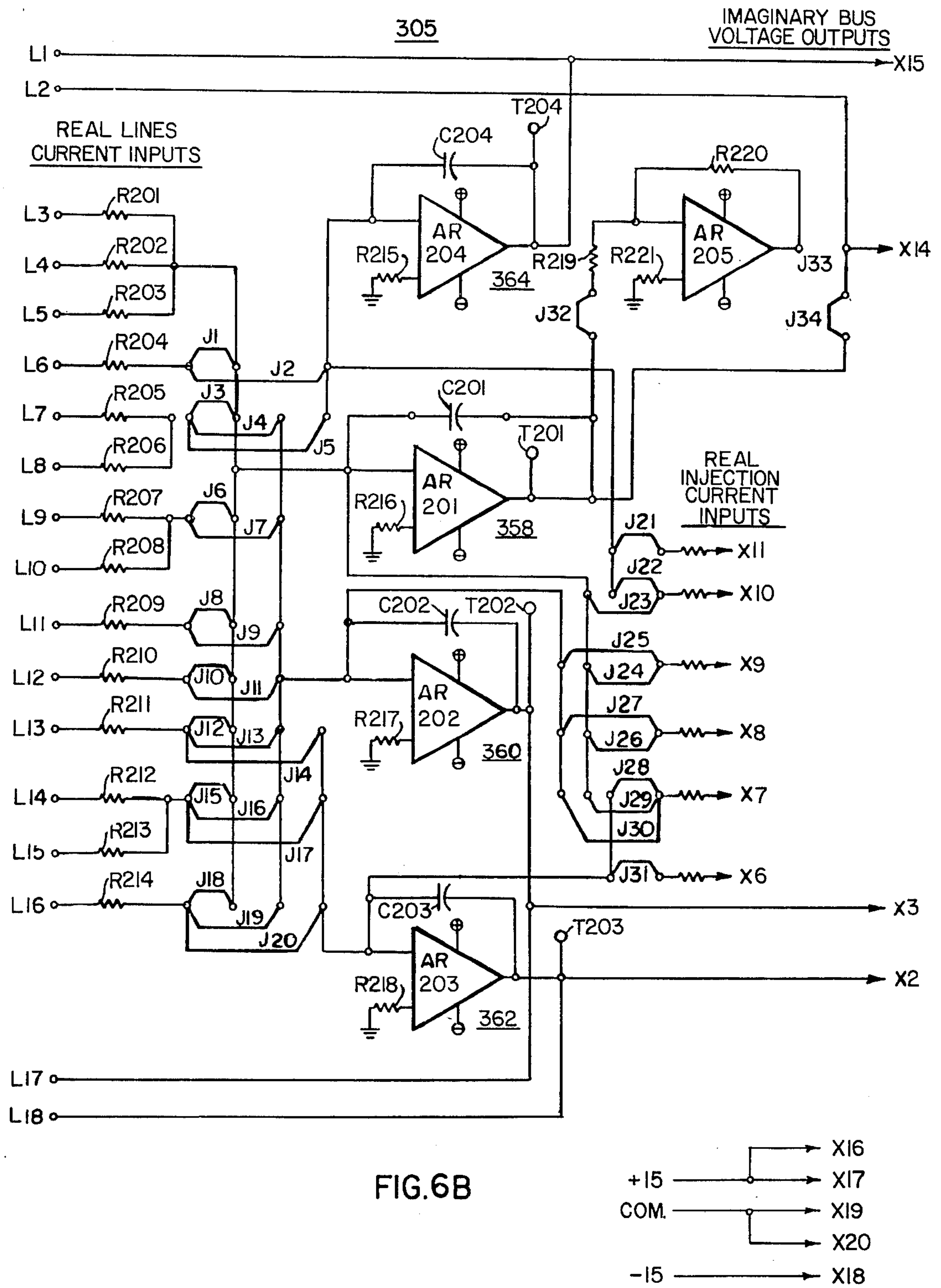
Figure 7A:
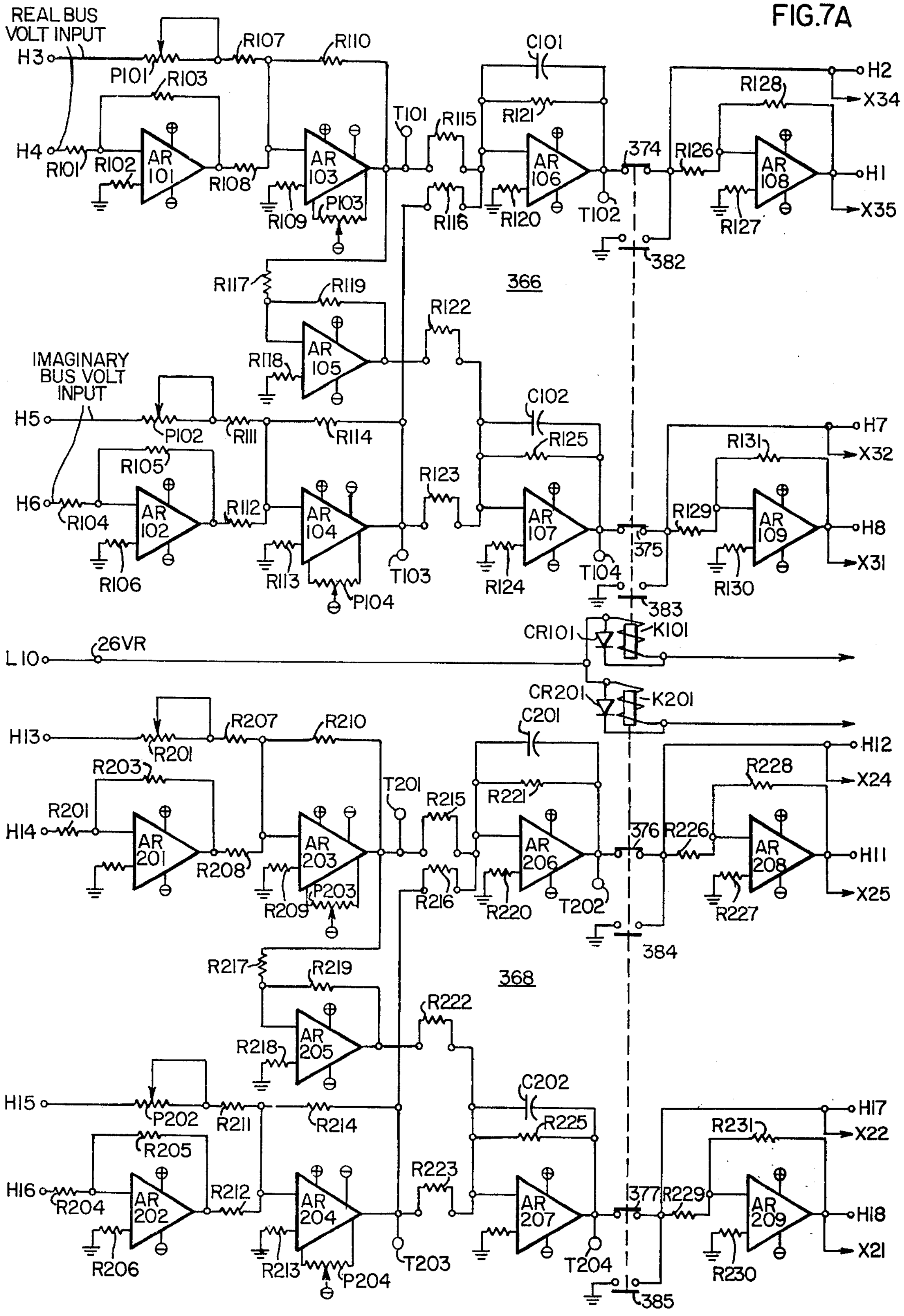
FIGS. 7A and 7B schematically show a printed circuit line module card employed in the analog simulator.
Figure 7B:
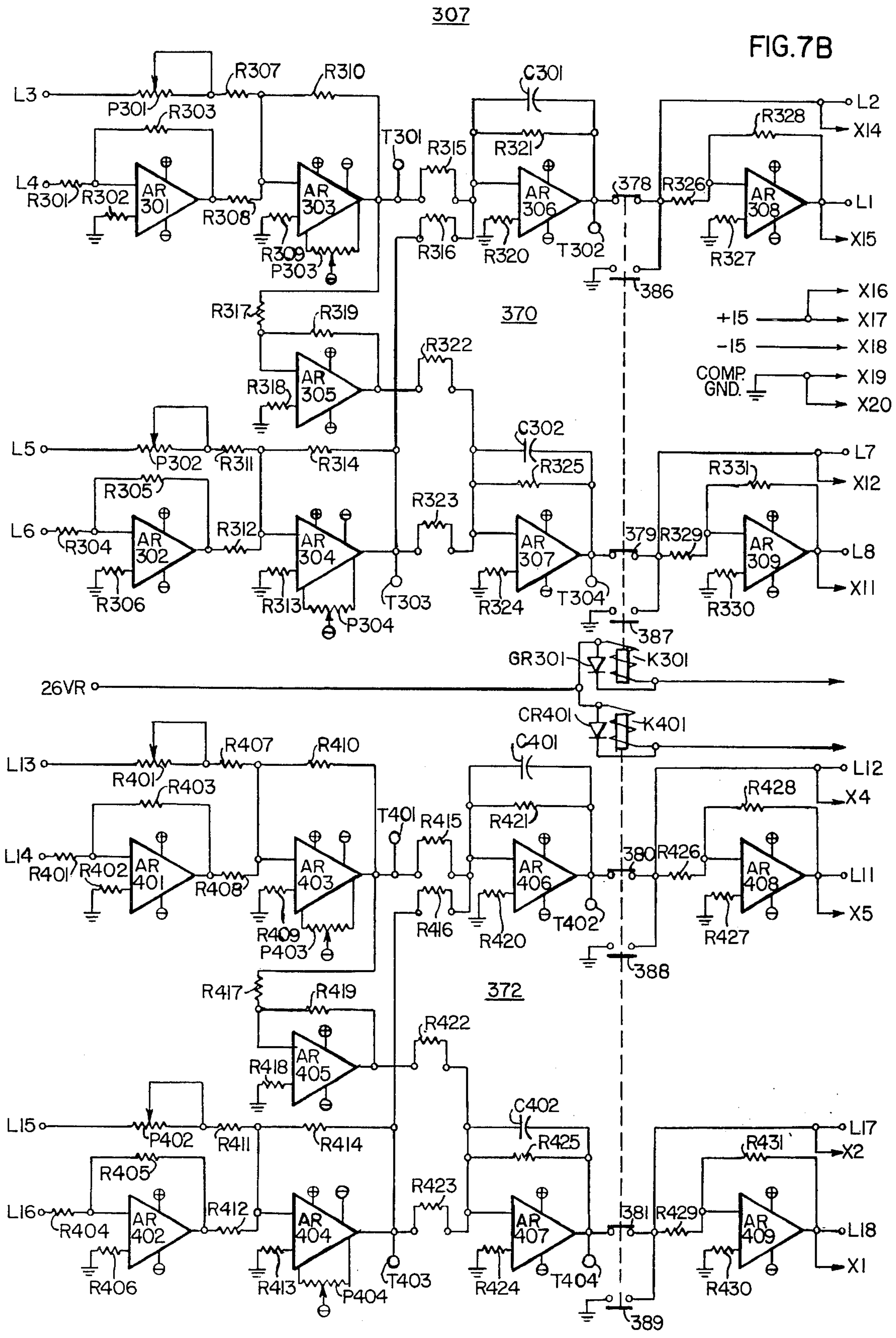

Specifically, as shown in FIGS. 6A and 6B, four bus modules are provided on each bus card 305 and, as shown in FIGS. 7A and 7B, four line modules are provided on each line card 307. A total of 10 panels are employed to represent the network 50 and up to 16 line and bus cards 305 and 307 can be included in each panel. Interconnections between line and bus cards are made through wiring in the back of the panels. To minimize the length of interconnection wiring, bus and line cards are alternately placed in the panel locations. Front connectors on the cards 305 and 307 are employed to make voltage outputs to the analog to digital converter and to accept injection current inputs from the digital to analog converter and line outage signals from the line outage CCOs. Bottom connectors in the panels are employed to make interconnections between panels as required. Reference is made to Appendix I where there are included tabular representations of the panels used for the network 50.

Figure 10:
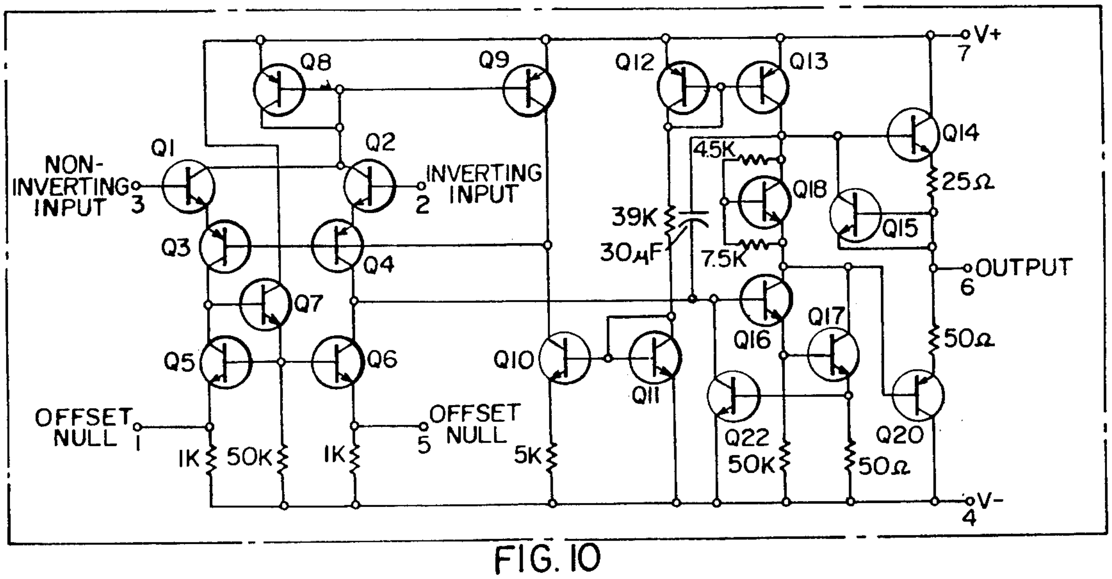
FIG. 10 shows a schematic circuit diagram for an integrated circuit operational amplifier employed in the bus and line modular circuitry.

As shown in FIGS. 6A and 6B, each bus module card 305 includes respective real current operational amplifier circuits 350, 352, 354 and 356 and imaginary current operational amplifier circuits 358, 360, 362 and 364 which function as summing integrator circuits. Stabilization is provided for bus card modular circuit operation by negative imaginary line current feedback in the manner previously described. In addition, the previously considered real and imaginary bus module channel crossover is implemented, in this case by applying real and imaginary bus injection and line currents to the amplifier circuits which respectively generate imaginary and real bus voltages. Integrated circuit operational amplifiers such as Amelco 741CE units, represented schematically in FIG. 10, are respectively employed as amplifier block elements AR101 through AR104 and AR201 through AR204 in the respective amplifier circuits. Amplifier block elements AR105 and AR205 and the respectively associated amplifier circuitry are not employed in the present embodiment of the invention.

As an overview, it is noted that the rightmost portion of the bus card 305 provides imaginary voltage computations while the leftmost portion of the bus card 305 provides real voltage computations. The two parts of the card are accordingly substantially identical and in combination provide for modular representation of up to four busses.

The manufacturing drawing numbers used to identify the various circuit elements such as the resistors and amplifiers are coded to indicate whether they are associated with real or imaginary computations and, as applicable, which of the four busses they are associated. A numeral 1 in the most significant digit location such as the 1 in R101 indicates an element associated with real voltage computation. A numeral 2 in the most significant digit location indicates an element associated with imaginary voltage computation. Similarly, the numeral in the least significant block element AR103 designates the particular bus module circuit on the card 305 with which an element is associated.

Line currents transmitted from the line cards 307 enter the bus card circuits through resistors R101 through R114 and R201 through R214. Jumpers J1 through J20 provide means for accommodating varying numbers of line connections to a bus so that the model can be conformed to the network 50 in FIG. 1. Resistors R122 through R127 and R222 through R227 provide for entry of up to four injection currents into the bus amplifier circuits from the digital to analog converter.

In order to preserve desired resolution, a predetermined per unit scaling is provided by analog simulator input resistors for the bus injection currents. Similarly, per unit scaling is employed for the analog phasor solution voltages and the line admittances. In some instances, unusual load power or bus generation power requires a special scaling for the bus injection currents and jumpers J21 and J31 provide for employment of two additional resistors in the group R122 through R127 or R222 through R227 to achieve a different scaling. Reference is made to Appendix I for particular per unit scaling values used in the present case.

To obtain high resolution for the analog network simulator 302, the per unit voltage scaling is made incremented with reference to the slack bus voltage level. Thus, in this case, the operational amplifiers have a usable output range of 24 volts from −12V to +12V and output voltage range and resolution are lost by the use of any bias to hold the amplifier output voltage at an elevated value corresponding to an absolute phasor bus voltage which is per unit scaled. Instead, the phasor bus voltages are incrementally referenced in per unit scaling to the slack bus thereby making substantially all of the amplifier output voltage range available for functioning of the simulator. The slack bus voltage level is OV DC referenced to analog hardware ground for both real and imaginary components, and incremental scaling relative to the zero voltage slack bus is made possible by the avoidance of analog hardware grounding corrections elsewhere throughout the analog network simulator 302. Simulation of power system ground paths is instead provided as software functions.

Computed real and imaginary bus voltage components are generated at operational amplifier outputs designated by the symbols T101 through T104 and T201 through T204. The analog solution bus voltages are transferred through the analog to digital converter for entry into the system security computer 110 in the hybrid loadflow solution process in a manner considered more fully subsequently.

Although zero slack bus reference voltage can be provided simply by grounding the slack bus output voltage, a specially modified bus card 305 is employed to provide a ground reference voltage in this embodiment or if desired other reference voltage levels in other embodiments. A bus card 305 is modified to form the slack bus card 366 by disconnecting the operational amplifier AR102 and its associated circuitry in the real portion of the card and establishing a direct circuit for the slack bus injection current from grounded input resistor R125 through the jumper J27 to terminal H17 where it is transmitted directly to the lines connected to the slack bus. The slack bus circuitry is also provided with the sum of the imaginary parts of the line currents connected to it at output T103 by means of operational amplifier AR103 which has a resistor 368 connected in its feedback circuitry in place of the standard bus card capacitor C103. The T103 output is not employed in the present embodiment. Like modifications are made in the imaginary part of the slack bus card 366 in the manner described for the real part.

Similar to the case of the bus cards 305, the line card 307 also includes four modular circuits which provide for simulating four lines in the power network 50. As shown in FIGS. 7A and 7B, respective line simulating circuits 366, 368, 370 and 372 include circuit elements representing an implementation of the schematic circuit described in connection with FIG. 5B and designated by manufacturing drawing numbers in which the most significant digit signifies the number of the modular circuit on the card 307. In each modular line circuit, the upper part of the circuitry carries real line current and the lower part of the circuitry carries imaginary line current.

As shown in FIG. 5C, each line module is connected to two bus modules and a total of four input connections are therefore required to process both real and imaginary currents in the line module. Accordingly, the bus voltage inputs are applied through resistors R101 (H4) and R104 (H6), R201 and R204, etc. and potentiometers P101 (H3) and P102 (H5), P201 and P202, etc. in the modular circuits of FIGS. 7A and 7B. Amplifiers AR101, AR102, AR201, AR202, etc. operate as inverters on one of the two input bus voltages to each line module so as to provide for current flow out of one and into the other of the two line connected bus modules. Amplifiers AR103, AR104, AR203, AR204, etc. develop the bus voltage difference and correspond to amplifiers 342 and 344 in FIG. 5B.

All line cards are interchangeable except that conductance resistor R115, R123 and susceptance resistors R116, R122 and similar resistors R215, R216, R222, R223, etc. are modified to reflect the particular series branch per unit admittances of the simulated lines. These admittances are obtained by the equation $G\text{-}jB = 1/(R+jX)$ from the line impedance data (reference Appendix I) for the various lines in the network 50 and they correspond to the conductance and susceptance elements $G_{kl}$ and $B_{kl}$ in FIG. 5B. The line current outputs are defined by the equation $I_{pq}^{r} = G_{pq}(E_p^{r} - E_q^{r}) + B_{pq}(E_p^{i} - E_q^{i})$ and $I_{pq}^{i} = -B_{pq}(E_p^{r} - E_q^{r}) + G_{pq}(E_p^{i} - E_q^{i})$ and applied to the bus cards 305 from the outputs of amplifiers AR106, AR107, etc. and inverting amplifiers AR108, AR109, etc. in correspondence to the amplifiers 346, 347, 348 and 349 in FIG. 5B. The subscripts p and q in the line current equations correspond to busses as in FIG. 5C and the superscripts r and i correspond to real and imaginary.

To provide for automatic line removal during operation of the hybrid loadflow computer, relays K101, K201, etc. are included in the line card 307. The line removal relays are double pole, double throw devices and they are operated by the lines outage CCO system in FIG. 4. Normally closed relay contacts 374 through 381 and normally open relay contacts 382 through 389 simultaneously ground the inputs of amplifiers AR108, AR109 or AR202, AR209, etc. and open to outputs of preceding stage amplifiers when particular line outages are to be implemented in the network model. Such outages represent real outages in the network 50 caused by an overload, a structural fault, periodic maintenance activity, etc. With amplifier grounding, no current output is available at line output terminals H1, H2, H7, H8, etc.

Transformers shown in the network 50 are represented by line modules. As considered at pages 317–320 of the Staggs and El-Abiad text subsequently referenced, a transformer has a Pi section impedance equivalent; in this case, the equivalent is represented at nominal turns ratio by a line module having gain resistor values which reflect the admittance corresponding to the series resistance and inductance of the Pi transformer equivalent. The impedance legs of the Pi equivalent are not in this case represented in the analog line module since it is desirable to avoid ground connections and thereby provide reduced hardware costs and enable incremental voltage scaling within the simulator 302 relative to the slack bus. Thus, any deviation of transformer tap ratio from nominal value requires some compensation for reactive and real ground current which corresponds to current through the Pi section equivalent leg admittances. However, satisfactory loadflow solution accuracy is achieved in the present embodiment by software compensation of reactive line to ground current only. Compensation for changes in series branch admittance requires changing the values of the line module gain resistors.

Figure 9:
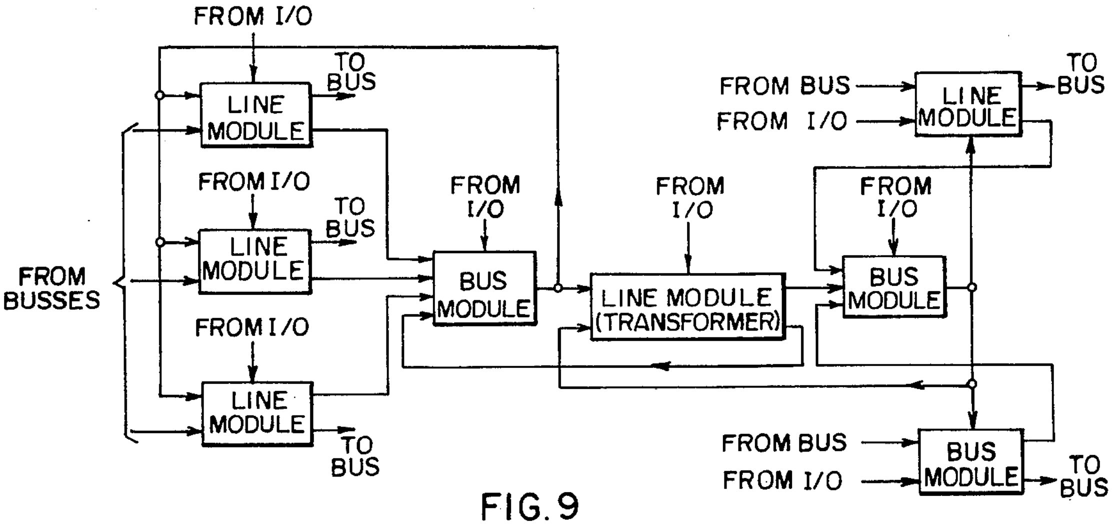
FIG. 9 shows an illustrative diagram of line, bus and transformer cards interconnected.

In the analog network simulator 302, the bus and line cards 305 and 307 are provided with the appropriate resistance values, the cards are interconnected with appropriate jumper disconnects on the cards to form a model of the network 50, and zero offset and gain adjustments are made. The individual line and bus cards function to produce solution bus voltages in response to digital computer determined bus injection currents. Reference is made to FIG. 9 for an illustrative interconnection of various card modules.

Any change in an injection current to a bus causes that bus to reach a new steady-state solution voltage which in turn causes busses to which it is connected to reach new steady-state solution voltages. The bus voltage solution process for the single bus injection current change thus may proceed throughout the simulator 302 with ripple like effects, but typically a single bus injection current change has significant effect on bus voltages for busses within a limited spread. With the application of multiple bus injection current changes to the simulator 302, similar circuit processes occur on an interacting basis. Typically, the simulator 302 settles shortly after bus injection current changes so that solution bus voltages can be read by the computer 110 for a fast hybrid loadflow solution as subsequently considered more fully. The analog simulator solution process corresponds to a parallel solution of network simultaneous equations, i.e., a multiplication of a column vector of injection currents against an inverted admittance matrix to obtain a column vector of bus voltages. It is also noteworthy that the analog solution process in the hybrid loadflow solution inherently provides for instant revision of the inverted admittance matrix as line outages occur as contrasted with the admittance matrix recalculation time in all digital loadflow solutions.

B. Regional Digital Security and Dispatch Computer System

In the implementation of the invention, any suitable digital computer can be employed. In the present case, a P250 computer system sold by Westinghouse Electric Corporation is employed for the security computer 110 and a like computer system is employed for the dispatch computer 111. If desired, a single computer having appropriate capability can be employed to provide the functions performed by the two separate computers 110 and 111.

The P250 is basically a Xerox Data Systems computer known as the SIGMA 2 with certain adaptations. Greater descriptive detail on the structural and functional nature of the P250 is presented in a Xerox Data Systems publication entitled XDS Sigma 2 Computer Reference Manual and issued in December 1969.

Figure 4A:
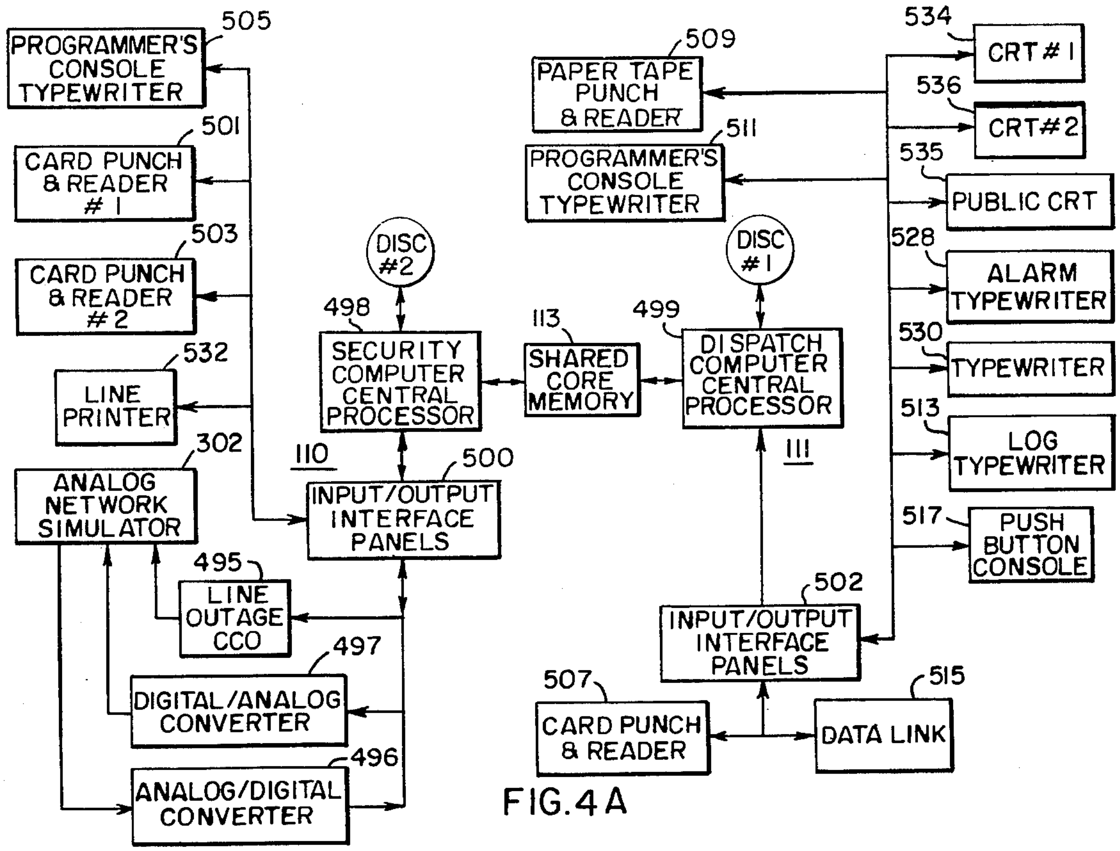
FIG. 4A shows a more detailed schematic diagram of a hybrid loadflow computer arrangement and a regional dispatch computer arrangement employed in the regional monitoring and control system shown in FIG. 2.
Figure 4B:
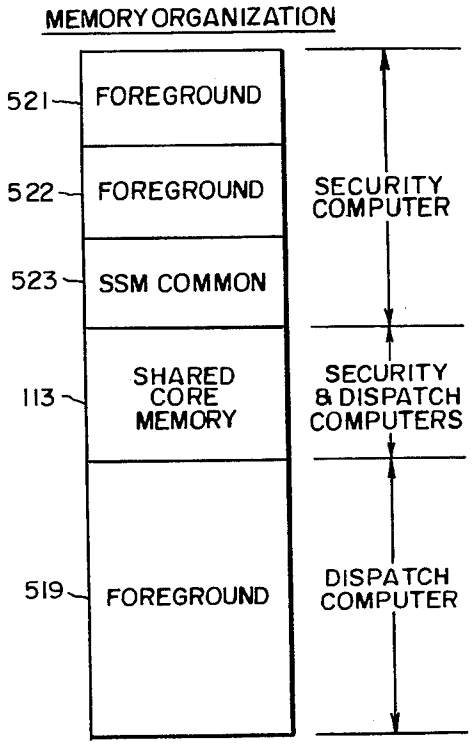
FIG. 4B provides a schematic representation of the core memory organization employed for the computers shown in FIG. 4A.

The shared core memory 113 is shown separately in FIG. 4A as it is in FIG. 2. Core memory for the exclusive use of the respective computers 110 and 111 is considered a part of the central processors. In FIG. 4B, there is shown a schematic representation of the overall core memory organization. Thus, all of the dispatch computer core memory is classified as foreground core as indicated by the reference character 519. Security computer core memory is divided into three classifications, i.e., foreground core 521, background core 522 and SSM common core 523.

As shown in FIG. 4A, interface panels 500 and 502 are employed to tie the security and dispatch central processors 498 and 499 to input and output devices or systems. Generally, the panels employed are included in the following list of available P250 panels:

| Panel | Use |
|---|---|
| A-Panels | A-Panels contain word and channel selection cards and interface circuitry for the Analog Input Subsystem. |
| D-Panels | D-Panels contain: word and channel selection cards for Contact Closure Output; Analog Output subsystems; channel buffer cards for contact closure input subsystems; and interface circuit cards for all direct channel peripheral devices. |
| I-Panels | The I-Panel contains the circuitry for the Interrupt Scan System. Up to 128 interrupts may be processed. |
| Q-Panels | Q-Panels contain multiplexer circuit cards for Multiplexed Contact Closure Input Subsystems, and Interrupt Filter cards for conditioning external interrupts. |
| X-Panels | X-Panels contain in the process interface cards for Analog Input, Analog Output, and Contact Closure Output Subsystems. |
| Y-Panel | The Y-Panel contains the circuitry for the I/O Coupler System which interfaces with the CPU. |

-Continued

For greater detail on P250 panel circuitry, reference is made to a publication issued in October 1969 by Westinghouse Electric Corporation entitled "P250 Documentation — Volume 5 Standard Process I/O Systems" and referred to as TP014.

Hardware/Software interfacing between the analog network simulator 302 and the security computer 110 in the hybrid loadflow computer arrangement is provided by a line outage contact closure output system 495, an analog to digital converter system 496 and a digital to analog converter system 497. Generally, the digital to analog converter 497 applies computer calculated bus injection currents to the analog network simulator 302 and it employs contact closure outputs to switch resistors in a digital potentiometer to convert a digital computer output value to an analog signal.

The contact closure outputs are formed by analog output relays formed in groups of 14 with each group referred to as a register. Each register has a word address and a channel address to which fourteen bit computer output data words are directed. Each of the relays in the analog output register corresponds to a bit in an output data word. A relay is set for each bit of a data word which is a one and a relay is reset for each bit of a data word which is a zero. The relay states develop a resistance pattern which in turn develops an analog signal corresponding to the data output word. For greater detail on the analog output system 497, reference is made to a 1967 publication issued by Westinghouse Electric Corporation, entitled "Analog Output Subsystem" and referred to as A004. If desired, solid state multiplexing or other types of analog output systems can be employed in place of the output system described for the block 496.

The contact closure output system 495 is employed to produce switching of the line modules 307 in the analog network simulator 302 in accordance with software determinations as subsequently more fully considered. Reference is made to the aforementioned publication TP014 for further description of a suitable contact closure output system.

Analog bus voltage inputs from the analog network simulator 302 are applied to the security computer 110 through the analog to digital converter 496. Preferably, multiplexed converter circuitry is employed such as that described in Xerox Technical Information publications XDS 98 03 24A High-Level Analog Multiplexer MR50, XDS 98 03 06A Analog Input Controller Model 7915, XDS 98 03 11A Multiplexer-Digitizer Model MD41 and SDS 90 16 28A Controller-Digitizer CD41.

The peripherals 112 for the security computer 110 include respective card punch and reader devices 501 and 503, a programmer's console typewriter 505 and a line printer 532. The dispatch computer 111 is provided with a card reader 507, a paper tape punch and reader 509 and typewriters 511, 513, 528 and 530.

Data link hardware 515 is also interfaced with the dispatch computer 111 to provide for data transfer with the satellite computers. Cathode ray tubes (CRTs) 534 and 536 are coupled to the dispatch computer 111 for purposes considered more fully subsequently. A CRT 535 provides for display of information of general public interest. The computer installation is also provided with a pushbutton console 517 which is tied to the dispatch computer 111 to provide an operator interface function.

Figure 11:
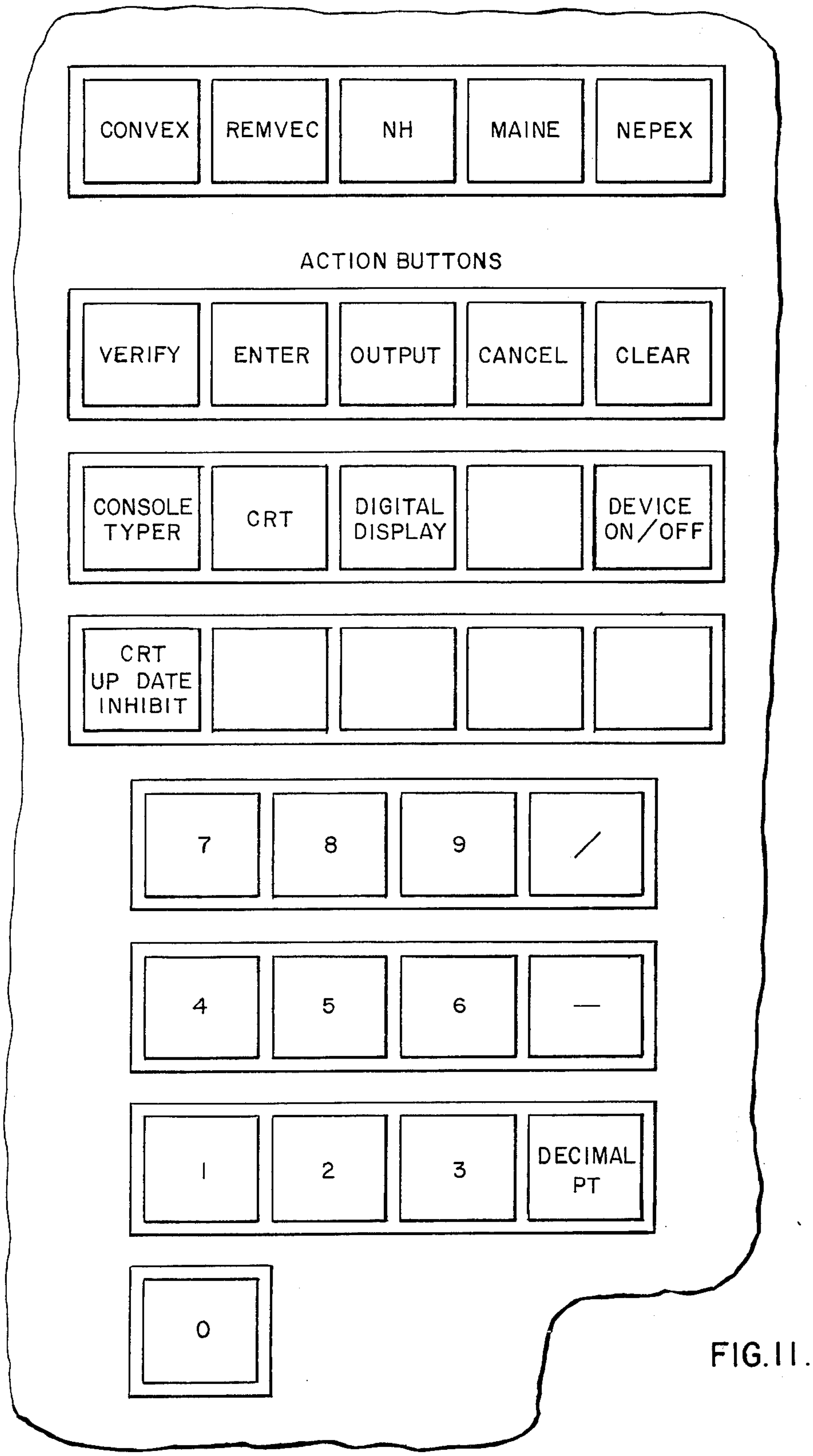
FIG. 11 shows a front plan view of certain pushbutton switches employed at a computer operator's console.
Figure 12A:
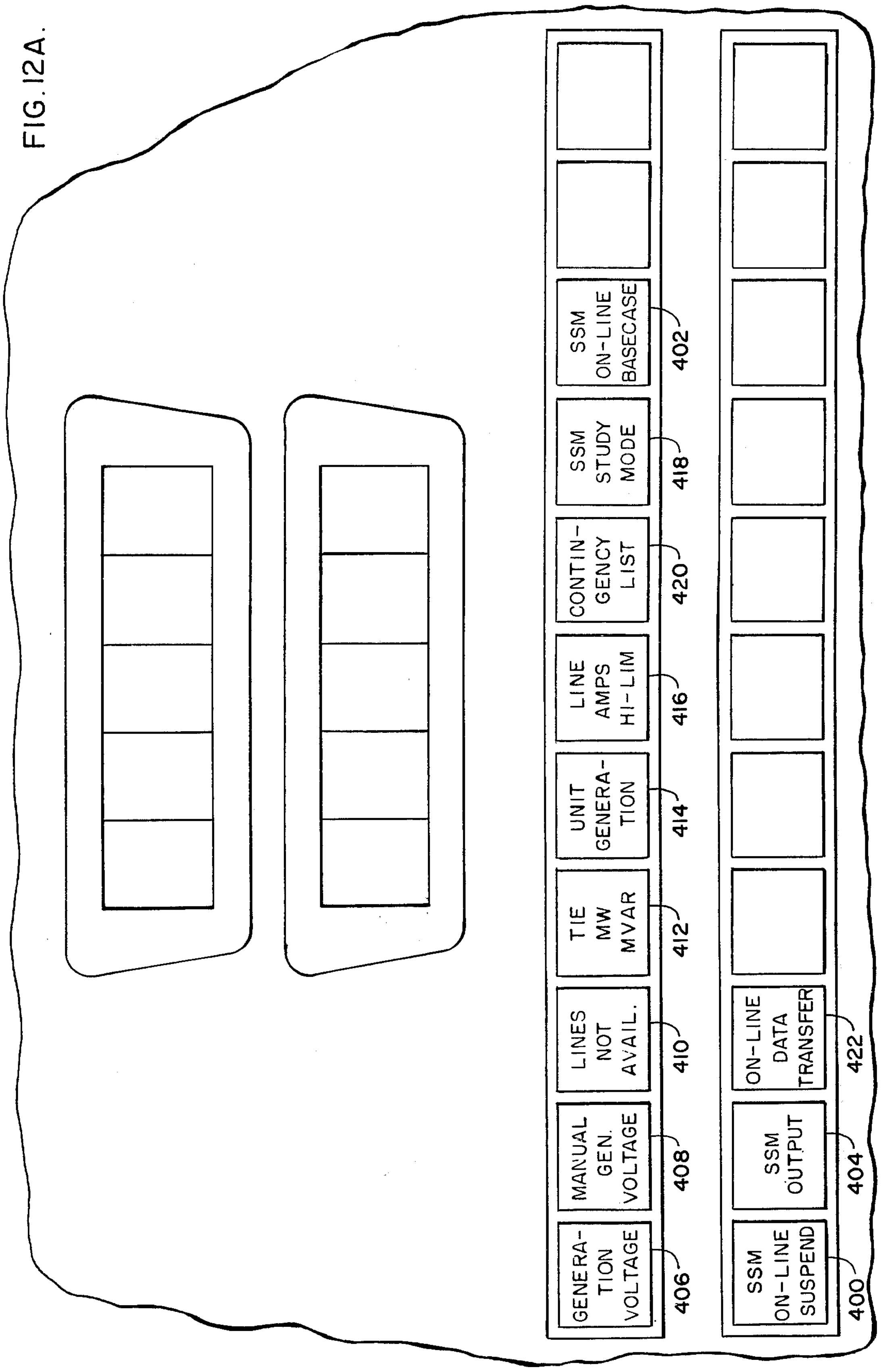
FIGS. 12A and 12B show additional pushbutton switches employed on a system security monitoring portion of the console.
Figure 12B:
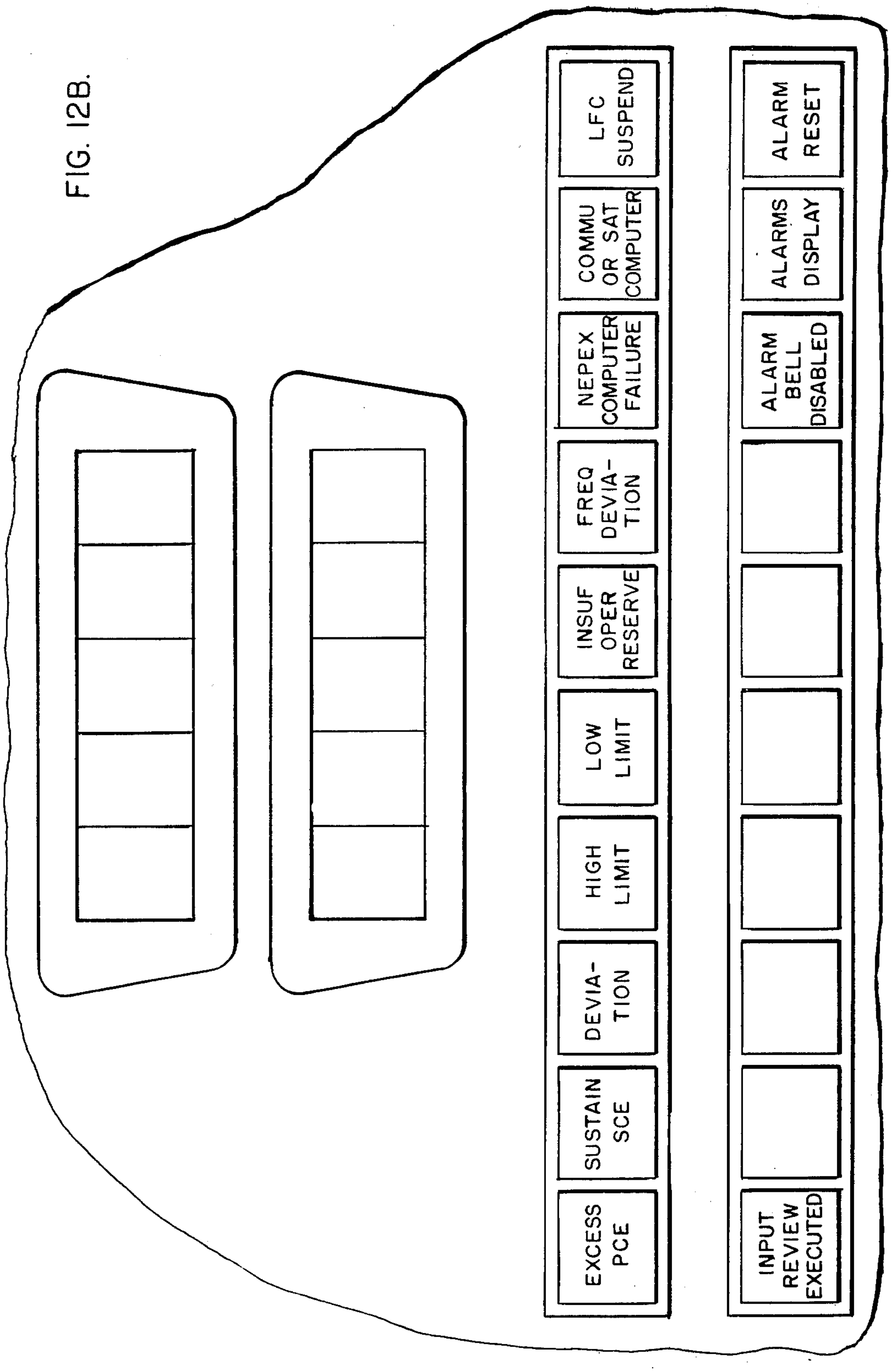

In FIG. 11, there are illustrated some of the over 200 pushbuttons associated with the computer system operation. FIGS. 12B and 12C show digital displays and various pushbuttons provided on a system security monitoring pushbutton console. The illustrated pushbuttons in FIGS. 12A, 12B and 12C are related to functioning of the security computer 110, i.e., regional or satellite select buttons and action pushbuttons are shown in FIG. 12A and security monitoring pushbuttons are shown in FIGS. 12B and 12C.

Generally, pushbutton switches 400 and 402 on the system security monitoring pushbutton console are used to suspend and restart on-line operation of the system security monitoring function. The suspended state is unsuspended by the use of the suspend button 400 and a CLEAR pushbutton and in that event a basecase loadflow solution is first run and then contingency case loadflow solutions are initiated from the last contingency case run prior to the suspension. The suspended state can also be unsuspended by pressing the pushbutton 402 to bid basecase and in that event the basecase loadflow solution is run and the contingency case loadflow solutions are started at the beginning of the contingency case list. Greater detail is subsequently presented herein on the basecase and contingency case loadflow solutions.

A pushbutton switch 404 provides for operator selection of a full printout or selectable printout parts of a loadflow solution in addition to normally provided printout of alarms. Pushbutton switches 406, 408, 410, 412, 414 and 416 provide for operator entry of the respective quantities indicated in FIG. 12A.

A pushbutton 418 provides for selecting study mode operation considered more fully subsequently, and a pushbutton 422 provides for on-line data transfer for use in the study mode loadflow solution. Operator entry of contingency cases on the contingency list is provided by a pushbutton 420. Greater detail on the functions of most of the illustrated pushbuttons is provided in Appendix I.

C. Program Systems For Regional Digital Security and Dispatch Computers

Figure 13A:
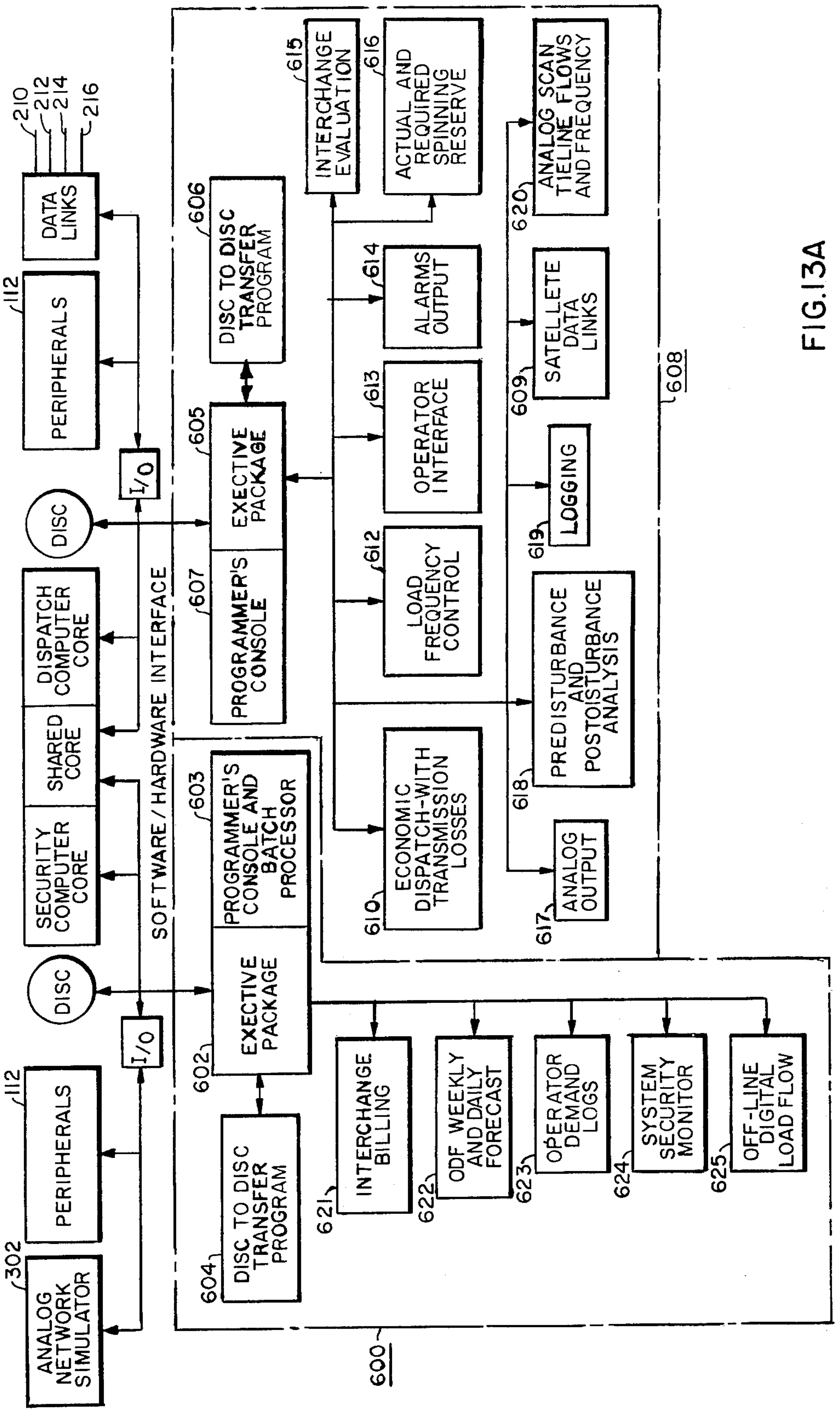
FIG. 13A shows a block diagram representative of the overall program organization for digital security and dispatch computers employed in the computer system of FIG. 2.

As shown in FIG. 13A, the system security computer 110 is operated by a program system 600 which includes an executive package 602 having standard modular P250 computer program parts. Generally, the executive package 602 controls the operation of the computer system input/output hardware and central processor hardware, and in so doing it determines the order The execution of other programs in the program system 600 and regulates the flow of data into and out of the security computer 110. A standard P250 batch processor 603 is also included as a part of the executive package 602 for use at the regional computer site in compiling, assembling and link-loading programs. Reference is made to Appendix I where there is provided a functional description of modules in the P250 executive package 602 and where there is provided a basic assembler list which identifies those standard elements of the P250 executive package included in the program system 600. the standard CCO handler module is slightly modified to allow the output of multiple output words with a single interrupt return. Various library subroutines are available for use with the executive modules. In other applications of the invention, the SIGMA2 computer can be provided with a standard executive package available to the end user from the SIGMA2 seller or from other software suppliers. In still other applications of the invention, other appropriate computer systems can be employed with standard executive packages capable of being used with them.

Reference is made to Appendix II for a program listing of an analog input program module and executive-related disc-to-disc transfer program modules 604 and 606 which are tailored to the particular computer system configuration herein described. The disc-to-disc module 606 is included as part of a program system 608 provided for the regional dispatch computer 111. Data transfer occurs between the discs through the shared core memory under control of the disc-to-disc programs. Generally, the program 606 searches a queue in the shared core memory to determine program requests for data transfer. The program 606 initiates requested transfers between the two computers 110 and 111 by setting flags which cause disc read and write operations to occur. The disc-to-disc transfer program 604 cooperatively functions with the program 606, i.e., the program 606 serves as the master in a master-slave relationship.

An executive package 605 similar to the executive package 602 is included in the regional dispatch computer program system 608. A standard P250 programmer's console module 607 is included as a part of the program system 608 to provide for program entry and program modifications.

The dispatch computer program system 608 employs a satellite data link program 609 which controls the incoming and outgoing flow of data between the dispatch computer 111 and the group computers over channels 210, 212, 214 and 216 (FIGS. 3C-3F). Acquired data is used by control and other programs in the dispatch computer 111 and it is made available for transfer to the security computer 110 through the shared core memory under the control of the disc-to-disc transfer programs 604 and 606.

The dispatch computer program system 608 further includes the following programs:

Economic Dispatch 610 — This program reflects transmission losses and it is run to provide generation distribution on a regional economic basis.

Load Frequency Control 612 — As considered in the aforenoted Mochon paper, this program develops regional generation demand from pool control error to regulate system frequency.

Operator Interface 613 — Operator pushbutton requests, CRT entries, digital readouts display and other operator functions provided by the peripherals 112 are interfaced with both computers 110 and 111 by the operator interface program.

Alarms Output 614 — Alarms detected by the monitoring of on-line data are processed by this program.

Interchange Evaluation Program 615 — This program makes economic choices of tieline power purchases required to meet pool load demand.

Actual and Required Spinning Reserve 616 — Spinning reserve calculations are made by this program for purposes considered more fully subsequently.

Analog Output 617 — This program interfaces with the executive package 605 and other control programs to cause the generation of analog output signals by the computer 111 in correspondence to determinations made by the control programs.

Pre-disturbance and Post-disturbance Analysis 618 — Certain data items are provided with limited historical profiles for disturbance analysis purposes.

Logging 619 — This program causes logging printout of various data items on an hourly or daily basis or on operator demand, and the printout occurs on the high speed line printer through the security computer 110.

Analog Scan 620 — Interaction between this program and the executive package 605 provides for dispatch computer entry of telemetered analog values including tieline power flows and frequency.

The security computer program system 600 further includes the following programs:

Interchange Billing 621 — In this program, generation MWHR interchanged between companies are supplied by card input and the company loads are calculated from company generation and interchange values; actual production costs are calculated and the total system load is redispatched as if the regional pool did not exist so as to determine the total savings realized by the pooling effort.

Optimum Daily Forecast 622 — This type of program is often referred to as a hydrothermal coordination and unit commitment program; card input data related to availability of generation units in the system is used to determine the next day's generation schedule or to make a study determination of the generation schedule for any day past or future; the program also provides for a rerun for today's generation schedule with the possibility of data entry through the CRT; generation schedule printout on the line printer is provided for implementation of next day commitments on generation units or for analysis in the case of study runs; output data is also stored for use in security monitoring as generally considered subsequently herein.

Operator Demand Logging 623 — Various data items processed by the program system 600 can be output through the line printer by this program on operator demand.

Off-Line Digital Loadflow 625 — A Gauss-Seidel type loadflow solution is provided by this program for the network 50 to provide detailed off-line loadflow solutions for planning and other purposes. It is also used as a check on the hybrid loadflow results.

System Security Monitor 624 — This program generally provides loadflow solutions for regional system basecase data, regional system contingency case data, regional system study case loadflow solutions and security monitoring and alarm functions as described in greater detail in the following sections herein.

a. System Security Monitoring Program

The system security monitoring program 624 (SSM) interacts through the input/output circuitry with the DC analog network simulator 302 in the hybrid loadflow computer arrangement to provide rapid steady-state loadflow solutions for the AC power system for various on-line or off-line system security purposes. The loadflow solution provides for security monitoring of various system parameters which otherwise cannot be economically telemetered for monitoring purposes. Even in cases where telemetered values of particular parameters are available, the on-line loadflow solution provides a check on the reliability of the various telemetered values. Preferably, the system security monitoring program is executed to provide an on-line basecase loadflow solution, automatically specified contingency loadflow solutions, operator specified contingency loadflow solutions, network study loadflow solutions and optimum daily forecast (ODF) security check loadflow solutions.

The basecase solution is one which defines the state of the actual power system on the basis of the most recent on-line data for time varying variables and on the basis of stored data for relatively fixed parameters. In the security monitoring system, the hybrid loadflow computer arrangement and its system security monitoring program identify as a result of the basecase loadflow solution, or as a result of contingency or other loadflow solutions considered more fully subsequently, the occurrence of alarm conditions related to power system security. Security monitoring information display and recording are provided by the alarm typewriter 528 (FIG. 4A), the security console typewriter 530, the line printer 532 and the security console CRTs 534 and 536.

In this case, the on-line basecase loadflow solution is generated at the beginning of each basecase cycle, and a basecase cycle is initiated automatically after the completion of contingency case solutions in the last basecase cycle, after the end of a study mode or ODF loadflow solution or after an operator request for basecase. In the case of automatic cycling through on-line basecase and maximum contingency case loadflow solutions, a period of about fifteen minutes would typically pass between on-line basecase loadflow solutions.

A total of approximately 4K foreground core and 200 disc sectors are employed for the system security monitoring software. In addition, the SSM common core memory and some shared core locations are dedicated for data stored for use by the system security monitoring program.

As subsequently considered more fully, the system security monitoring program employs on-line data including telemetered generator power and voltage values and tieline power values obtained through the shared common core memory from the data acquisition system. In addition, the system security monitoring program employs stored "fixed" data and steady-state data including some operator entered variable data such as line changes which are not telemetered by the data acquisition system in the present embodiment of the invention.

System security is measured at least in part by the consequences of various possible events which have some probability of occurrence in the power system. Generally, such consequences can be ascertained with the employment of loadflow solutions based on a restructured system model corresponding to the actual power system as it is restructured in accordance with one or more of the contingency events. To provide a measure of system security, contingency cases are therefore hypothetically considered in the execution of the system security monitoring program in conjunction with operation of the analog network simulator 302.

In the present case, the contingencies considered are power generation losses, transmission line losses and tieline losses. Since it can be expected that the overall power system is planned and designed to withstand first level contingencies, only first level contingency cases are provided with loadflow solutions on an automatic basis between basecase loadflow solutions. Higher level contingency cases embrace combinations of losses identified by computer operator entries, and loadflow solutions are run for higher level contingency cases in each basecase cycle. An adjustable maximum total of contingency cases are allowed to be run between basecase loadflow solutions so as to limit the contingency case load on the computer duty cycle.

Figure 13B:
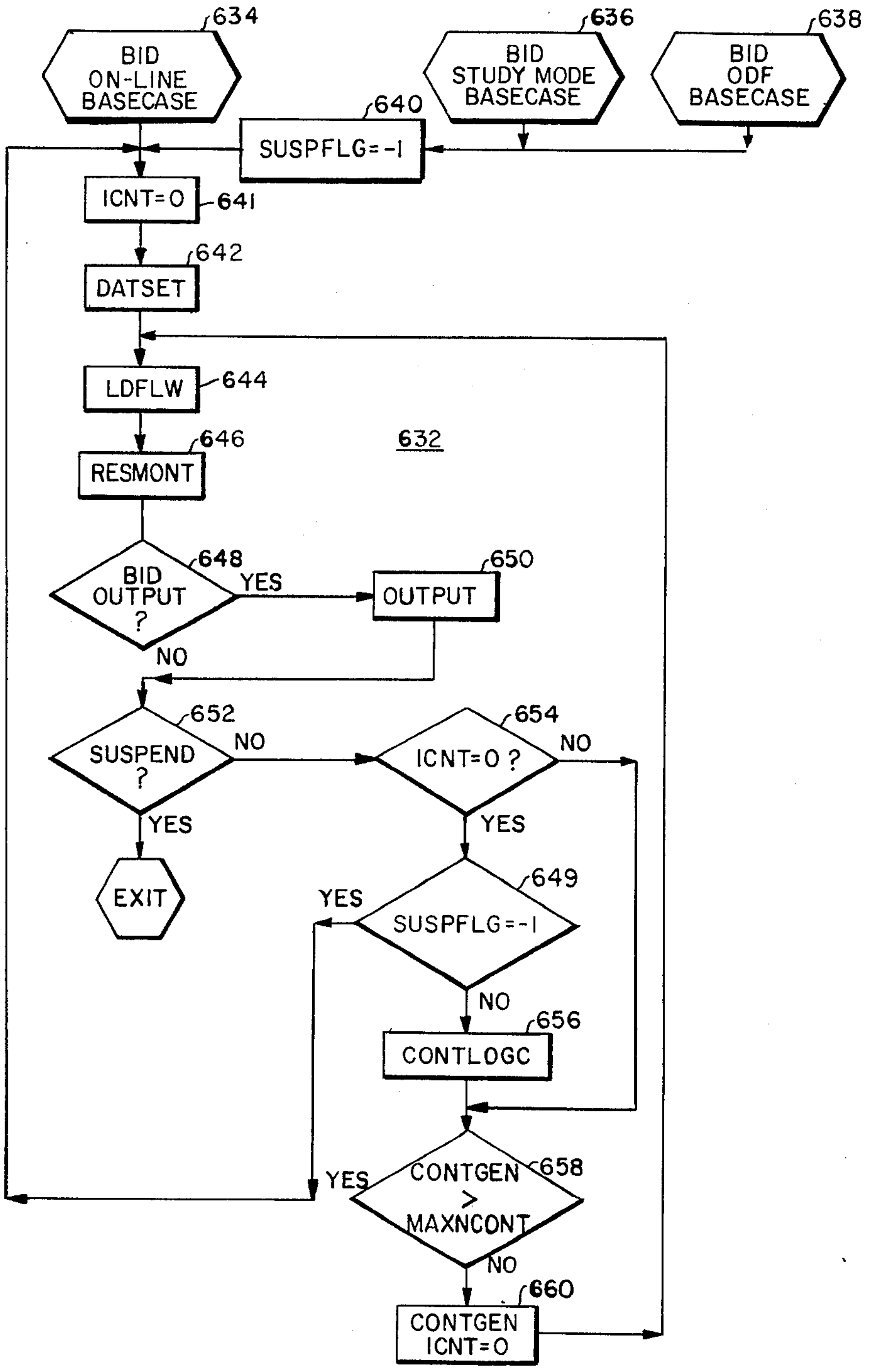
FIG. 13B shows a schematic diagram of a flowchart for a system security monitoring program employed in the security computer.

More particularly, there is shown in FIG. 13B a flowchart 632 for the system security monitoring program. Generally, the flowchart 632 provides an overview which is substantially representative of the more detailed task or subprogram flowcharts subsequently considered. However, some minor differences do exist. For example, some flag checks which are used for program routing are actually contained within particular tasks but the checks are illustrated in the flowchart 632 as being outside those tasks.

At the beginning of each new on-line basecase loadflow solution, the system security monitoring program is bid for a basecase run as indicated by block 634. At other points in time, a study mode request initiated by the pushbutton switch 418 (FIG. 12A) generates a basecase loadflow solution bid as indicated by block 636 and in that event system security monitoring program operations are interrupted to implement the bid. The system security monitoring program can also be bid by the optimum daily forecast program as indicated by block 638. When the optimum daily forecast program has completed its run in the security computer 110, the forecast results are stored and a basecase bid is placed to interrupt the present system security monitoring program run unless it is a study mode run and thereby to obtain a loadflow solution which provides a security check on the optimum daily forecast results. When a basecase loadflow solution is bid for the study or ODF mode, block 640 sets a flag SUSPFLG equal to −1 to control the subsequent flow path of the system security monitoring program.

At the entry point to the system security monitoring program, a contingency case counter ICNT is set equal to zero by block 641 and a data setup program DATSET is next executed by block 642 to provide preprocessing of stored on-line, steady state and fixed data so that data to be used in on-line basecase and other basecase loadflow calculations will be available in a form required for program operations. In on-line runs, some telemetered bus generation voltage values $V_G$ and telemetered bus generation power values $P_G$ and tieline real and reactive power values $P_{TL}$ and $Q_{TL}$ are derived from the data acquisition system through the shared common core memory. Real and reactive bus load powers $P_L$ and $Q_L$ are calculated from total power generation and stored distribution factor arrays. Other data including lines not available and generation bus voltage values $V_G$ which modify stored table or telemetered voltage values $V_G$ are obtained by operator keyboard entry with use of the CRT entry formats. In study or ODF runs, the program DATSET functions substantially as it does in on-line runs, but data input modifications are made. Greater detail on the data processing functions provided by the program DATSET is presented subsequently herein.

After the program DATSET has been run, a program LOADFLW is run to provide a basecase solution as indicated by block 644. The preprocessed data determined by the program DATSET is employed by the program LOADFLW in making bus injection current calculations for application through the digital to analog converter to the modularized analog network simulator 302 where bus voltages are calculated from the bus injection currents. The complex matrix equation $E = Y^{-1}I$ is rapidly solved by the analog network simulator 302 and the solution bus voltages are entered into the security computer 110 for use by the program LOADFLW in making new bus injection current calculations. The described LOADFLW process continues iteratively until an acceptable voltage solution is reached. As considered subsequently, LOADFLW employs modified DATSET data for loadflow calculations in contingency cases.

The bus voltage values for the loadflow solution values are stored on disc, and a program RESMONT indicated by block 646 is run after the LOADFLW block 644 to perform results monitoring and system security checking functions. The security checks in this instance include limit checking of bus voltages and line currents which are calculated from the bus voltages. Alarm values are identified to a RESMONT alarm program for printout by the security typewriter 530. The program RESMONT also functions through block 649 to cause program operations to exit if the system is functioning in the study or ODF mode.

After the program RESMONT has run, block 648 determines whether the loadflow solution is a study mode solution or whether the console pushbutton switch 404 has been activated to request a full or selected printout. If so, RESMONT data is made available for processing by the program OUTPUT in block 650 so that the appropriate information printout can be made. A full printout includes line MW and MV, bus voltage with respect to slack voltage and generator and load distribution information.

The system security monitoring program continues to a decision block 652 after the block 648 or after the output block 650 sets a flag which causes a printout to be provided under executive control. In the decision block 652, a determination is made as to whether the suspend pushbutton switch 400 has been operated. If so, the system security monitoring program run is terminated and no new basecase run of the system security monitoring program is initiated until the operator again presses the pushbutton switch 400 or presses the basecase bid pushbutton switch 402.

If the system security monitoring program is not suspended, a decision block 654 determines whether the present basecase run of the system security monitoring program is the first in this cycle, i.e., whether ICNT = 0, and if it is and if the SUSPFLG flag is not set, a contingency case selection logic program CONTLOGC is executed as indicated by block 656 to determine on a dynamic basis a set of hypothetical contingency cases which reflect actual updated system conditions. If ICNT is greater than zero or after execution of the CONTLOGC block 656, another decision block 658 is entered to determine whether the contingency case runs in the present basecase cycle are within the previously considered MAXCONT limit of both automatic and operator entered cases, 100 in this case. The set of contingency cases determined in the block 656 define those cases which are to run automatically by the system security monitoring program. An adjustable number of contingency cases, 37 in this case, can be determined automatically for processing by the system security monitoring program.

If the contingency count reaches 100, no more contingency cases are run and the system security monitoring exits with a bid for a new on-line basecase cycle. If the contingency case count is below 100, a contingency data generation program CONTGEN indicated by block 660 is run to generate contingency cases based on the results of the program CONTLOGC and on the basis of operator case entries through operation of the pushbutton switch 420 (FIG. 12A) and the CRT keyboard. Contingency cases are advantageously run on the basis of updated on-line data including that made available by the program DATSET. Generally, the program CONTGEN determines what type of contingency is to be run in the present contingency case loop run of the system security monitoring program. The case determination involves determining the event or combination of events to be reflected in the loadflow solution, i.e., the generation and/or line losses to be reflected in the loadflow solution. The program CONTGEN also modifies the DATSET data to reflect the changes caused by the contingency. More detail is provided on the program CONTGEN subsequently herein.

After execution of the CONTGEN block 660, the system security monitoring program loops back to the LOADFLW block 644 for a loadflow solution wich reflects the system changes corresponding to the determined contingency case. A system security check is then provided for the contingency loadflow solution by the RESMONT block 646 and printout of any determined alarms is executed by the RESMONT alarm program. Blocks 648 through 658 then function as previously described and block 660 determines and sets up the next contingency case. The contingency case looping operation continues to process specified cases and any blank cases in a contingency case list until the contingency case limit count of 100 has been reached at which time all automatically defined and operator requested contingency cases are complete. Reference is made to Appendix II for a Fortran IV listing for the system security monitoring program.

b. Data Organization and Data Setup Program

Generally, the data employed in the functioning of the security monitoring and alarm system is classified as fixed data, steady state data and time variable data. Fixed data includes all items which are designed to be alterable only by extensive hardware changes in the network analog simulator 302 and by relatively difficult software changes in the security computer 110. Fixed data includes items which are descriptive of the network configuration and items which are required for functioning of the input/output system interfacing the security computer 110 with the analog network system 302 in the hybrid loadflow computer arrangement. Network configuration data includes a specification of the lines, busses, tielines, line numbers, bus numbers and bus and line interconnections. Generally, fixed data is entered for use by the security computer 110 by cards through a background data input program. It is noteworthy, however, that the modularity of the analog network simulator 302 and the relative flexibility with which software changes can be made in the security computer enable the hybrid loadflow computer arrangement to be kept updated in conformity with the actual network configuration with relative convenience and economy.

Fixed data employed in the functioning of the input/output system in the hybrid loadflow computer arrangement is stored in various arrays. For example, lines are removed from the analog network simulator 302 with the use of an index array CCONDX which correlates contact outputs with the simulator line modules on the line cards 307. Similarly, an index array AONDX correlates analog outputs with analog simulator bus modules for the output of computer calculated bus injection currents and an index array AINDX correlates analog bus voltage inputs with bus numbers for storage in a table ANIDAT used in the software calculations.

Steady state data generally pertains to system characteristics which are employed in the loadflow solution but which are rarely subject to change. Steady state data includes line impedance, bus shunt megavars, and bus voltage and line current limits. However, steady state data can be changed readily without altering the security computer program structure and without analog simulator hardware changes other than straightforward changes of plug-in resistors in the line module cards 307. Steady state data is also entered into the security computer 110 by cards through the data input program. Reference is made to FIGS. 14A and 14B where there are respectively illustrated the card entered and core resident fixed data and the card entered and disc resident steady state data. Reference is further made to Appendix I where there are illustrated various card input formats employed with the steady state data shown in FIG. 14B.

In Appendix I, there is also included a list of most of the data arrays employed in the system security monitoring program as a whole. Some data arrays, particularly those related to temporary variables employed within single tasks or subprograms are not included in the appended SSM array list.

Reference is also made to Appendix I for a list of data arrays located in the SSM common core memory in the 1000 HEX locations below shared core memory. Further, reference is made to Appendix I where there is listed disc stored SSM data with an indication of disc section location.

Time varying data includes on-line parameter values derived from telemetered signals from the data acquisition system and nontelemetered parameter values entered by the operator through the CRT and channeled through the shared common memory for use in the system security monitoring program execution. Changes in the telemetry system are readily accommodated in the security computer system simply by linking new telemetered data to proper core memory locations for use by the system security monitoring program.

The on-line and operator entered data includes those data items which are needed to provide a representation of the current state of the regional power system for a basecase loadflow solution by the hybrid loadflow computer arrangement, i.e., the security computer system 110 and the analog network simulator 302. The basecase loadflow solution in turn is employed by the security computer 110 to provide monitoring and alarm functions in the security monitoring system. The program DATSET organizes the data to be used into arrays which are directly usable in the loadflow solution. The organization of the data for subsequent computational use requires DATSET to perform indexing, compression and modification functions.

In Appendix I there is also presented a list of data arrays which are used and produced by the program DATSET. Generally, input data for use by the program DATSET is obtained from shared common memory, CRT buffers, and disc. Generation megawatts PGEN, tieline megawatts PTIE, and tieline megavars QTIE are obtained from shared common memory where the values are regularly updated by the data acquisition system or by an operator entry.

Total five minute reserve PRESV at each generator bus is computed by the regional dispatch computer on the basis of spinning reserve values for each generator unit as determined by the satellite computers and communicated to the regional dispatch computer, in this instance through an operator CRT entry. Although some generation bus voltages are obtained as telemetered values from the shared common memory with provision for entry of CRT bypass values, the majority of generation bus voltages VGEN are in the present embodiment stored table values obtained from CRT input buffers. Similarly, lines out of service LNOUT are obtained from CRT input buffers. The previously indicated steady state and fixed data such as network line impedances, line and bus connections, net values of bus shunt megavars BCHRG and total bus line charging admittance YBCHR are stored on disc and used as required.

In this case, two sets of generation bus voltages VGEN and bus shunt megavars BCHRG are placed in storage to represent high (peak) and low (off peak) regional system load level conditions with a crossover point SSMXPNT. The regional load level NELOAD is computed by adding the bus real power generation values PGEN and net tie real power interchange and it is checked to determine which of the two data sets is to be employed at any particular time.

The program DATSET is run at the beginning of each basecase cycle to obtain and preprocess updated power system data for basecase loadflow solutions, at the beginning of all ODF runs to obtain updated power system data for optimum daily forecast (ODF) loadflow solutions and at the beginning of study mode runs to determine the operator entered data to be used for system study loadflow solutions. Consideration of the study mode and optimum daily forecast mode use of the program DATSET is considered more fully subsequently. Contingency case loadflow solutions employ data derived by the program CONTGEN from the last basecase data produced by the program DATSET and on the bases of the hypothetical contingencies specified for the contingency case undergoing execution. Data which requires no special preprocessing such as that in the arry ANIDAT is accessed directly by the user program.

Figure 14:
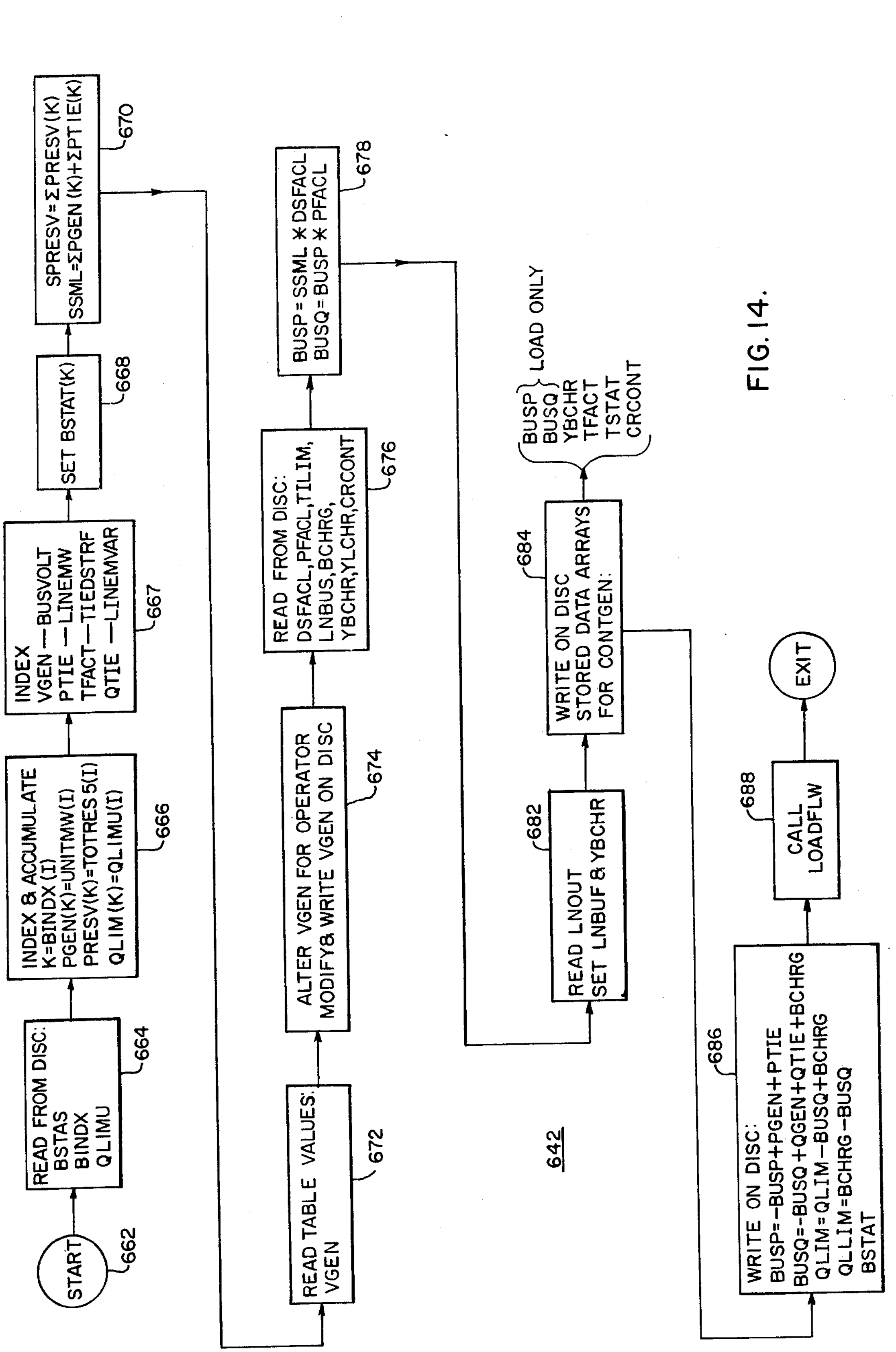
FIG. 14 shows a schematic diagram of a flowchart employed for a data setup program in the security computer.
Figure 14B:
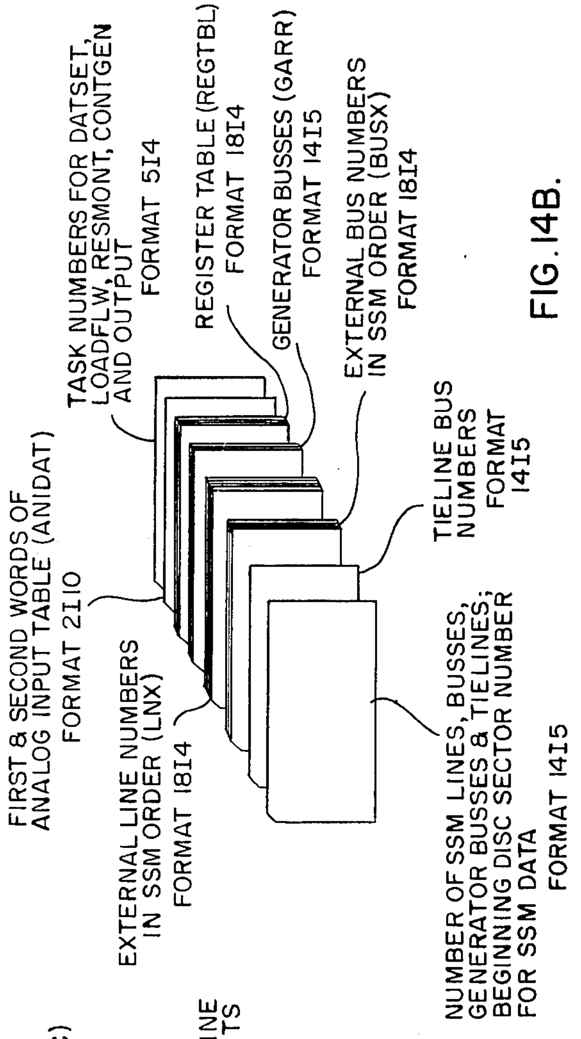
FIGS. 14A and 14B show schematic diagrams of cards employed for data entry into the security computer.
Figure 14A:
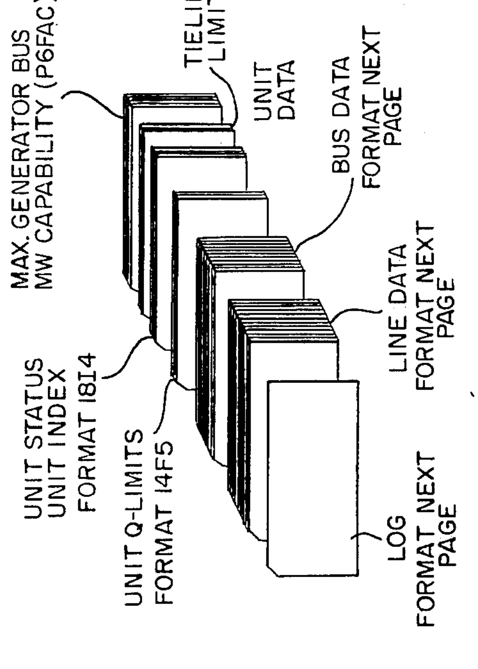

A flowchart shown in FIG. 14 provides greater detail for the DATSET program 642 and it is described within this section for the on-line basecase solution. After entry to the program in block 662, a block 664 in a subroutine UDATONLN reads fixed data arrays BSTAS, BINDX, QLIMU from disc. The array QLIMU provides the reactive power limit for each generator unit and the array BINDX provides an index for generator bus numbers to generator units. The array BSTAS indicates whether a generation bus has no voltage regulation capability (code 1), has voltage regulation capability with PGEN greater than zero (code 2) or is subject to a division of generator unit power over two or more busses (codes 3–7). A requirement in some instances for generator unit power division over two or more busses is created by the particular manner in which the actual regional power system has been justifiably compressed to a reduced number of simulation busses. Reference is made to Appendix I for the distribution algorithms employed for the special cases of unit generation power division over multiple busses.

The index array BINDX obtained in the block 664 is employed in block 666 to index unit data to the proper busses for summation. Thus, PGEN is summed from unit generator real power UNITMW, PRESV is summed from unit five minute reserve TOTRES5 and QLIM is summed from unit reactive limits QLIMU. The unit data is obtained from shared common and the compressed data is set in SSM common core memory.

In block 667, the program DATSET next indexes telemetered bus voltage values BUSVOLT and telemetered tieline power values LINEMW from shared common core memory to the data arrays VGEN and PTIE and SSM common core memory. VGEN is stored for use in the program LOADFLW and PTIE is employed subsequently in the program DATSET and in the program CONTGEN. The tieline reactive power array QTIE and the tieline distribution factor array TFACT are also set in SSM common core memory, respectively, from individual tieline reactive power values LINEMVAR and the individual tieline distribution factors TIEDSTRF which are calculated in the regional dispatch computer and stored in the shared common core memory.

Tieline reactive power values LINEMVAR are telemetered values or values obtained from one or two tables for two different ranges of NELOAD. In cases where telemetering is used to provide all of the values LINEMVAR, no table data is required for LINEMVAR. In this instance, the tieline distribution factors TIEDSTRF are calculated every twenty seconds in the regional dispatch computer by adding all of the absolute tieline powers MW and dividing each individual tieline power value by the sum. Reference is made to Appendix I for a list of representative values for the tieline distribution factors TIEDSTRF.

A block 668 next sets in SSM common core the bus status array BSTAT which is used in the LOADFLW calculations. To set the array BSTAT, a true entry T is made if no voltage regulation exists for a bus and a false entry F is entered if voltage regulation does exist for a bus. A true entry T is therefore made for a bus if the bus power generation PGEN is greater than zero and the BSTAS code is not equal to 2 or if the bus power generation PGEN equal zero. A false entry F is made in the array BSTAT if the bus power generation PGEN is greater than zero and the BSTAS code number is equal to 2, i.e., has a voltage regulation capability.

In block 670, the program DATSET next determines the total regional power system spinning reserve SPRESV and the total regional system power consumed by system loads SSML. The total spinning reserve SPRESV is obtained by a summation of the bus spinning reserve values PRESV determined in the block 666 and the total system load SSML is determined by summation of the bus generation values PGEN from the block 666 and the tieline power values PTIE which are obtained as telemetered values from the shared common core memory. After computation, the total spinning reserve SPRESV is set in SSm common core memory for use in the program CONTGEN and the total system load SSML is set in SSM common core memory for later use in calculations by the DATSET program 642.

In block 672, a determination is made of the VGEN table values entered on disc by card and CRT inputs. The values determined are obtained from one of two tables on the basis of the load level, i.e., peak or off-peak as selected for operation by the operator and implemented by the NELOAD test previously described. Block 674 next provides for modifying telemetered VGEN values in accordance with any bypass values entered by the operator, and VGEN is then stored on disc for use by the program LOADFLW.

Provision is next made in block 676 for reading from disc the load distribution factors DSFACL, the load power factors PFACL, tieline current limits TILIM, line connected busses LNBUS, two sets of bus shunt megavars BCHRG, charging admittance for the system lines YLCHR, total line charging admittance at the busses YBCHR, and a list CRCONT of automatic and operator entered contingency cases having a format considered subsequently. Reference is made to Appendix I where the previously noted bus and line data sheets specify the various system busses included in the power network 50 of FIG. 1 and the corresponding load distribution factors P and load power factors Q employed for load busses in the arrays DSFACL and PFACL, the number of each bus as included in the drawing of FIG. 1, the particular generation units and power capacity thereof at each generation bus, and the line connections to other busses. In Appendix I there is also included a cross index of the numbering system employed for the busses in FIG. 1 with the numbering system employed within the security computer 110 by the system security monitoring program.

The table BCHRG is card entered in megavar units. The total line charging admittance YBCHR for the busses is computed by summing (1) one half of the individual line charging admittances YLCHR for lines connected to the bus being calculated and (2) any line to ground admittance compensation needed in the Pi section equivalent of a bus connected transformer for deviation in the transformer turns ratio from the nominal turns ratio. The manner in which power system transformers and their variable turns ratios are simulated has already been considered in connection with the analog network simulator 302. A deviation of less than about 3 percent in the nominal tap change ratio is compensated in this instance by program operations, and any greater deviation is preferably also compensated by a resistance change in the series branch of the Pi section equivalent, i.e., by a resistance change in the appropriate line card 307 in the analog network simulator 302. If desired, contact closure outputs may be employed for compensatory variation of the transformer series equivalent resistor for all changes in tap ratio, but such is not the case in the present embodiment.

In block 678, the load power is calculated for each load bus and entered in the array BUSP. The individual bus real load powers are determined by multiplying the distribution factors DSFACL against the total system load SSML. Similarly, the bus reactive load power values are determined and entered in the array BUSQ by multiplying BUSP against the bus power factor PFACL. In determining the distribution of real and reactive load power over the system load busses, the program block 678 accounts for transmission losses by the fact that the sum of all of the individual load distribution factors DSFACL is made equal to .985.

Keyboard entered line outages are then determined from the disc array LNOUT in block 682. The array LNBUF is set in SSM common core memory and the data array for net bus line charging admittance YBCHR is modified by subtracting the line charging admittance for the outage lines from the affected busses.

Developed data arrays are next stored on disc by block 684 for use in unmodified form by the program CONTGEN. The stored arrays include YBCHR, TFACT, TSTAT, CRCONT and the load power quantities BUSP and BUSQ. The net compensated bus admittance is also stored for use by the program LOADFLW. In this case, the tieline service status array TSTAT is stored on disc in its form as obtained from the SSm common core memory and a change in tie status is effected only by programmed modification of the disc stored status. Tieline status is treated as steady-state data since it rarely undergoes changes. However, the tieline status array TSTAT is subject to change as a contingency in the program CONTGEN.

The net bus power BUSP is determined in block 686 by an algebraic summation of the bus power generation PGEN, bus applied tieline power PTIE and the load bus power BUSP calculated in the block 678. Reactive power for non-voltage-regulated busses is similarly found by algebraically summing generation reactive power QGEN, tieline reactive power QTIE, the bus reactance BCHRG in megavars and the load reactive bus power BUSQ calculated in the block 678. The net bus reactive power limit array QLIM is determined in the block 686 for voltage regulated busses by summing the old value QLIM with bus shunt megavars BCHRG and subtracting the reactive load BUSQ. The determined generator bus upper reactive power limit array QLIM, a generator bus lower limit reactive power array QLLIM (determined by subtracting bus Q from bus shunt megavars BCHRG), the bus status array BSTAT and the net bus real and reactive power arrays BUSP and BUSQ are written on disc for use along with the array VGEN and the array YBCHR by the program LOADFLW. It is noted that the array BSTAT is also used by the program CONTGEN. Thus, the blocks 684, 686 and 674 generate preprocessed data arrays on disc as required for use with other data in the execution of the programs LOADFLW and CONTGEN as subsequently considered more fully herein. After execution of the block 686, block 688 places a bid for the program LOADFLW to continue the system security monitoring program execution as described in connection with FIG. 13B.

c. Loadflow Program

The loadflow program iteratively interacts with the DC analog network simulator 302 in the hybrid loadflow computer arrangement to achieve a steady-state on-line or off-line loadflow solution, i.e., a determination of network AC bus voltages and reactive powers on the basis of stored fixed and steady-state parameters and measured or specified variable parameters. Other loadflow solution parameters are computed from the bus voltages and reactive powers by the program RESMONT. Convergence of the loadflow solution occurs as generation reactive power values and bus injection currents are modified by software and as resultant bus voltage values are determined from the operation of the analog network simulator 302 in response to the software changes.

Although network voltages can be made the independent or casual variables in the loadflow solution, it is preferred to employ a method like that known as the Gauss Z-Bus method wherein resultant network voltages are determined from causal bus injection currents which in turn are calculated from on-line and other data. In this manner, the digital computer duty cycle is reduced since the convergence of the solution is more quickly obtained (usually in 12 to 14 iterations in the present embodiment) for reasons indicated at page 328 in the Staggs and El-Abiad text "Computer Methods in Power System Analysis" published by McGraw Hill. Convergence with fewer iterations (i.e., 4 to 5 iterations) can be achieved by use of the Newton-Raphson method in an all digital loadflow solution but the total solution time is acceptable for on-line implementation only if the simulated network is relatively small and/or the employed digital computer has a relatively fast cycle time.

The hybrid loadflow computer arrangement is provided with a digital computer/external circuit interface which provides 1.) relative economy of manufacturing, 2.) digital computer data processing capability and software flexibility and 3.) a fast on-line security monitoring loadflow solution consistently with relatively low duty cycle requirements in the digital computer. The hybrid interface described herein is preferred for the network 50, but variations can be made in the interface to achieve different tradeoffs of economy, flexibility and speed for other similarly sized networks or for larger or smaller power systems. In the preferred embodiment, a loadflow solution can be reached within 30 seconds with better than an estimated 10 to 15 percent accuracy relative to actual parameters in the power system. The hybrid loadflow computer itself provides an estimated accuracy of better than 2 percent.

The algorithms associated with the bus injection current calculations and other software determinations in the loadflow program LOADFLW impose relatively little duty cycle on the digital computer as compared to the algorithms which are needed in the fast Newton-Raphson iterative method for obtaining convergence by the solution to a large simultaneous set of linear equations. The voltage solution is accordingly placed in the hardware analog network simulator 302 where a fast simultaneous equation solution is achieved in the manner previously considered. It is also noteworthy that software injection current calculations from bus power and voltage values reduces the extent of hardware needed in the analog network simulator 302 and thereby increases the overall system flexibility. One further notation is that no modular representation of tielines is needed in the analog simulator 302 since tielines are processed as power loads or sources in the software calculations.

The fundamental principles involved in the hybrid loadflow solution are (1) Ohm's law and (2) Kirchhoff's laws that the sum of all currents at any bus must be zero and that the sum of all voltages through any network loop must be zero. Further, reactive power capability limits of generation units are used as constraints in the loadflow solution.

In the preferred Gauss Z-Bus type of solution, the network current equation is:

Equation 1:

$$I_{Bus} = Y_{Bus}\, E_{Bus}$$

where:

$I_{Bus}$ is an nxl complex vector consisting of all the bus currents and n is the number of busses of the system.

$Y_{Bus}$ is an nxn complex admittance matrix which represents the constants of the network system.

$E_{Bus}$ is an nxl complex vector which consists of all the bus voltages.

Since the net real and reactive power P and Q and the phasor voltage $E_p$ and phasor injection current $I_p$ are related at any bus p as follows:

Equation 2:

$$P_p - jQ_p = E_p^* I_p \quad p=1,2,\ldots,n$$

where:

$E_p^*$ is the complex conjugate of $E_p$ and since in this instance the line charging currents are not determined in the analog network simulator 302, the phasor bus injection current $I_p$ is defined as follows:

Equation 3:

$$I_p = \frac{P_p - jQ_p}{E^*_p} - Y_p E_p \qquad p=1,2,\ldots,n$$

where:

$Y_p$ is the total line charging admittance at bus p. To determine the admittance $Y_p$ for each bus, one half of the equivalent Pi section charging admittance is identified for each line connected in service to the bus *p* and the resultant addend values are summed. Line charging current is reflected in the calculations since it is a loss which can be sizable particularly if the associated line is long. Accordingly, with a determination of the admittance $Y_p$ the injection current $I_p$ can be determined if the bus power and voltage quantities $P_p$, $Q_p$ and $E_p$ are determined.

Generally, a bus injection current includes the effects of all loads, generation units and the lines connected to a bus. A positive real injection current represents current flowing into the power system and a negative real injection current represents current flowing out of the power system. Thus, a generator bus has positive real injection current and a load bus has negative real injection current. A composite bus having both generation and load factors associated with it may have positive or negative real injection current.

Figure 8:
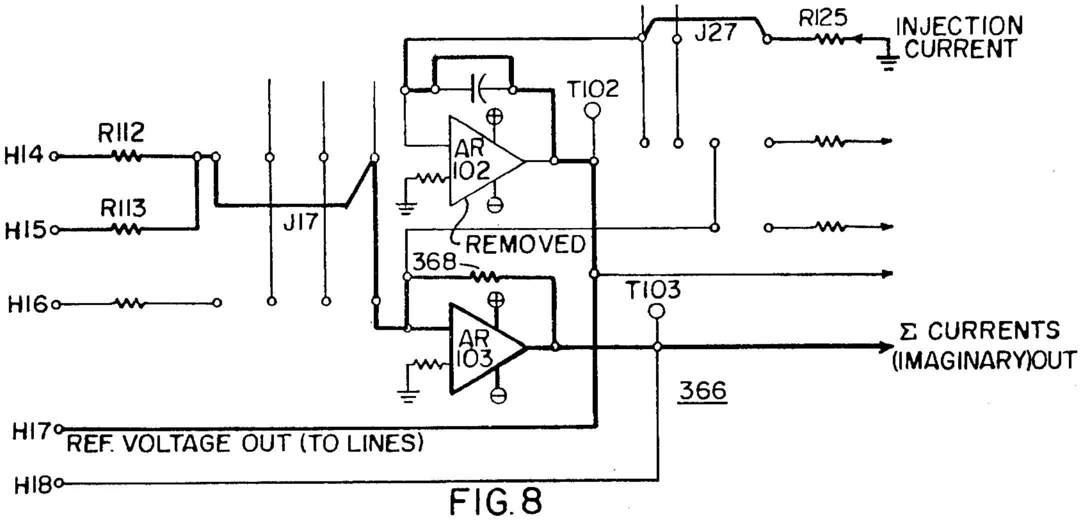
FIG. 8 shows a schematic diagram printed circuit slack bus circuitry employed in the analog simulator.

As previously indicated, the Millstone Point bus has in this embodiment of the invention been assigned the function of a slack bus to provide for taking up real and reactive power losses which are unknown until the final solution. Accordingly, in the hybrid calculations the voltage magnitude and the phase angle at the slack bus are specified and remain constant under the control of the analog network slack bus card (FIG. 8).

Generally, the real and reactive load powers P and Q are specified in stored data for busses having a concentrated load. Voltage regulated busses are defined as those at which power is generated within Q generation limits by one or more voltage controllable generating units. As already described, the program DATSET operates through the blocks 686 and 674 to provide telemetered values of real generated bus power $P_G$ and telemetered or tabled or operator entered values of the voltage magnitude at the voltage regulated busses.

In the calculation process, each bus has applied to it two constraints which are either specified or determined in real time. Thus, busses having no voltage regulation are constrained by specified values of real and reactive power P and Q. Voltage regulated busses are constrained by determined actual values of real power P and magnitude of the bus voltage V. At the slack bus, the magnitude and the angle of the voltage operate as constraints.

Figures 15, 15A, 15B, 15C:
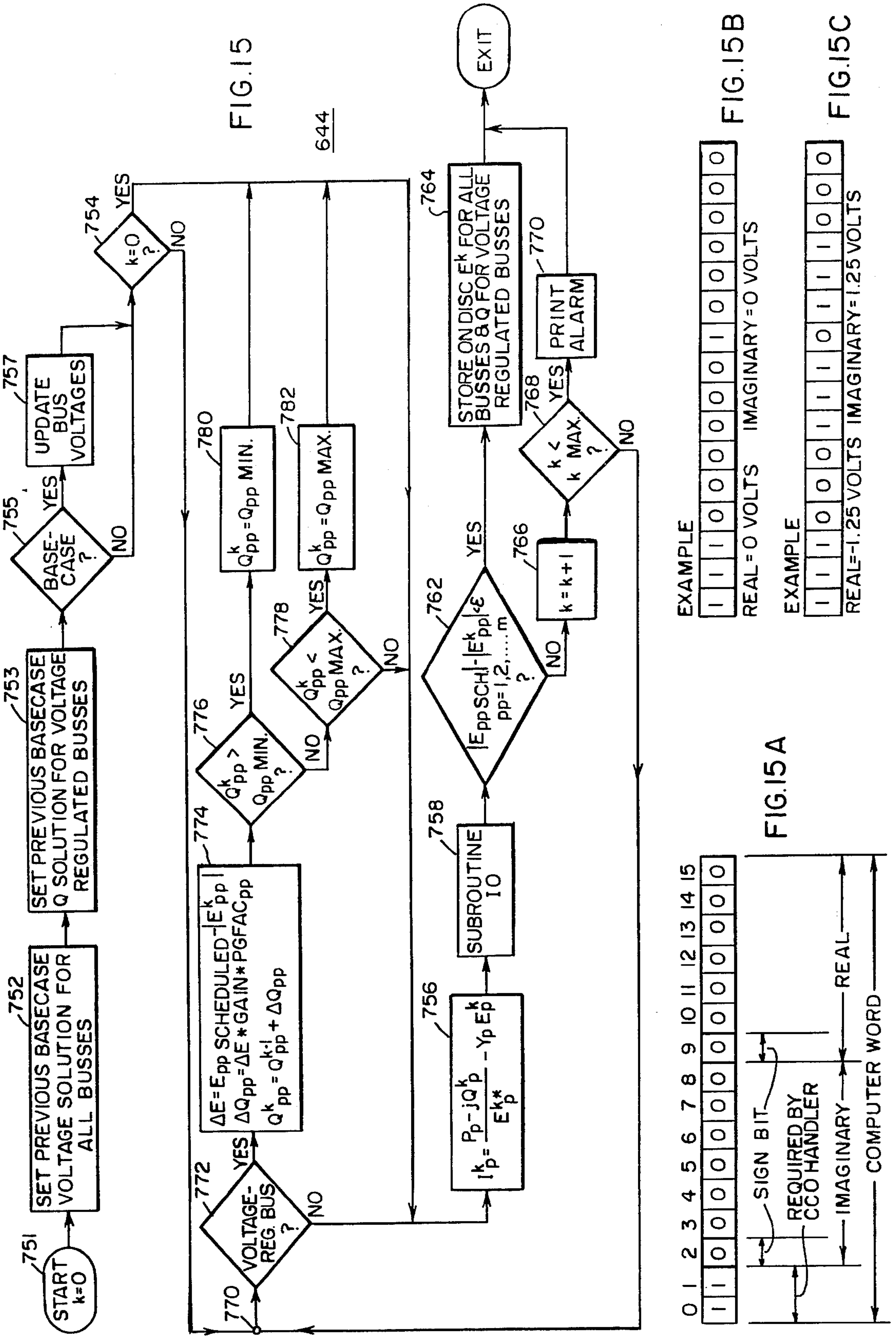
FIG. 15 shows a flowchart employed for a loadflow calculation program in the security computer.
FIG. 15A through 15C illustrate the structure of output words generated by the digital security computer.

In FIG. 15, there is shown a flowchart 644 which is representative of the loadflow calculation program LOADFLW. After execution of the data setup program DATSET in a basecase loadflow determination or after execution of the contingency generation program CONTGEN during the running of a contingency case, LOADFLW is started for a loadflow calculation for the power system. An iteration counter k is set to zero by block 751 in the first LOADFLW pass. As indicated by the blocks 752 and 753, initial bus voltage and generator reactive power values are set equal to the load bus voltage and generator reactive power values determined in the last basecase solution. During computer system startup, suitable initializing voltage and reactive power values are used for the first program pass since no previous basecase solution then exists.

Next, block 755 determines whether the present solution is a basecase or a contingency case solution. If it is a basecase solution, a block 757 updates the voltage values for those busses having telemetered and operator entered values.

For the first iteration, counter block 754 determines that the iteration count quantity k is zero. Block 756 then determines real (X) and imaginary (Y) injection currents for the network busses in accordance with Equation (3).

For the calculations in the block 756, the net real and reactive powers $P_p$ and $Q_p$ are obtained from the array BUSP and BUSQ stored on disc by the DATSET block 686. The bus voltage $E_p$ and its conjugate $E_p^*$ are derived from the disc stored data array BUSP. Line charging admittance value $Y_p$ for the busses are obtained from the array YBCHR stored on disc by the DATSET block 684.

The algorithm in the block 756 is executed for each bus in the analog network simulator 302 to determine the injection current for that bus from the actual and/or currently specified parameter values. Junction busses in this case are not in this case provided with bus injection current calculations. After determination of the bus injection currents, an input/output (I/O) subroutine 758 is called to cause corresponding analog injection current signals to be applied to the output digital to analog converter to the analog network simulator 302 at the respectively corresponding bus card inputs in the simulator.

Figure 15D:
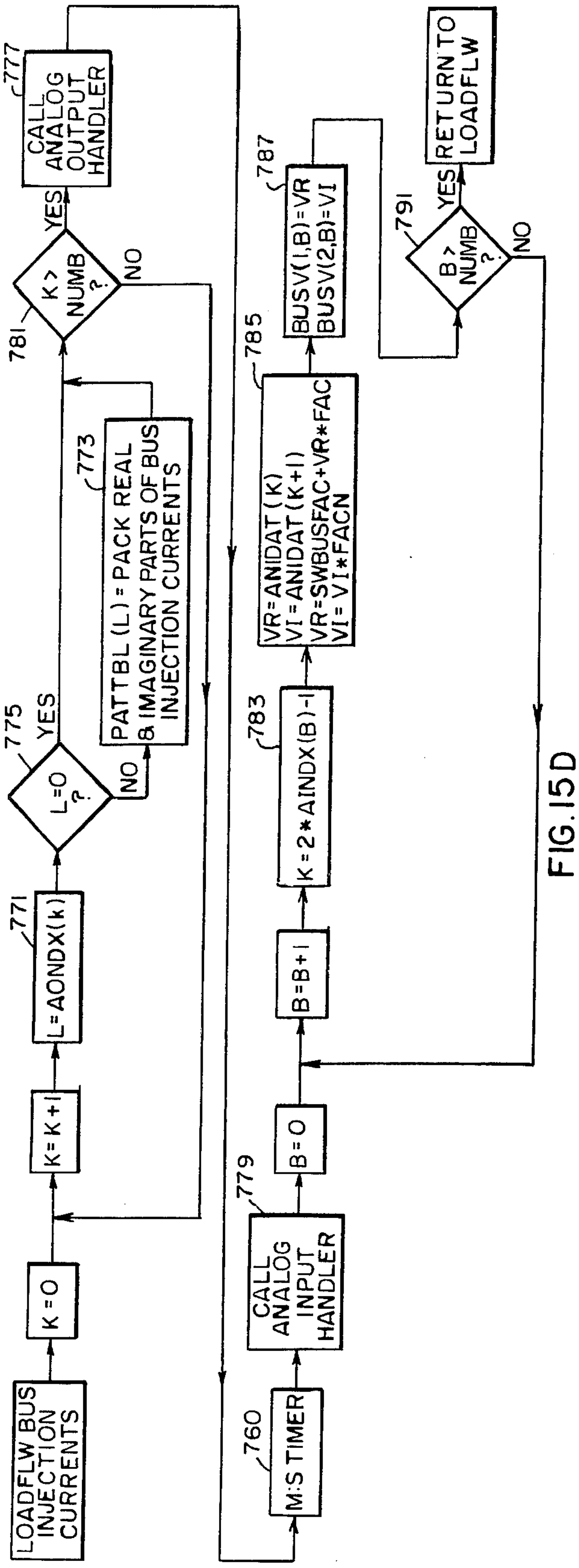
FIG. 15D illustrates a flowchart for an input/output subroutine employed in the security computer.

As shown in the subroutine IO flowchart in FIG. 15D, the digital to analog portion of the subroutine IO employes an index array AONDX, a table REGTBL for address registers and an output work table PATTBL. The index array AONDX provides in block 771 a correlation between the address registers in REGTBL and the computer bus injection currents to define where the output words are to be stored in PATTBL so that the computer bus injection currents are applied through the analog output system to the proper bus modules 305 and lines out signals are applied through the CCO system 495 to the proper line modules 307 as the table REGTBL is sequenced through the output address registers in a programmed order.

Each bit pattern or word output from LOADFLW is stored in PATTBL and directed to an external address by a REGTBL injection current address register in accordance with a channel number and word identification. Similarly, line connection changes in the simulator 302 are made through the CCO system by output words stored in PATTBL by DATSEL and CONTGEN and word and channel addressed by registers in REGTBL.

The register table REGTBL is an integer table which also controls the order in which the lines out and injection current output words are transferred to the analog network simulator 302 through the digital to analog converter or the CCO system. Each address register in REGTBL is provided with a number from 1 to 192. A list of the output order of address registers and a list of the numbered address registers are set forth in Appendix I.

The pattern table PATTBL is developed in block 773 as an array 192 words long to store the desired bit patterns to be transmitted as injection current or lines out signals to the analog network simulator 302. Block 775 causes PATTBL block 773 to be bypassed for junction busses which have zero injection current. Each injection current word in PATTBL includes the real and imaginary parts of the injection current for a particular network bus. The first two bits of the 16 bit computer output words are used to specify reset and set actions. In order to pack the real and imaginary injection current parts from separate 16 bit LOADFLW words into the remaining 14 bits of the computer output words, scaling is employed and the respective current parts are placed in two 7 bit bytes. The output word scaling is implemented while retaining desired system resolution.

The first bit of each 7 bit byte is reserved for the sign; a logical one indicates a positive voltage representation and a logical zero indicates a negative voltage representation for bus injection current. The remaining six bits in each 7 bit byte are used to represent values of bus injection current. The scaling compresses the full range per unit injection current values to correspond with the decimal range of 63 corresponding to the 6 current value bits.

Most of the bus injection currents could have their per unit values represented by a range of bus card input voltages equal to ± 3 volts, but software gain of three is employed for such currents to achieve a bus card input voltage range of about ± 10 volts. A gain of one, i.e., no gain, is referred to as low scale and it is employed for large values of bus injection currents.

The analog output voltage range between −10 volts and +10 volts corresponds to the software binary range between 000 0000 and 111 1111 including sign. Zero voltage is in the middle of the scale and is either 100 0000 or 011 1111 indicated +0 or −0. When negative voltage values are processed, they are taken as the ones complement of the 7 bit word since the "zero" voltage is in the middle of the voltage range. FIGS. 15A, B and C illustrate the computer output word structure. The software instructions employed to achieve packing of the injection current values is included in the subroutine IO and it is written in assembly language in this instance.

Once the array PATTBL has been assembled as determined by block 781 and executive analog output handler has been called by block 777 bus injection currents have been applied to the analog network simulator 302, some time period, such as 330 milliseconds, is allowed by timer block 760 for the analog model to reach a steady state solution before the executive analog input handler is called by block 779 for the solution DC phasor bus voltages to be read into the security computer 110. The analog to digital converter generates the digital computer input representations of the solution voltages generated by the analog model for entry by the analog input handler into an analog input table ANIDAT. In block 783, AINDX relates the ANIDAT locations with bus voltages by bus numbers. Bus voltage real and imaginary values VR and VI are developed in block 785 with the use of a conversion factor FAC relating analog scaled voltage to per unit voltage. FACN is the negative value of FAC. Block 787 sets VR and VI in BUSV.

Although the analog module line current values can be read by the computer 110, only the DC solution voltages are read in this case and the line currents are computed as a software function. Where the per value conversion cost of fast analog to digital converters warrants, computer reading of the line module currents provides some improvement in system accuracy; some A to D resolution loss is then avoided and any error due to disparity between software and module line impedance is then avoided.

After the analog solution, incremental bus voltages relative to slack are entered into the computer and processed into the BUSV array by blocks 785 and 787, block 791 causes the subroutine IO to end and block 762 initiates a convergence test. First, the magnitude of each calculated voltage regulated bus voltage is subtracted from the scheduled voltage for the corresponding bus as follows:

Equation 4:

$$\Delta E_{pp}^{k} = E_{pp\,scheduled} - \left| E_{pp}^{k} \right| \quad p=1,2,\ldots,n$$

where:

$\Delta E_{pp}^{k}$ is the voltage difference for voltage regulated bus $p$ and $k$ indicates the kth iteration.

The scheduled bus voltage is the value from VGEN which is acquired by the data acquisition system or from a table or by operator entry.

The block 762 next compares each voltage difference to a predetermined maximum error voltage. If the voltage difference is less than the maximum error voltage for all voltage regulated busses, the bus voltage values for all busses and the reactive power are stored and the program run is ended. The convergence test made by the block 762 is based on the assumption justified by experience that once the voltage regulated busses have converged in the solution all of the busses without voltage regulation will also have converged.

If one or more voltage differences is greater than the predetermined maximum error voltage, the iteration count k is advanced by counter block 766. If the new iteration number is determined by block 768 to be greater than a predetermined maximum value such as 25 as in the present case, block 770 (not represented in the Appendix II listing) causes an alarm to be printed by the teletypwriter and the program run is ended. If not, the block 768 causes the program LOADFLW to advance to junction 770 at the output of the initial iteration decision block 754.

On the second and higher iterations, block 772 determines from the DATSET stored array BSTAT whether each bus is voltage controlled, i.e., susceptible to generation unit voltage regulation by generation reactive power viration. If a bus is not voltage controlled, no further determinations are made with respect to it until the program again reaches the bus injection current calculation block 756.

A convergence steering block 774 and constraint blocks 776 and 778 are executed for all voltage regulated busses prior to execution of the injection current calculation block 756. To produce convergence, the block 774 calculates a new value of generation reactive power for each voltage regulated bus and that value is used in the present iteration if it is determined by the blocks 776 and 778 to be within the maximum and minimum reactive power limits assigned to that bus for generator efficiency, for generator winding protection and for system stability. If the new reactive power value for a particular bus is less than the minimum for that bus, voltage regulation is presumed to be released at that bus and the bus reactive power value is made equal to the minimum value by block 780. If the new reactive power value for a particular bus is more than the maximum for that bus, voltage regulation is presumed released at that bus and the reactive power value is made equal to the maximum value by block 782.

To determine the new reactive power values for the present iteration, the block 774 employes the following algorithm:

Equation 5:

$$\Delta E_{pp}^{k} = E_{pp\,scheduled} - \left| E_{pp}^{k} \right|$$

Equation 6:

$$Q_{pp}^{k} = Q_{pp}^{k-1} + \Delta E_{pp}^{k} * GAIN * PGFAC_{pp}$$

where pp designates a voltage regulated bus, GAIN is a constant which provides a means for accelerating convergence, and $PGFAC_{pp}$ is an indivualized value for each voltage regulated bus.

The quantity GAIN is applied to all busses and it may have a value such as 1.2. The multiplier $PGFAC_{pp}$ reflects the maximum real power capability of the generation busses and it is in this manner that it is individualized for the various voltage regulated busses.

After all voltage regulated busses have been steered for convergence by the blocks 774, 776 and 778, the bus injection current calculation block 756 calculates a new set of injection currents for all busses for the present iteration in the manner previously described. Non-voltage-regulated busses are passively converged to solutions in the overall hybrid solution simply by the use of stored BUSP and BUSQ values and the use of the last bus voltage magnitudes and angles obtained from the analog network simulator 302.

As already noted, the subroutine IO in block 758 provides for transferring the digital bus injection current solution to the analog network simulator 302 through the digital to analog converter after execution of the block 756. Additional iterations are then continued by the blocks 762, 766 and 768 in the manner described until the loadflow solution is reached for storage by the block 764 or until the maximum allowed iteration count is reached.

d. Results Monitoring and Output Programs

Figure 16:
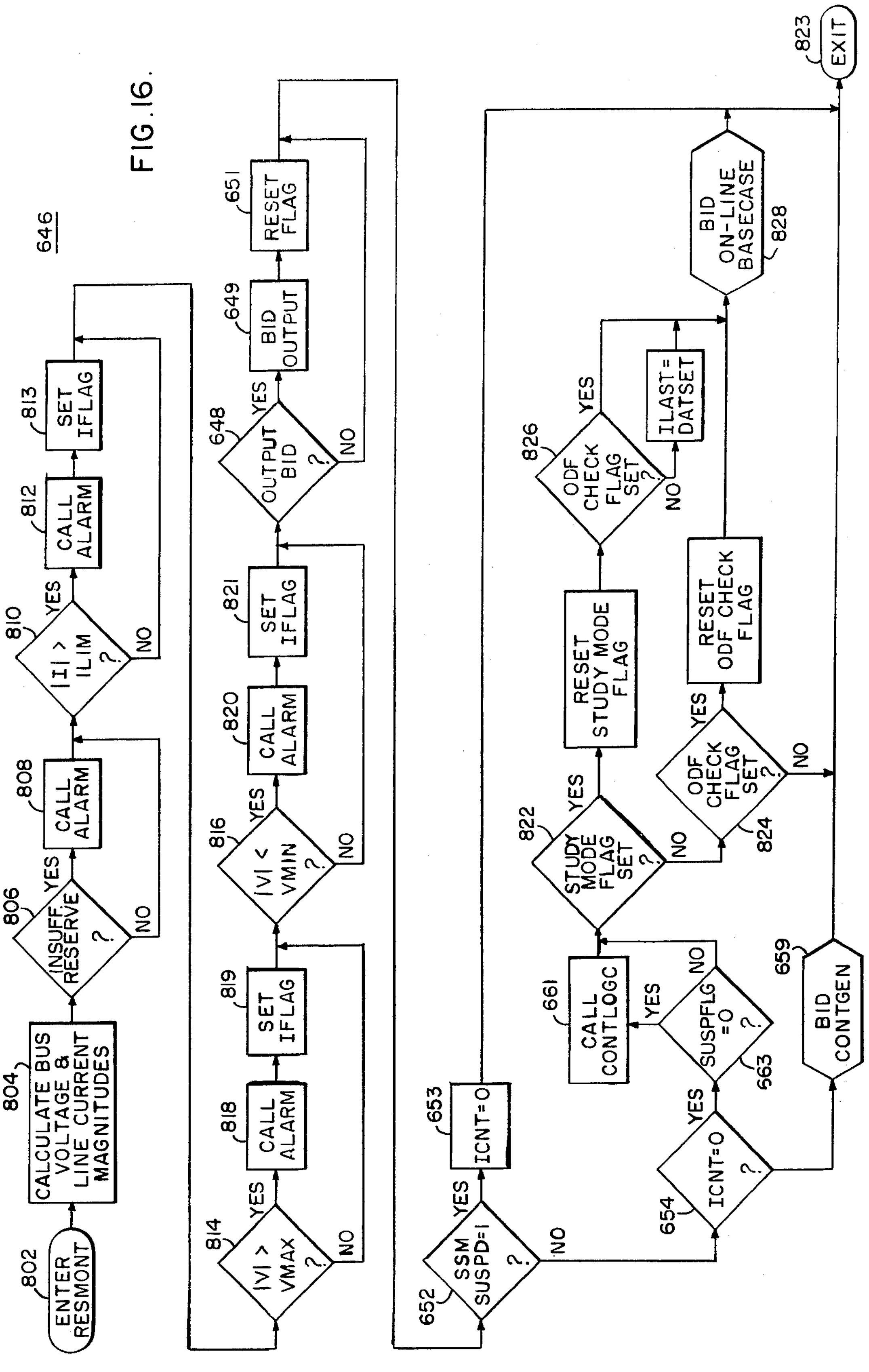
FIG. 16 provides a flowchart for results monitoring and output programs executed in the security computer.

The program RESMONT is illustrated in greater detail in FIG. 16 by a flowchart for the block 646 of FIG. 13B. After execution of the program LOADFLW in an on-line basecase or other loadflow run, the program RESMONT is entered at block 802 and load bus voltage magnitudes and line current magnitudes are calculated by a subroutine CALC in block 804 on the basis of the loadflow solution obtained in the program LOADFLW. The following algorithms are calculated in the block 804:

Equation 7:

$$VMAG_i = \left| BUSV_i \right|$$

Equation 8:

$$ILINE_{ij} = \left| \frac{BUSV_i - BUSV_j}{Z_{ij}} + YLCHR_{ij} * BUSV_i \right|$$

where:

- $i$, $j$ are subscripts designating line connected busses and Z is line series branch impedance. Equation (7) requires that real (X) and imaginry (Y) bus voltage components obtained by LOADFLW from the analog network simulator 302 be squared and that the square root be taken of the sum of the squares to obtain the bus coltage magnitude $VMAG_i$. The line current magnitude at one line end is defined by Equation (8) as the magnitude of the sum of the interbus current caused by the interbus voltage difference and the line charging current caused by the application of the bus voltage across the line charging admittance.

In the present case, the solution bus voltage values are read in X, Y coordinates from the analog network simulator 302 and the line current components are computed in X, Y coordinates as a software function. With the use of a faster analog input system for the security computer 110 as compared to the analog input system employed in the present case, reading of the solution line currents from the analog network simulator 302 may be justified from both an economic and a functional standpoint. Although the performance of the preferred embodiment is satisfactory, some improvement can be achieved in the accuracy of the line current solution by modifying the hardware/software interface in this manner.

After the load bus voltage and line current calculations are completed by the block 804 for all load busses and all lines, block 806 compares the actual system spinning reserve SPRESV or the modified contingency case spinning reserve SPT to an updated value of a required total system spinning reserve calculated by the economic dispatch program in the regional dispatch computer. If the actual system spinning reserve or the modified contingency case spinning reserve is insufficient under current system spinning reserve requirements, a program ALARM is called to format the data with the appropriate message and an alarm storage program MWDWRT is then bid. The actual system spinning reserve SPRESV is calculated by the program DATSET as already described, and a modified SPRESV may be calculated by the program CONTGEN. It is desirable that the on-line spinning reserve security check be determined in the loadflow solution programming in the security computer 110 as opposed to the regional dispatch computer since the spinning reserve security check is applied both to actual (i.e., basecase) and contingency case data.

Generally, the program ALARM includes three security computer subroutines which intereact to cause single line 120 character alarm messages to be written through the regional dispatch computer on the security typewriter. A program such as RESMONT which has an alarm message includes the program steps necessary to encode the alarm message in the format illustrated in Appendix I. Upon an ALARM call, a subroutine MWDWRT records the encoded alarm message in its message numbered location in a disc area designated for alarm messages. Up to 50 messages can be stored before MWDWRT temporarily suspends the system security monitoring program until the number of stored alarm messages is reduced by printout. Appendix I also includes a list of alarm messages and a list of messages for monitored error conditions.

Another subroutine MWNLINE provides for transferring on-line basecase alarm messages from disc to the regional dispatch computer for printout by alarm printout program which is run periodically. A similar subroutine MWSTUDY provides for transfer of study mode alarm messages. In either case the earliest stored alarm message is transferred from disc to shared common core memory when a flag permits the transfer. Transfer flag setting and clearing is controlled by the alarm printout program.

In a subroutine LIMCHK, block 810 next operates in basecase and contingency case runs to determine whether the computed system line currents exceed the specified current limit values. Any overload conditions are formatted as messages, a bid is placed for the program ALARM as indicated by block 812 and an array IFLAG is set by block 813 for the program OUTPUT. Thereafter, all bus voltages are checked against maximum and minimum limits by blocks 814 and 816 and blocks 818 and 820 bid the program ALARM for storage and ultimate printout of any determined alarm messages. Blocks 819 and 821 set the array IFLAG as in the case of the block 813.

After the subroutine LIMCHK is executed, the previously considered block 648 determines whether an output flag has been set and if it has the program OUTPUT is bid by block 649 and block 651 then resets the flag. Next, the previously considered block 652 determines whether there has been an operator or other suspension and if there has, ICNT is set to zero by block 653 and the program RESMONT is ended by block 823. If there is no suspension, the block 654 determines whether the program run is a basecase run as previously considered. If it is not, CONTGEN is bid by block 659 and the program RESMONT is ended by the block 823.

If the block 654 indicates a basecase run and if a flag SUSPFLG has been set in a bypass block 663 by DATSET to indicate study or ODF mode, CONTLGC is bypassed. If SYSPFLG is not set, CONTLOGC is bid by block 661. After the CONTLGC bid block 661 or after the bypass block 663, a check is made by blocks 822, 824 and 826 in correspondence to the block 649 (FIG. 13B) to determine whether the system has been in the study mode or the ODF mode. If it has, the flag or flags are reset and block 828 bids an on-line basecase run and the program RESMONT is ended by the block 823. Thus, no contingency cases are selected nor run in a study mode cycle or an ODF cycle.

The bits set in an array IFLAG by LIMCHK provide an indication for the program OUTPUT those values which are to be denoted as being out of range in a basecase or contingency case solution printout. After execution of the program RESMONT and after determination by the block 648 in FIG. 13B that a printout is required for a basecase or contingency case solution or that a printout is required by the fact that the system is in the study mode or by the fact that an optimum daily forecast security check is being made, the program OUTPUT designated by the block 650 is FIG. 13B is executed.

Printed output for normal basecase loadflow solutions and for contingency case loadflow solutions is limited to alarm messages but a full basecase printout can be executed by the program OUTPUT if requested by the operator through the pushbutton 404. Full printouts for the study mode and the optimum daily forecast security check mode are selectable by the operator for a specified range of bus numbers or for the entire network.

In the execution of the program OUTPUT for a full basecase printout, the LOADFLW values for bus voltages and generator bus reactive powers are obtained from storage and the line currents and power flows are calculated. Recalculation of the line currents by Equation (8) is employed in this case to avoid the need for a complicated index array to the previously calculated line current values.

Partial or full printouts and the automatic alarm printouts from the program OUTPUT are made with the format indicated in Appendix I.

e. Contingency Case Selection Logic Program

After each on-line basecase loadflow solution, the contingency case selection logic program CONTLOGC is called once by the block 654 (FIG. 13B), and the call is made during the on-line basecase run of the system security monitoring program in order to identify those contingency cases which are to be run automatically in the remainder of the basecase cycle. Once the automatic contingency cases are specified, the contingency data generating program CONTGEN initiates loadflow solutions for the specified cases during subsequent loop runs through the system security monitoring program. The program CONTLOGC automatically makes any needed or desired changes in the contingency case list from basecase cycle to basecase cycle with dependence on actual system conditions and in accordance with pre-established rules of selection. Although a fixed contingency case list may be employed, it is preferred that the contingency cases to be run automatically be selected dynamically in order to provide greater validity to the power system security test provided by the loadflow solutions for the contingency cases.

Generally, the program CONTLOGC generates a list of single level contingency cases which would be expected ordinarily to be withstood securely by the power system on the basis of the planning effort employed in the design and development of the generation and transmission facilities of the actual power system. Single level contingency case loadflow solutions accordingly provide a security check on this expectation. Higher level contingency cases are less likely to occur but nonetheless may occur in the actual power system. Therefore, provision is made in the present embodiment of the invention for higher level contingency case selection by operator entry.

Power generation losses and internal system line losses and tieline losses are employed as the contingency events which test the system security. More particularly, the following rules underlie the automatic selection of 37 first level hypothetical contingency cases of the program CONTLOGC:

1. Loss of the three generator units having the greatest power generation values in each of the four satellite power company groups linked to form the regional system (twelve cases);
2. Loss of the eight internal system lines having the largest current values in the regional system (8 cases);
3. Loss of the eight system lines having the largest ratios of current value to current limit value in the regional system (8 cases);
4. Loss of each of the nine tielines (9 cases). A tenth tieline expected to be put into service for the network 50 would increase the number of automatic contingency cases to 38. The automatically selected contingency cases place a security test on the capability of the regional system to employ its spinning reserve, its external tieline power sources and its internal transmission paths to withstand internal power generation losses and transmission losses without cascading outages.

Figure 17:
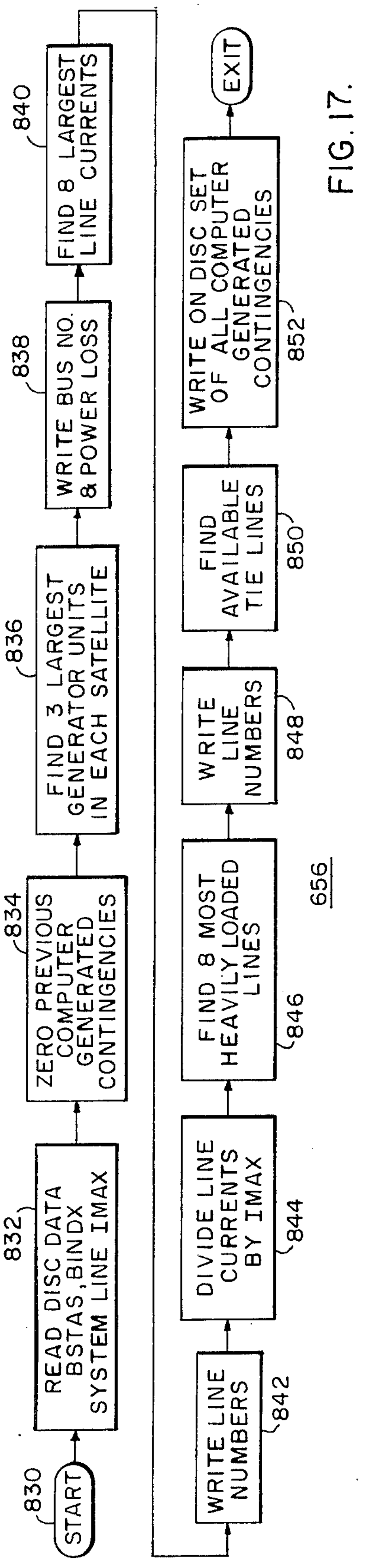
FIG. 17 shows a flowchart for a contingency case selection logic program operated in the security computer.

The contingency case selection logic program CONTLOGC is illustrated in greater detail in FIG. 17 by a flowchart for the block 656 of FIG. 13B. After the program is entered as indicated by block 830, a block 832 first provides for reading for disc stored data including the bus status array BSTAS, the bus index array BINDX and system line maximum current limits.

The previously noted contingency case list CRCONT is provided with a format illustrated in Appendix I. In that list all previous computer generated contingency cases are set to zero by block 834 before any new contingency cases are selected in the present on-line basecase cycle. Any operator entered contingency cases stored in the contingency case list remain undisturbed after execution of the block 834 since they are erased or replaced only by operator entry.

The contingency case list selection is begun in block 836 which provides for searching the power generation data array UNITMW to identify the three generator units having the largest power generation values in each satellite system. The bus number and power loss for each of the twelve selected generation loss contingency cases is then recorded by block 838 in columns 3 and 4 of the contingency case list format so that the unit generation losses will be reflected at the identified busses in the contingency loadflow solutions.

In block 840, the eight largest regional system line currents are determined by a search through the RESMONT calculated line currents which are stored on disc. Block 842 next provides for recording the line numbers for each of the eight high current line-out contingency cases in column 1 of the format for the contingency case list.

All of the calculated line current values are next divided by their respectively corresponding maximum current limit values in block 844. The resultant ratio values for the line currents to their maximum limit values are searched by block 846 to determine the eight most heavily loaded lines in the regional power system. Block 848 then provides for recording the line numbers for each of the eight most heavily loaded line-out contingency cases in column 1 of the format for the contingency case list. When later executed, the contingency line outages are implemented for loadflow security checks through the line outage CCO system.

The tieline contingency cases are identified by block 850. Thus, the loss of each currently available tieline is designated as a contingency case, and column 5 of the format in the contingency case list is set with the bus numbers of the available tielines so that the tieline power losses will be reflected at those busses in the contingency loadflow solutions. In block 852, the contingency cases determined for the contingency case list by the blocks 836, 840, 846 and 850 are transferred to disc storage and the program CONTLOGC is terminated.

f. Contingency Data Generation Program

As previously indicated, the contingency data generation program CONTGEN is executed when the block 660 is entered in the system security monitoring program (FIG. 13B). The program CONTGEN obtains basecase data derived by the program DATSET and modifies it in accordance with changes necessitated by the particular contingency case being run for a loadflow solution. The original basecase data is preserved on disc and the modified contingency case data is made available by the program CONTGEN to the program LOADFLW for the contingency case loadflow solution.

Generally, on successive loop runs through the system security monitoring program during any one basecase cycle, the program CONTGEN indexes through list CRCONT to select for execution in the listed order the single level contingency cases defined by the program CONTLOGC and the single or higher level contingency cases defined by operator entry. For each program pass, the program CONTGEN reads the LOADFLW data arrays previously generated by DATSET, modifies the acquired data arrays in accordance with the current contingency case and stores on disc and in SSM common core the modified contingency case data arrays for use by the program LOADFLW. Operator selected contingency cases are entered through the keyboard and displayed at the time of entry on the CRT. Limits are placed on the combinations of losses which can be selected by the operator for a contingency case as implied by the entry format for contingency case data as shown in Appendix I. Thus, the operator can enter one or two line losses and/or one bus with specified power generation loss and/or one or two tieline losses alone or in any combination for any one contingency case.

In the execution of the program CONTGEN, a regional system line loss requires that the analog network simulator 302 be modified to reflect the line loss. The line module in the line is identified from the contingency case line, the array LNBUF derived from DATSET data is accordingly modified and the simulator line is disconnected by operation of the line outage CCO system through the associated line outage relay K101 or the like considered in connection with FIG. 5C. The net line charging admittance YBCHR as determined from DATSET data for any bus connected to an outage line is also changed in response to changes in LNBUF.

When a power generation loss is specified for a bus, the loss PLOSS is subtracted from the present actual generated power PGEN for that bus as determined from DATSET data. If PGEN becomes zero, the bus status is changed to non-voltage-regulated if it had previously been voltage regulated.

Lost power generation is allocated to other power generation busses in proportion to the bus spinning reserve values PRESV up to the total current five minute spinning reserve SPRESV in the system. Any additional power generation loss requiring allocation is then distributed over the tielines in accordance with stored tie distribution factors TFACT which define the percentage of the total tieline power flow between the regional power system and external systems that each tieline will carry. When a particular tieline has an outage in actuality or in a contingency case, the tieline distribution factors TFACT are proportionately increased to reflect the tieline outage.

If a tieline outage is specified, the tie power loss is first allocated among the remaining tielines in accordance with the applicable tieline distribution factors TFACT. When the tieline power allocation causes a first tieline limit to be reached, the remaining power in this case is allocated to power system in the manner considered in connection with internal power generation losses. Any tieline power loss unallocatable to the regional power system within its spinning reserve SPRESV is returned for allocation to the remaining tielines.

Additional DATSET data changes made by the program CONTGEN include an adjustment to the values PGEN, PTIE, QTIE, YBCHR, BSTAT and VARR. Thereafter, bus real and reactive powers are redetermined by summation to form the BUSP and BUSQ arrays. A list of CONTGEN data arrays is included in Appendix I.

Figure 18A:
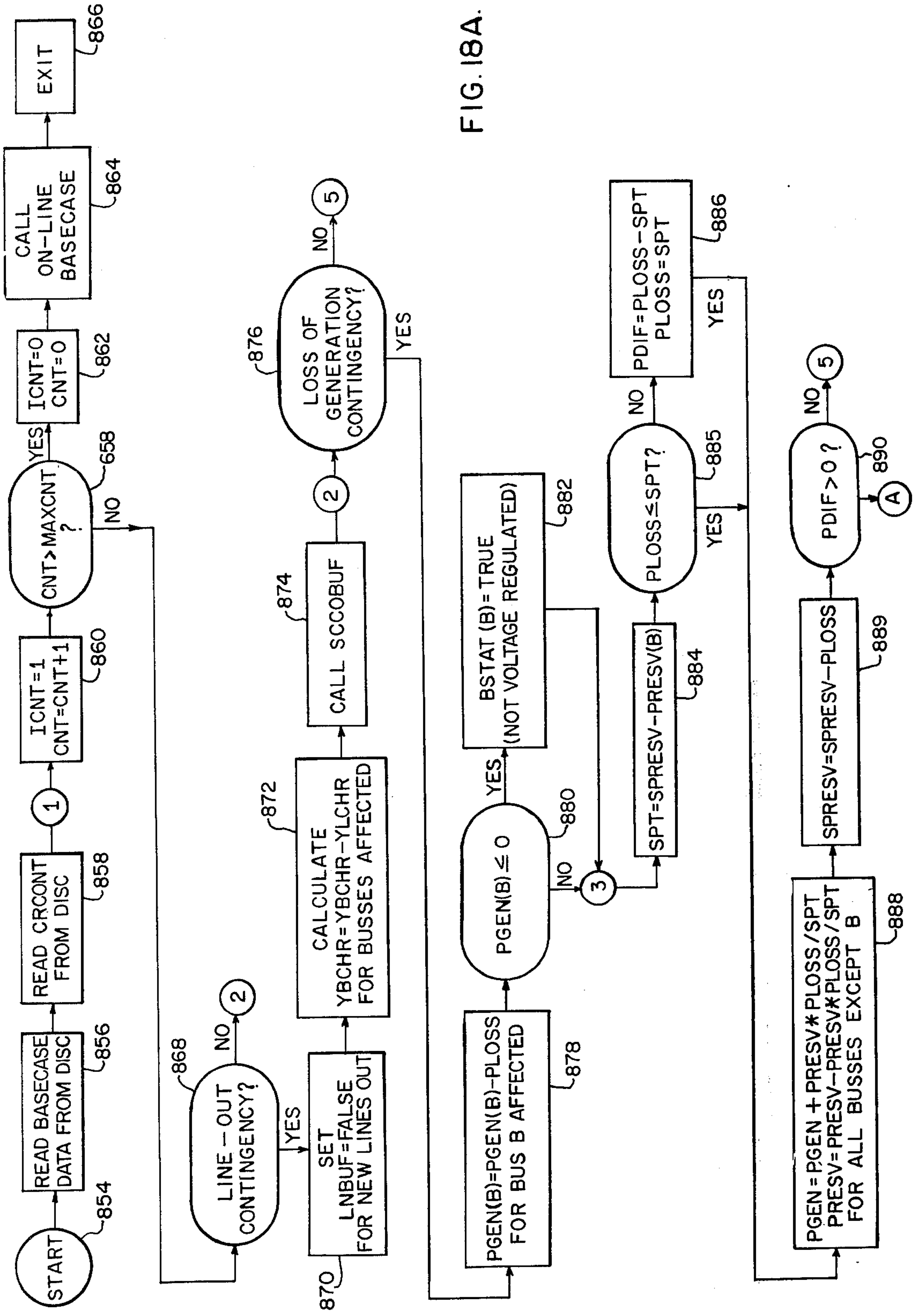
FIGS. 18A and 18B show a flowchart for a contingency case data generation program employed in the security computer.
Figure 18B:
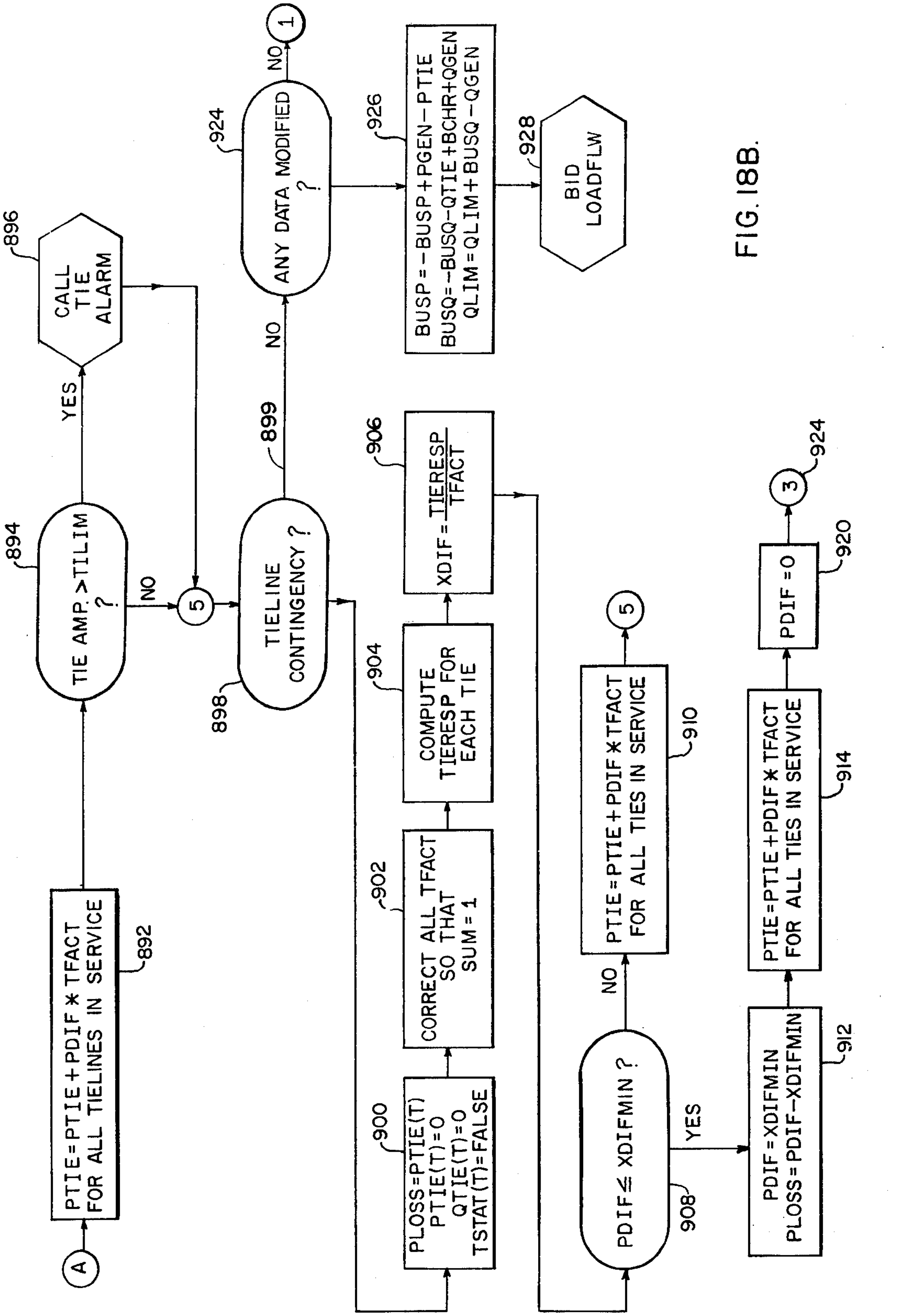

As shown in greater detail in the flowchart of FIGS. 18A and 18B, the program CONTGEN is entered as indicated by the reference character 854 and block 856 then provides for reading from disc the DATSET data which is to be modified for the contingency case loadflow solution in the program LOADFLW. The DATSET data read by the block 856 include the most recent basecase data including data arrays provided by the DATSET blocks 674 and 684, i.e., BUSP, BUSQ, VGEN, YBCHR, TFACT and TSTAT.

On the basis of CNT, block 858 reads the next contingency case CRCONT from the contingency list which is stored on disc with a density of 30 contingency cases per disc sector. A determination is thereby made of all automatically generated contingency cases as well as all operator entered contingency cases.

A counter block 860 next sets the quantity ICNT equal to 1 to indicate to other programs that contingency cases are being run. The block 860 also advances the contingency case count CNT by 1. As previously noted, the contingency case count CNT is set to zero by the program DATSET when the operator makes an on-line basecase request or when an on-line basecase is automatically recycled after the entire contingency case list has been processed. In other circumstances of program execution, the contingency case processing begins with the contingency case corresponding to the setting of the count CNT after advancement of the contingency case count by the block 860 upon entry into the program CONTGEN.

After the counter block 860 is executed, the count is tested against a specified maximum count in the block 658 which was considered previously as a separate block in the generalized flowchart for the system security monitoring program in FIG. 13B. If the contingency case count is over the limit of MAXNCONT (100) block 862 sets the quantity ICNT = 0 and the case count quantity CNT = 0, block 864 enters a bid for an on-line basecase and block 866 signals the security computer executive package that the program CONTGEN has ended its run.

Figure 15E:
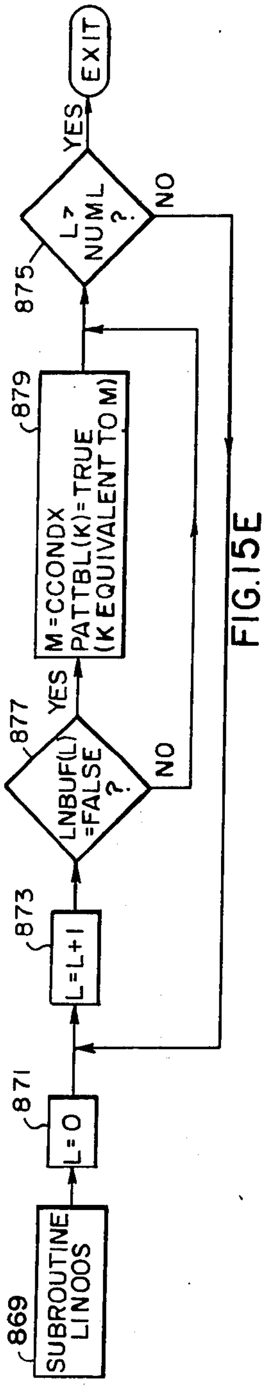
FIG. 15E shows a flowchart for a contact closure output setting subroutine employed in the security computer.

If the contingency case count is within the limit, block 868 next determines whether a line-out contingency is included in the contingency case at the CRCONT list location corresponding to the case count value CNT. If there is a line-out contingency, block 870 records the line or lines which are out of service in the line status array LNBUF. A flowchart for a CCO setting subroutine is shown in FIG. 15E to illustrate how the line outages are outputted for execution in the simulator 302. In block 869, subroutine LINOOS sets the line buffer array LNFUB. Next, blocks 871, 873 and 875 provide for sequencing through the array LNBUF to enable block 877 to determine line outages (FALSE) and block 879 to index the outages to the previously considered output table PATTBL by means of an array CCONDX.

Block 872 next operates in FIG. 18A to calculate the contingency case bus admittance values for the data array YBCHR for all busses affected by the outage line or lines. The new admittance value at each bus equals the basecase value less the admittance for all lines which have been contingently placed out of service at the bus. The new admittance value for each bus affected by outage lines provides for line charging current calculations in the contingency loadflow solution as previously considered in connection with the LOADFLW block 756.

Block 874 sets the bit patterns in the table SCCOBUF in accordance with the array LNBUF for use by the CCO handler in the executive package. The corresponding lines are accordingly removed from service in the analog network simulator 302 in the manner previously considered.

After a negative response from the block 868 or after execution of the block 874, block 876 next determines whether the present contingency case includes a loss of power generation within the regional power system. If it does, block 878 determines the new contingency case power generation level for the affected bus B by subtracting the power generation loss PLOSS from the basecase power generation value at the bus B. If the new bus power generation value PGEN is zero as tested by block 880, the bus status data array BSTAT is modified to indicate that the bus B has a non-voltage-regulated status as required for the contingency case calculations in the program LOADFLW.

Next, block 884 determines a new contingency value of the regional system spinning reserve SPT by subtracting the contingently lost spinning reserve PRESV(B) from the presently applicable system spinning reserve SPRESV which is calculated in the program DATSET as previously indicated. If block 885 indicates that the power generation loss PLOSS at the bus B is not less than or is equal to the new spinning reserve SPT, block 886 sets PLOSS equal to the spinning reserve SPT for internal allocation of the contingent power loss and it sets PDIF equal to the originally specified PLOSS minus the spinning reserve SPT for allocation over the tielines in service.

Power loss distribution within the regional power system and/or over the tielines is provided by blocks 888, 890 and (FIG. 18B) whether the source of the contingent power loss is at a power generation bus within the regional system or in a tieline which connects to an external power system. After the value PLOSS is determined to be less than or equal to the spinning reserve SPT in a generator loss contingency, or after it has been determined to be greater and has been set equal to SPT by the block 886, the power loss distribution is made within the regional system by the block 888 by setting the new contingency case PGEN at all power generation busses except bus B equal to the basecase value plus a value equal to the bus spinning reserve PRESV times the ratio of the contingently lost power PLOSS to the system spinning reserve SPT. The block 888 also calculates new spinning reserve values PRESV for all system power generation busses except the bus B by subtracting from the basecase spinning reserve value the bus reserve (PRESV) (PLOSS)/SPT used in the power loss allocation. This provides a proportional allocation of PLOSS over the system power generation busses in accordance with the spinning reserve available at the respective busses.

Block 889 calculates the new contingent value of the system spinning reserve SPRESV by subtracting the value PLOSS from the basecase spinning reserve value. There is no need to distribute the reactive power $Q_G$ associated with the power loss at the bus B since it becomes distributed automatically throughout the power system model as a dependent variable as the hybrid loadflow calculations are advanced to a contingency loadflow solution.

If the contingent power loss to be distributed on the tielines PDIF has been set by the block 886 to be greater than zero, the block 890 directs the program run to block 892 where the tieline allocation of the contingent power generation loss in excess of the regional system spinning reserve is computed. Thus, for all tielines in service, the new tieline power PTIE equals the basecase tieline power PTIE plus the power loss allocated to the tieline PDIF times the stored tieline distribution factor TFACT.

Block 894 next checks the contingency case tieline currents for high current limits TILIM and block 896 calls an alarm if any current limit is exceeded. The tieline currents are computed from the basecase tieline voltages and from the contingency case tieline power flows PTIE and QTIE. A security check of the tieline currents is made at this point in the programming rather than in the program RESMONT since security checking of on-line tieline values in this instances is a function external to the security computer 110. If any contingency case tieline current is over the limit value, the alarm is generated and the program run for the contingency case is continued with the overcurrent value(s).

Any tieline contingency in the present contingency case is determined by block 898 after a negative response from the generation contingency block 876 or after execution of the tieline current limit check by blocks 894 and 896. The maximum number of tielines that can be out of service in any contingency case is two. If the program operation arrives at the point where there is no tieline capacity available for distribution of tieline real power loss, or if no tieline loss is specified a negative response is generated by the block 898 and the program operation proceeds along flow path 899.

If tieline real power loss is to be distributed, block 900 next sets the contingently lost power PLOSS equal to the basecase power PTIE(T) on the contingently lost tieline T. The real and reactive powers PTIE and QTIE are set equal to 0 for the tieline T and the tielines array TSTAT is modified to indicate the outage of the tieline T. In the present embodiment of the invention, there is no distribution made of basecase reactive power $Q_T$ on the outage tieline T, and this fact causes the introduction of some tolerable error into the hybrid loadflow solutions for contingecy cases.

The TFACT values for the tielines remaining in service are proportionally adjusted in block 902 to add to unity with the exclusion of the TFACT value for the contingently lost tieline T. In the present case, it is preferred that the contingently lost tieline real power be distributed over the remaining tielines until a first tieline reaches its power limit and that any remaining lost tieline power to be distributed be allocated to the power generation busses within the regional power system. Any undistributed lost tieline power remaining after the power generation busses within the regional system have reached their spinning reserve limits is then referred back to the remaining tielines. For this purpose, a block 904 determines the basecase tieline reserve power transmission capacity for each tieline in service in the contingency case, and an intermediate variable XDIF is determined in block 906 by dividing the basecase reserve power TIERESP by the applicable distribution factor TFACT for each tieline in service. The variable XDIF defines the value of PDIF that would saturate each tieline in service.

Block 908 determines the minimum XDIFMIN among the computed intermediate variable values XDIF, and if the contingently lost power PDIF is less than or equal to XDIFMIN block 910 distributes PDIF over the tielines remaining in service without saturating any tieline and the block 894 next checks the resultant tieline currents against limits prior to recycling back to the block 898. If PDIF is greater than XDIFMIN, block 912 makes the quantity PDIF equal to XDIFMIN so that the amount of power distributed over the tielines causes saturation in only one tieline, i.e., the tieline corresponding to the quantity XDIFMIN. The block 912 further identifies for distribution within the regional power system the quantity PLOSS which is made equal to the contingently lost tieline power less the amount of power distributed among the tielines remaining in service, i.e., the originally determined value of PDIF less XDIFMIN. Block 914 next distributes the tie allocated power PDIF in a manner like that for the block 910. Block 920 accordingly sets the quantity PDIF equal to zero.

As indicated by the junction point indicated by the reference character 924, regional system distribution and tieline return spillover distribution of the power loss PLOSS is achieved by recycling through the program path including the power distribution blocks 888 and 890. In this looping, there may or may not be a bus B to be excepted from the calculations depending upon the specifications of the contingency case undergoing a security check.

Block 884 first sets SPT = SPRESV since PRESV(B) is now zero. If the block 885 next determines that the power distribution quantity PLOSS is less than or equal to the system spinning reserve SPT, all of the power PLOSS is distributed within the regional power system by the block 888 in the manner previously described. Any excess power over the system spinning reserve SPT is made equal to PDIF in the lbock 886 for reference back and distribution over the remaining unsaturated tielines. The block 886 also sets PLOSS = SPT in the manner previously described.

Once the distribution calculations are completed by block 888 or blocks 888 and 892, program operations are directed from the block 890 or the block 894 or 896 to the tieline contingency block 898. A second tieline contingency can cause recycling through the entire series of program blocks already described. If a second tieline contingency has already been processed or if only one tieline contingency exists in the contingency case undergoing a security check, the program operation is directed through the flow path 899 to a block 924 which operates as a filter to determine whether any DATSET data has been modified by the program CONTGEN. If not, a blank may exist at the contingency case list location corresponding to the present contingency case count CNT or an operator requested contingency case at the list location CNT may include an error specification. The program operations are accordingly returned to the contingency case counter block 860 in order to process the next contingency case.

If the block 924 indicates that some DATSET data has been modified, a block 926 next generates new values for the data arrays BUSP and BUSQ and QLIM on the basis of the new data computed for the contingency case. Block 928 then indicates completion of the program CONTGEN and a bid is made for the program LOADFLW to provide a loadflow solution for the contingency case.

The data developed for the loadflow solution of the contingency case will reflect changes necessitated by specified line outages detected by the block 868, specified generation losses detected by the block 876 and specified tieline outages detected by the block 898. Automatically generated contingency cases include a specification of only one contingency loss, and operator requested contingency cases can include a combination of contingency losses up to the limits previously indicated.

g. Study Mode Program Operations

The study mode of operation enables the hybrid loadflow computer arrangement to provide basecase loadflow solutions for network configurations and/or operating states defined at least partly by operator input data. Generally, network data used for the on-line basecase loadflow solution can be preserved for the study mode basecase loadflow solution, and it may be partly or wholly modified by operator entry. More particularly, the card entered data and the fixed data employed in the on-line basecase cycle are employed in the study mode. Data obtained from the shared core memory or through the CRT in the on-line basecase cycle is modifiable by CRT entry in the study mode. The study mode data which can be CRT entered accordingly includes unit generation UNITSM, real and reactive tieline powers SPTIE and SQTIE, generation voltage SVGEN and lines out of service SLNOUT. The level of load operation, i.e., peak or off-peak, is determined from the fixed crossover value SSMXPNT. Some on-line data such as required reserve and data for contingency case power allocation are not used at all since no contingency cases are run in the study mode.

Figure 19:
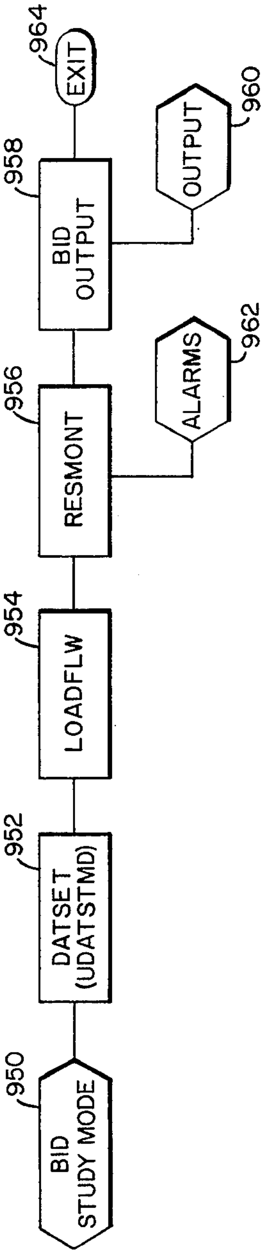
FIG. 19 provides a flowchart for a study mode of operation of the system security monitoring program.

To enter the study mode, a bid is made at block 950 in the flowchart of FIG. 19 by pressing the appropriate pushbuttons on the operator's SSM console panel. The pushbutton 422 is pressed to transfer on-line basecase data from on-line disc sectors to other sectors where data is stored for study mode operations. Next, the pushbutton 400 is operated to suspend the system security monitoring program execution with provision for permitting the program LOADFLW to continue to completion if it is running. The study mode button 418 is then pressed along with other appropriate buttons including satellite, CRT select, output, and data number and data specification pushbuttons 406–416. After each operator entry data item has been specified by the appropriate pushbutton operations, a pushbutton RESET CURSOR and SEND BLOCK are operated on the CRT keyboard and pushbuttons ENTER DATA, CRT and ENTER are operated sequentially to place the operator data in the study mode disc storage sectors.

The operator's panel program in the executive package 608 provided with the regional dispatch computer 111 sets appropriate flags to suspend on-line operation immediately upon the request of suspension for study mode operation subject as already indicated to delay for ongoing execution of the program LOADFLW. Next, the program DATSET calls a special study mode data subroutine UDATSTMD as indicated by block 952 in place of the on-line subroutine UDATONLN. The subroutine UDATSTMD provides for acquisition of CRT data which has been operator entered as study case data and it further provides for using the study data with on-line basecase data which has not been overwritten to provide the complete data set needed for study mode functioning of the program DATSET in a manner like that previously described. Reference is made to Appendix I where there is included a list of data arrays employed in the study mode operation of the program DATSET.

After the program DATSET is executed in the study mode, the programs LOADFLW and RESMONT and OUTPUT are executed in the manner previously described as indicated by block 954, 956, 958 and 960. Study mode alarms provided by block 962 include bus voltage high limit, bus voltage low limit, line current normal high limit and line current maximum high limit. A full printout is provided by the block 960 when requested by operation of the pushbuttons 404 and 418. Upon program termination at block 964, the on-line basecase cycle is bid when the SSM suspend flag SSMSUSP has been cleared.

h. Optimum Daily Forecast Security Check

Neither the optimum daily forecast program nor the security monitoring of the ODF calculated schedule per se form a part of the present invention. However, the ODF subject matter is considered herein to show how it is embraced within the overall system.

Figure 20:
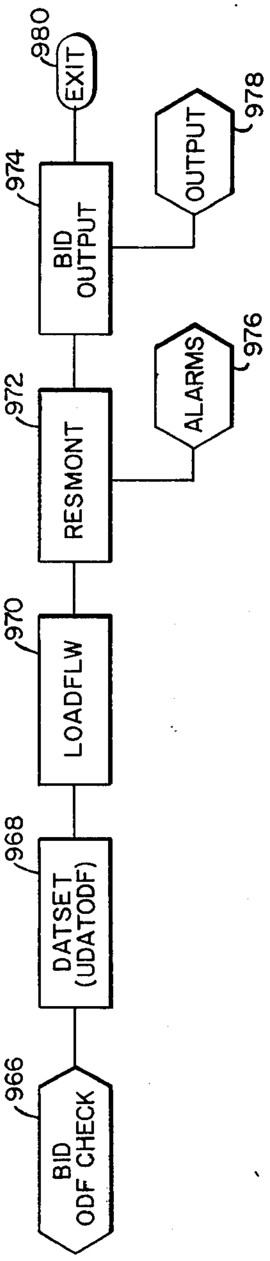
FIG. 20 shows a flowchart for an ODF mode of operation of the system security monitoring program.

As shown in the flowchart of FIG. 20, the ODF check program is bid in block 966 after the ODF program has completed its scheduling run and set the appropriate flag. Next, the program DATSET is run as indicated by block 968.

In this case, a subroutine UDATODF is called and data is organized in a manner like that described for the study mode except that ODF produced data, instead of operator entered CRT data, is used to overwrite corresponding on-line basecase data. The program DATSET employs the resultant data to produce the preprocessed data previously described for use in the execution of the program LOADFLW as indicated by block 970.

The programs RESMONT and OUTPUT are run after LOADFLW in the manner previously described for the study mode as indicated by blocks 972, 974, 976 and 978. Upon termination of the program operation in block 980, the on-line base-case cycle is bid.

APPENDICES I & II

Reference is made to the previously referenced concurrently filed patent application WE 41,236-I Ser. No. 175,286 for information included in Appendix I and program listing information included in Appendix II.

What is claimed is:

1. A hybrid loadflow computer arrangement comprising a DC analog simulator of an AC network, said simulator including a plurality of bus DC circuits and line DC circuits interconnected to correspond to the AC network, digital means for generating preselected network parameters as a function of other stored network parameters and parameters calculated by or derived from parameters calculated by said analog network simulator, analog input and output systems for transferring signals between said digital means and said analog network simulator, means for generating signal representations of on-line power system data including generation power values and tieline power values and at least some bus voltage values to said digital means, said digital means further including means for preprocessing online and other system data in accordance with predetermined indexing and compression and modification requirements, means for generating an on-line basecase loadflow solution with use of the preprocessed data and with interaction with said analog network simulator, means for monitoring the results of the basecase loadflow solution, means for determining contingency cases to be provided with loadflow solutions, means generating contingency case loadflow solutions, and means for sensing the contingency case data for the contingency case loadflow solutions.

2. A hybrid loadflow computer arrangement as set forth in claim 1 wherein said digital means is a digital computer.

3. An automated method for operating a hybrid loadflow computer arrangement comprising the steps of using a DC analog simulator of an AC network to calculate predetermined network parameters, using a digital means to generate preseleced network parameters as a function of the analog calculated parameters and other stored parameters, transferring signals between the simulator and the digital means during successive loadflow solution iterations, acquiring on-line power system data including generation power values and tieline power values and at least some bus voltage values, and operating the digital means with steps including preprocessing on-line and other system data in accordance with predetermined indexing and compression and modification requirements, generating an on-line basecase loadflow solution with use of the preprocessed data and with interaction with said analog network simulator, monitoring the results of the basecase loadflow solution, repeating the loadflow solution generation step for contingency cases, and determining the contingency case data for the contingency case loadflow solutions.

4. An automated method as set forth in claim 3 wherein a digital computer is programmed to perform the steps of the digital means, and sequentially controlling the operation of the digital computer in the performance of its program steps.

5. A method as set forth in claim 4 wherein the digital computer operating steps further comprise running the on-line basecase loadflow solutions on a cyclical basis and suspending the basecase loadflow solutions on operator request.

6. A method as set forth in claim 4 wherein the digital computer operating steps further comprise repeating the monitoring step for contingency case solutions.

7. A method as set forth in claim 4 wherein the digital computer operating steps further comprise undertaking the contingency case determination step only after completion of on-line basecase solutions and not after completion of contingency case loadflow solutions.

8. A method as set forth in claim 4 wherein the computer operating steps further comprise bidding for a basecase loadflow solution after determined contingency cases are run.

9. A method as set forth in claim 4 wherein the computer operating steps further comprise using basecase preprocessed data for contingency case loadflow solutions with data modifications needed to reflect the contingency or contingencies specified for each contingency case.

10. A method as set forth in claim 4 wherein the computer operating steps further comprise alarming and identifying for printout monitored loadflow solution parameters which exceed limits, and specifying a full loadflow solution printout on operator demand.

11. A method as set forth in claim 4 wherein the computer operating steps further comprise compressing on-line unit generation values into bus generation values and generator unit spinning reserve values into bus spinning reserve values and generator reactive power limits into bus reactive power limits.

12. A method as set forth in claim 11 wherein the compression steps further comprises compressing bus spinning reserve values into system spinning reserve.

13. A method as set forth in claim 11 wherein the compression step further comprises compressing bus real powers and tieline interchange powers into system load.

14. A method as set forth in claim 13 wherein the computer operating steps further comprise generating preprocessed load bus arrays by multiplying total system load against historic bus load distribution factors to obtain real bus loads and by multiplying the real bus loads against historic bus power factors to obtain reactive bus loads.

15. A method as set forth in claim 14 wherein the computer operating steps further comprise determining a preprocessed bus voltage array of on-line bus voltages and stored table bus voltages and operator entered voltages, and indexing on-line tieline powers into preprocessed arrays, compressing on-line unit generation values into bus generation values and generator unit spinning reserve values into bus spinning reserve values and generator unit reactive power limits into bus reactive power limits, compressing bus real load and bus real power generation and tieline real power into a not bus real power array, compressing stored bus generation reactive power and bus reactive load and tieline reactive load and bus shunt megavars into a net bus reactive power array, and determining net low and high bus reactive power limits.

16. A method as set forth in claim 4 wherein the computer operating steps further comprise determining a preprocessed bus voltage array of on-line bus voltages and stored table bus voltages and operator entered voltages, and indexing on-line tieline powers into preprocessed arrays.

17. A method as set forth in claim 4 wherein the computer operating steps further comprise modifying a lines out of service array in accordance with entered actual line outages and causing any line outages to be implemented in the analog simulator, and modifying stored bus shunt admittance accordingly.

18. A method as set forth in claim 4 wherein the computer operating steps further comprise generating and storing for contingency case data generation any data arrays subject to contingency modification and intermediately or finally developed in the data preprocessing step for an on-line basecase solution.

19. A method as set forth in claim 4 wherein the computer operating steps further comprise executing an input/output subroutine after each loadflow solution to provide for hybrid data transfer.

20. A method as set forth in claim 19 wherein the subroutine step further comprises imposing a time delay on computer reading of analog computer solution parameters after computer output of computer calculated parameters.

21. A method as set forth in claim 19 wherein the subroutine step further comprises packing imaginary and real components of digital computer output parameters into single digital computer output words.

22. A method as set forth in claim 19 wherein the subroutine step further comprises employing conversion factors on read analog simulator phasor signals to correlate analog simulator scaling with per unit values.

23. A method as set forth in claim 4 wherein the computer operating steps further comprise determining whether the power system has sufficient reserve as a part of the monitoring step.

* * * * *